United States Patent
Omae et al.

(10) Patent No.: US 7,420,295 B2
(45) Date of Patent: Sep. 2, 2008

(54) POWER UNIT FOR CONVEYANCE AND CONVEYANCE PROVIDED WITH THE POWER UNIT

(75) Inventors: Takao Omae, Kyoto (JP); Ken Sawai, Kyoto (JP)

(73) Assignee: GS Yuasa Corporation, Kyoto-shi (JP)

( * ) Notice: Subject to any disclaimer, the term of this patent is extended or adjusted under 35 U.S.C. 154(b) by 531 days.

(21) Appl. No.: 10/522,613

(22) PCT Filed: Jul. 31, 2003

(86) PCT No.: PCT/JP03/09772

§ 371 (c)(1),
(2), (4) Date: Jan. 31, 2005

(87) PCT Pub. No.: WO2004/012964

PCT Pub. Date: Feb. 12, 2004

(65) Prior Publication Data

US 2005/0253458 A1    Nov. 17, 2005

(30) Foreign Application Priority Data

| Aug. 1, 2002 | (JP) | 2002-225023 |
| Aug. 7, 2002 | (JP) | 2002-230359 |
| Aug. 7, 2002 | (JP) | 2002-230414 |
| Aug. 8, 2002 | (JP) | 2002-232071 |
| Aug. 27, 2002 | (JP) | 2002-246390 |
| Aug. 27, 2002 | (JP) | 2002-246429 |
| Sep. 10, 2002 | (JP) | 2002-264601 |
| Sep. 10, 2002 | (JP) | 2002-264651 |
| Sep. 10, 2002 | (JP) | 2002-264665 |

(51) Int. Cl.
*H02J 1/00* (2006.01)

(52) U.S. Cl. .................. 307/66; 307/9.1; 320/101; 429/112

(58) Field of Classification Search .............. 307/65, 307/9.1, 66; 320/101; 429/112
See application file for complete search history.

(56) References Cited

U.S. PATENT DOCUMENTS

| 5,525,847 A * | 6/1996 | Aronne ..................... 307/125 |
| 5,952,799 A | 9/1999 | Maisch et al. |
| 6,220,165 B1 * | 4/2001 | Sullivan ..................... 102/206 |
| 6,828,755 B1 * | 12/2004 | Iverson et al. ............... 320/104 |
| 2001/0027268 A1 * | 10/2001 | Kato ......................... 600/152 |

(Continued)

FOREIGN PATENT DOCUMENTS

JP    4-28148    3/1992

(Continued)

*Primary Examiner*—Stephen W Jackson
*Assistant Examiner*—Daniel Cavallari
(74) *Attorney, Agent, or Firm*—Westerman, Hattori, Daniels & Adrian, LLP.

(57) ABSTRACT

The present invention provides a power unit for conveyance, having a main power source and a standby power source. The power unit has a thermal battery provided as the standby power source. The conveyance is provided with an electronic control system and the power unit for conveyance of the present invention, and electric power for operating the electronic control system is supplied to the electronic control system from the power unit for conveyances. By employing such a thermal battery as the standby power source, the standby power source does not require to be charged, thereby ensuring a long-term reliability of the standby power source.

13 Claims, 44 Drawing Sheets

U.S. PATENT DOCUMENTS

2002/0017098 A1 * 2/2002 Johansson .................. 60/517

FOREIGN PATENT DOCUMENTS

| JP | 5-182674 | 7/1993 |
| JP | 7-14561 | 3/1995 |
| JP | 10-76925 | 3/1998 |
| JP | 2001-114039 | 4/2001 |

* cited by examiner

Fig. 4

| Alternator input | Main power source input | Storage battery status |
|---|---|---|
| OFF | OFF | Abnormal |
| OFF | ON | Normal |
| ON | OFF | Unknown |
| ON | ON | Unknown |

Fig. 25
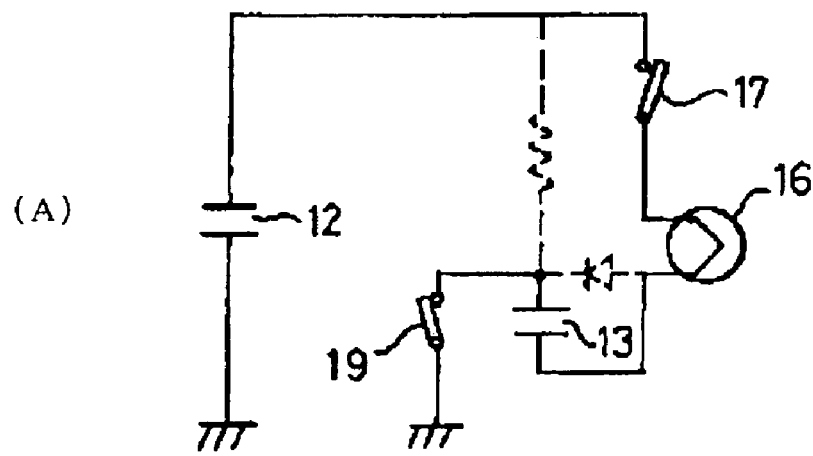
(A)
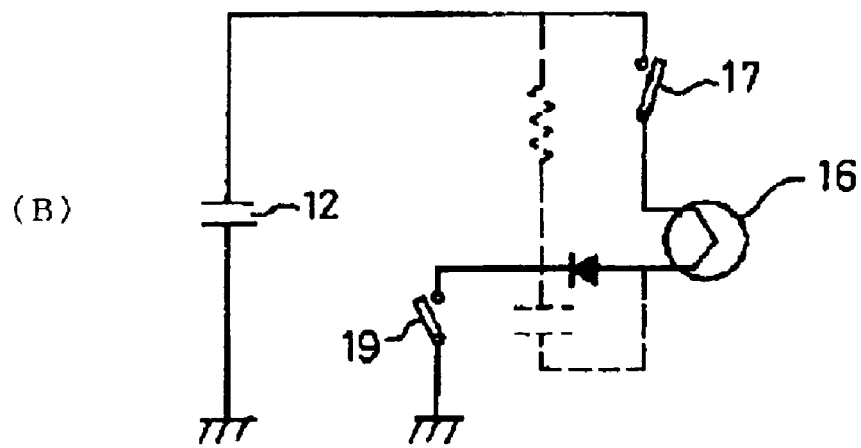
(B)
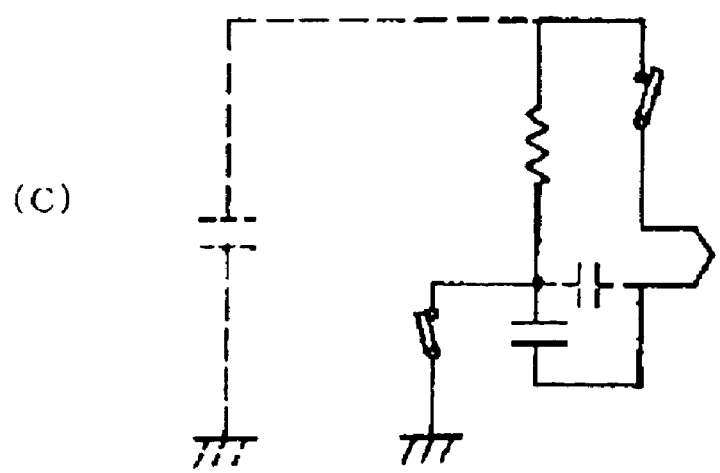
(C)

POWER UNIT FOR CONVEYANCE AND CONVEYANCE PROVIDED WITH THE POWER UNIT

TECHNICAL FIELD

The present invention relates to a power unit and conveyances such as a vehicle which is provided with this power unit and an electronic control system, a brake-by-wire system and the like.

BACKGROUND ART

Conventionally, there have been provided systems such as brake-by-wire systems, steer-by-wire systems, shift-by-wire systems and drive-by-wire systems. In such systems when a driver conducts operations such as braking, steering, shifting and accelerating, an electrical signal is generated based on the control input of the operation. The displacement amount of the actuator on the vehicle operation is determined based on the electrical signal, and braking, steering, shifting, throttle control and the like are then conducted. Taking brake-by-wire systems as an example, the one is widely known which brakes the wheels by generating an electrical signal in response to a state in which a brake pedal is operated by a driver, that is, brake pedal stroke or brake pedal leg-power and by driving the actuator based on the electrical signal. For driving the actuator, such methods are conceivable in which for each wheel a brake friction pad is directly pressed against a disk using a motor or the like to obtain wheel braking force, and in which wheel cylinder pressure is generated by a pump to obtain wheel braking force.

In the above system, in which an actuator on the conveyance operation is driven based on an electrical signal to make adjustments such as acceleration/deceleration and movement direction of the conveyance, if an electrical signal stops, the driver's intention is not transmitted to the actuator. Therefore, a system structure such that an electrical signal is always transmitted correctly is necessary. Particularly, regarding power supply from an alternator or a battery, a device structure which can take measures against interruption of power supply to the electronic control system while the vehicle is traveling is desirable.

In response to this, for example, vehicle systems which are provided with two power sources to increase reliability of power supply are disclosed in JP H10-76925A and JP 2001-114039A. In such systems, even in the case when power supply from either power source stops, since power supply from the other power source is ensured, effective measures can be taken against interruption of power supply while the vehicle is traveling.

In such devices, however, in which a storage battery is employed as a preliminarily employed power source, since the storage battery anytime has to be charged at a level where discharge is possible, problems occur such that electric power is uselessly consumed and that deterioration of performance of the storage battery progresses due to constant charge.

The present invention is conducted to solve the above problems.

DISCLOSURE OF THE INVENTION

The present invention, which is a power unit for conveyances which are provided with a main power source and a stand-by power source, is characteristically provided with a thermal battery as the stand-by power source. It is to be noted that the main power source is preferably provided with a generator and a main storage battery.

Furthermore, the present invention is a conveyance, which is provided with an electronic control system and the above power unit for conveyance of the present invention, and is characteristically constituted so that electric power for operating the electronic control system is supplied to the electronic control system from the power unit for conveyance.

By thus employing a thermal battery as a stand-by power source, charging of the stand-by power source becomes unnecessary. Furthermore, long-term reliability of the stand-by power source is ensured. In addition, the present invention is particularly suitable for the case in which an electronic control system is employed, for driving an actuator on the conveyance operation based on an electrical signal and for making adjustments such as acceleration/deceleration and movement direction of the conveyance, and achieves a highly reliable conveyance.

Furthermore, since the present invention employs a thermal battery, the power unit of the present invention preferably has the following structures according to problems described below. The problems and the preferable structures for solving the problems are described below. A better power unit can be constituted by combining each structure as required, and a better conveyance can be achieved by employing such a power unit.

(Problem 1) Since a thermal battery is a battery which becomes possible to supply electric power by activation, it is necessary that a thermal battery should be reliably activated in an emergency when a stand-by power source is required.

(Problem 2) Since a power unit like the present invention has never been available before, a circuit structure suitable for practical application has to be constructed, and a circuit structure for supplying energy to an activation circuit peculiar to a thermal battery particularly has to be constructed.

(Problem 3) A thermal battery requires a certain amount of time from when activation starts until prescribed power supply becomes possible. Consequently, it is required that power supply to an electronic control system or the like should not stop between the time abnormality occurs in a main power source and the time when power supply from a thermal battery which is a stand-by power source starts.

(Problem 4) Since it is also possible that abnormality may occur both in a main power source and in a stand-by power source, safety reliability needs to be ensured for a conveyance of the present invention even in such a case.

(Preferable Structures to Solve Problem 1)

A first such structure, in a power unit of the present invention which is characteristically provided with the above thermal battery, is provided with a first switch means for detecting voltage of a main power source to conduct a switch operation; an activation device for having continuity with the main power source when the relevant first switch means operates, to activate the thermal battery; a backup power source parallelly connected to the main power source through a diode; and a second switch means located between the relevant backup power source and the activation device, for switching connection status between the backup power source and the activation device.

Also, a second such structure, in the power unit of the present invention which is characteristically provided with the above thermal battery, is provided with a first switch means for detecting voltage of the main power source to conduct a switch operation; a constant current circuit for receiving power supply from the main power source by the switch operation of the relevant switch and for supplying constant current to the thermal battery; and an energy storage means for supplying backup power to the constant current circuit when power from the main power source is shut off.

Furthermore, a third such structure, in the power unit of the present invention which is characteristically provided with the above thermal battery, is provided with a backup power source connected to the main power source through a power supply wire; a thermal battery ignition circuit for activating the thermal battery by electric power from the relevant backup power source; a voltage conversion circuit connected to the power supply wire, for allowing selectively either the voltage of the main power source to increase and to be supplied to the backup power source side, or the voltage of the backup power source side to decrease and to be supplied to the main power source; a thermal battery ignition control circuit connected to the power supply wire between the main power source and the voltage conversion circuit, which operates by electric power from the relevant power supply wire, for controlling the thermal battery ignition circuit in response to voltage decrease of the main power source to activate the thermal battery during operation; a diagnosis circuit connected to the power supply wire between the main power source and the voltage conversion circuit, which operates by electric power from the relevant power supply wire to diagnose for activation of the thermal battery; a disconnection detection circuit which has a connection point between the main power source and the voltage conversion circuit, for detecting disconnection of the power supply wire between the relevant connection point and the main power source; a voltage increase/decrease control circuit controlled by the relevant disconnection detection circuit, for allowing the voltage conversion circuit to increase the voltage of the main power source side to supply to the backup power source side in a state such that disconnection of the power supply wire is not detected, and for allowing the voltage conversion circuit to decrease the voltage of the backup power source side to supply to the main power source side in a state such that disconnection of the power supply wire is detected; and an operation stop control circuit for stopping operation of the diagnosis circuit in response to detection of the power supply wire disconnection by the disconnection detection circuit.

According to the third structure, when the power supply wire connecting to the main power source does not disconnect, the voltage conversion circuit can store electric charge in the backup power source by controlling the voltage increase/decrease control circuit to increase the voltage from the main power source. In this state, the main power source supplies electric power to the thermal battery ignition control circuit and the diagnosis circuit to operate them. In contrast, when the power supply wire disconnects between the main power source and the voltage conversion circuit, this disconnection of the power supply wire is detected in the disconnection detection circuit. When the disconnection of the power supply wire is detected, the voltage increase/decrease control circuit controls the voltage conversion circuit so that the voltage of the backup power source side is decreased to be supplied to the main power source side. Consequently, even when the power supply wire disconnects, the thermal battery ignition control circuit compensates for proper operation, the operation stop control circuit controls the diagnosis circuit to stop diagnosis operation of the diagnosis circuit so that electric power consumption of the backup power source is avoided. As a result, even when the power supply wire connecting to the main power source disconnects, only one backup power source can compensate for proper operation of the thermal battery ignition circuit as well as can suppress electric power consumption of the same backup power source with the result that operation of various control circuits with the same backup power source as their power source can be ensured for a long time.

Furthermore, a fourth such structure, in the power unit of the third structure described above, employs a resistance circuit as the diagnosis circuit and employs a shutoff circuit as the operation stop control circuit. The resistance circuit is a circuit which is connected so that electric power is supplied from the above backup power source, and which applies a voltage between both ends of a part for activating of the above thermal battery in order to diagnose the part for activating the above thermal battery. The shutoff circuit is a device which is a circuit for shutting off electric power supply from the above backup power source to the resistance circuit in response to detection of the power supply wire disconnection by the above disconnection detection circuit.

Also in the case of this structure, similarly to the device in the third structure described above, when the power supply wire connecting to the main power source does not disconnect, similarly to the case in the first invention, the backup power source stores electric charge by the main power source and the main power source supplies electric power to the thermal battery ignition control circuit to operate them. Here, the resistance circuit is connected to the backup power source. In contrast, when the power supply wire disconnects between the main power source and the voltage conversion circuit, the thermal battery ignition control circuit compensates for proper operation with the backup power source as a power source. At the same time, since the shutoff circuit shuts off electric power supply from the backup power source to the resistance circuit in response to a signal of the disconnection detection circuit for detecting disconnection of the power supply wire, the resistance circuit avoids electric power consumption of the backup power source. As a result, even when the power supply wire connecting to the main power source disconnects, only one backup power source can compensate for proper operate of the thermal battery ignition circuit as well as can suppress electric power consumption of the same backup power source with the result that operation of various control circuits with the same backup power source as their power source can be ensured for a long time. In each structure, reliability of a thermal battery squib ignition device can be improved.

Furthermore, a fifth such structure, in the power unit of the present invention which is characteristically provided with the above thermal battery, is provided with a main power source abnormality detection means for detecting abnormality of the main power source; an auxiliary power source means which is a power source means for supplying electric power for start to the thermal battery, that is different from a battery located in the main power source; and a control means for controlling so that electric power for start is supplied from the auxiliary power source means to the thermal battery in a case when the main power source abnormality detection means detects abnormality of the main power source.

This allows electric power for starting the thermal battery to be ensured stably regardless of the battery status. That is, in spite of a situation in which power supply from a battery completely stops caused by complete battery exhaustion, battery failure or the like, the thermal battery can be started independently by an auxiliary power source means without depending on residual electric power of the battery. The structure can start the thermal battery reliably even in an emergency. Furthermore, the structure is suitable for use in that electric power for start can be ensured independently from a battery, becoming a power unit which stably operates even in an emergency by an independent power supply system.

The auxiliary power source means is provided with a generator for generating electricity based on drive energy by a drive mechanism in the relevant vehicle. The control means can also control so that electric power obtained from this generator is used as electric power for starting the thermal battery.

For example, the auxiliary power source means can be constituted so that a hybrid-type automobile, in which a generator driven by an engine, a motor which can drive wheels and a battery which has a structure which can supply electric power to the motor (hereinafter, also referred to as main battery) are mounted, travels by driving the motor with electric power from either the generator or the main battery, and which has a structure which can brake regeneratively at the time of braking is intended as an application conveyance; and that regenerative electric power generated by regenerative braking is used as electric power for starting the thermal battery. By constituting the auxiliary power source means as described, electric power for start is ensured by regenerative braking independently of a battery (main battery or other batteries) as long as the vehicle is traveling, and furthermore, electric power can be supplied without using the generator driven by the engine. Consequently, power can be supplied even in a case when both of a battery and a generator driven by the engine (alternator or the like) are abnormal with the result that the device structure becomes extremely highly reliable.

(Preferable Structures to Solve Problem 2)

A first such structure, in the power unit of the present invention which is characteristically provided with the above thermal battery, wherein the main power source is provided with a main storage battery whose negative electrode is grounded and a generator whose negative electrode is grounded, is provided with a first condenser whose positive electrode is connected to a positive electrode of the main storage battery and whose negative electrode is grounded; a second condenser whose positive electrode is connected to the positive electrode of the main storage battery through a positive electrode side current limiting resistor, and whose negative electrode is grounded through a negative electrode side current limiting resistor; a thermal battery activation circuit one of whose terminals is connected to the positive electrode of the main storage battery through a voltage sensor for detecting voltage decrease of the power source to close electrically, and the other terminal is connected to the negative electrode of the second condenser; a diode whose anode is connected to the other terminal of the thermal battery activation circuit and whose cathode is connected to the positive electrode of the second condenser; a main switch for grounding the positive electrode of the second condenser when closing; and a control unit for detecting voltage decrease of the main power source to close the main switch.

According to this structure, when voltage decrease of the main power source is detected, the first condenser and the second condenser become serially connected to supply energy to the thermal battery activation circuit with the result that voltage to be supplied to a detonator thermal battery activation circuit can be high without increasing voltage of the main storage battery by a converter. That is, not only can sufficient pressure be applied to the thermal battery activation circuit of the thermal battery activation device without a converter which potentially becomes a noise emission source, but also voltage can be applied to the thermal battery activation circuit even when either one of the two condensers has a trouble.

Furthermore, a second such structure, in the power unit of the present invention which is characteristically provided with the above thermal battery, wherein the main power source is provided with a main storage battery whose negative electrode is grounded and a generator whose negative electrode is grounded, is provided with a DC-DC converter whose negative electrode is grounded, for increasing voltage of the main storage battery; a first condenser whose positive electrode is connected to a positive electrode of the DC-DC converter, and whose negative electrode is grounded; a second condenser whose positive electrode is connected to the positive electrode of the DC-DC converter through a positive electrode side current limiting resistor, and whose negative electrode is grounded through a negative electrode side current limiting resistor; a thermal battery activation circuit one of whose terminals is connected to the positive electrode of the DC-DC converter through a voltage sensor for detecting voltage decrease of the main power source to close electrically, and the other terminal is connected to the negative electrode of the second condenser; a sub switch for grounding the other terminal of the thermal battery activation circuit through a diode for negative voltage protection when closing; a main switch, which is the main switch, for grounding the positive electrode of the second condenser when the main switch closes; and a control unit for closing the sub switch when detecting voltage decrease of the main power source, and for closing the second switch in a prescribed amount of time after closing the main switch.

According to this second structure, when electric current supplied to the thermal battery activation circuit decreases to a prescribed value or under, the second switch closes so that energy is supplied from the second condenser. That is, even when a condenser capacity is small, energy large enough to operate the thermal battery activation circuit can be supplied by discharging the two condensers with a time lag. It is to be noted that, in the second structure described above, it is preferable that the structure is such that a time required from closing the above sub switch before closing the above main switch becomes shortened as voltage of the main power source decreases since such a structure can supply energy to the thermal battery activation circuit more reliably.

A third such structure, in the power unit of the present invention which is characteristically provided with the above thermal battery, wherein a circuit for limiting ignition electric current carried to a thermal battery activation circuit for activating the thermal battery is provided, and the circuit for limiting ignition electric current is provided with a semiconductor integrated circuit in which a thermal battery activation circuit ignition drive circuit is formed; a reference power supply formed in the semiconductor integrated circuit; a pull-down resistor connected to the outside of the semiconductor integrated circuit, and to which electric current is supplied from the reference power supply; and an electric current limitation circuit formed inside the semiconductor integrated circuit, for limiting the value of ignition electric current carried to the thermal battery activation circuit within a predetermined range, with the value of reference electric current supplied from the reference power supply to the pull-down resistor as reference.

By connecting the pull-down resistor to the outside of the semiconductor integrated circuit, dispersion in resistance values is reduced, so that ignition electric current can be detected accurately and that dispersion in ignition electric current values can be suppressed. Consequently, capacity of a condenser for ignition backup can become smaller, reliability is improved and the parts cost can also be suppressed.

It is to be noted that the above electric current limitation circuit is preferably provided with a current mirror circuit for detecting the above reference electric current value and the ignition electric current value. This is because this allows electric current value to be detected accurately in the semiconductor integrated circuit.

A fourth such structure, in the power unit of the present invention which is characteristically provided with the above thermal battery, wherein a circuit for limiting ignition electric current carried to a thermal battery activation circuit for activating the thermal battery is provided, and is further provided, in the same semiconductor integrated circuit, with a thermal battery activation circuit ignition drive circuit; an electric current detection resistor through which thermal battery activation circuit ignition electric current flows; a constant current source; a pull-down resistor through which electric current from the constant current source flows; an electric current limitation circuit for limiting ignition electric current value detected from the potential difference between both ends of the electric current detection resistor within a predetermined range based on the potential difference between both ends of the pull-down resistor.

Since this allows the electric current detection resistor in the semiconductor integrated circuit and the external pull-down resistor to limit ignition electric current, even though there is dispersion in absolute resistance values in the electric current detection resistor in the semiconductor integrated circuit, dispersion in their relative resistance values can be reduced and electric current can be limited accurately.

A fifth such structure, in the power unit of the present invention which is characteristically provided with the above thermal battery, wherein a circuit for limiting ignition electric current carried to a thermal battery activation circuit for activating a thermal battery is provided, and is further provide with a semiconductor integrated circuit in which a thermal battery activation circuit ignition drive circuit is formed; and a time limitation means connected to the outside of the semiconductor integrated circuit, for limiting current carrying time of ignition electric current to a predetermined time.

Since current carrying time of ignition electric current can be limited to a prescribed time by providing the time limitation means outside the semiconductor integrated circuit, a microcomputer is not required for use in controlling current carrying time of ignition electric current. Consequently, a load on the microcomputer can be reduced as well as the number of parts can be reduced with the result that parts cost can also be suppressed.

Since the above time limitation means limits time by a resistor and a condenser, capacities of the resistor and the condenser can be set as requested by a thermal battery activation device and a set time can be changed easily as required. Furthermore, a plurality of condensers in the time limitation means can be provided, and capacities of the resistor and the condenser can be changed by a change means.

It is to be noted that this structure is preferably provided with the change means for changing value of the resistor or the condenser from the outside of the semiconductor integrated circuit. When the change means can be controlled by a microcomputer, current carrying time of ignition electric current can also be set by the microcomputer.

Furthermore, it is to be noted that the structure is more preferably provided with an invalidation means for invalidating time limitation by the above time limitation means from the outside of the semiconductor integrated circuit. Since provision of the invalidation means allows current carrying time of ignition electric current to be invalidated also from the outside of the semiconductor integrated circuit, time limitation by the time limitation means can be invalidated and current carrying time can be controlled by the microcomputer when current carrying time of ignition electric current needs to be changed.

Furthermore, in the case of a device which is provided with a circuit for limiting ignition electric current carried to the thermal battery activation circuit for activating the above thermal battery, the ignition electric current limitation method is preferably such that a thermal battery activation circuit ignition drive circuit with an electric current limitation function is formed as a semiconductor integrated circuit and that time carrying ignition electric current is limited by a circuit formed inside and outside the semiconductor integrated circuit.

(Preferable Structures to Solve Problem 3)

Such a structure, in the power unit of the present invention, is provided with a main power source abnormality detection means for detecting abnormality of the main power source; and a sub power source means for supplying power to the outside after abnormality is detected by the relevant main power source abnormality detection means. According to the present invention, power can be supplied continuously by a thermal battery even when the main power source is abnormal, and power supply is uninterruptedly ensured by the sub power source means even during the time between when starting up the thermal battery and when power supply from the thermal battery starts with the result that a device structure whose power supply has a extremely high stability can be achieved.

It is to be noted that, in a thermal battery which is provided with a main electromotive force generation section for generating electromotive force based on a start signal, the thermal battery can be constituted to be provided with a sub power source means for generating electromotive force during the time between when the start signal is given to the main electromotive force generation section and when the relevant main electromotive force generation section starts up. Since such a thermal battery structure allows the thermal battery to have a function to solve delay in start-up by itself and power to be supplied immediately after the start signal is given, a special means for solving delay in start-up does not need to be provided outside the thermal battery with the result that the structure is easily applicable to various objects.

(Preferable Structures to Solve Problem 4)

Such a structure, in the power unit of the present invention, is provided with a main power source abnormality detection means for detecting abnormality of the main power source; a stand-by power source which is provided with a thermal battery for supplying power to the outside when this main power source abnormality detection means detects power supply abnormality; and a stand-by power source abnormality detection means for detecting power supply abnormality in the relevant stand-by power source; and a warning means for giving warning when abnormality in the stand-by power source is detected by the stand-by power source abnormality detection means at least either before or after the relevant conveyance starts. It is to be noted that this power unit is effective without using a thermal battery as the stand-by power source since the power unit has the effects to be described below.

Such a structure can avoid the driver from continuing driving without knowing a situation, in which the stand-by power source cannot be used, with the result that an extremely safe system can be achieved regarding a power source.

It is to be noted that when the stand-by power source abnormality detection means is constituted so as to contain a usage history detection means for detecting usage history of the stand-by power source so that when the usage history detection means detects that the stand-by power source has been used, the warning means can give warning. Using the usage history detection means avoids the conveyance from traveling continuously as it is even though a power source for emergency use has already been in an unusable condition.

Furthermore, it can be constituted to contain a start regulation means for regulating start of the relevant conveyance in case abnormality of the stand-by power source is detected by the stand-by power source abnormality detection means before the relevant conveyance starts. By employing such a structural example, start is regulated in a case when the stand-by power source is abnormal, and start is conducted only when the stand-by power source is normal.

Furthermore, the stand-by power source abnormality detection means can be constituted so as to use a thermal battery as the stand-by power source, and to contain a thermal battery detection means for detecting whether this thermal battery can be used or not; and it can be constituted that start of the relevant conveyance is regulated by the start regulation means when the thermal battery detection means detects that the thermal battery cannot be used. Since a thermal battery which can be stored for a long period and can generate large electric current is used in an emergency by employing such a structure, a structure which can supply power to a load stably in an emergency can be achieved. At the same time, although it has to be careful that travel would not start with a used thermal battery installed since this thermal battery has a property to become unusable once used, employing the above structure effectively prevents start with an unusable thermal battery installed.

Furthermore, it can be constituted that the stand-by power source abnormality detection means detects an abnormal state of the stand-by power source while a conveyance is traveling; and that the drive status of the relevant conveyance can be suppressed by a conveyance drive suppress means in order that the conveyance become a deceleration state or stop state when abnormality is detected. By employing such a structure, continuous travel is prevented in case the stand-by power source is abnormal and travel is continued only when the stand-by power source is normal.

That is, the stand-by power source abnormality detection means can be constituted so as to use a thermal battery as the stand-by power source and to contain a thermal battery detection means for detecting whether this thermal battery can be used or not; and it can be constituted that start of the relevant conveyance is regulated by the start regulation means when the thermal battery detection means detects that the thermal battery cannot be used. By employing the fifth structural example described above, being provided with the convenient thermal battery as a power source for emergency use, this structure prevents both the main power source and the stand-by power source from being unusable before happening at the time of high speed rotation of an engine since drive is suppressed if travel should be performed in a condition that the thermal battery cannot be used, so that a high-security system can be achieved.

Furthermore, the thermal battery detection means may be constituted so as to contain a thermal fuse which is cut off in a prescribed temperature condition, and a thermal fuse state detection means for detecting a cutoff state of the thermal fuse, and constituted so as to determine that the thermal battery is in an unusable condition (specifically, used condition) when the thermal fuse state detection means detects that the thermal fuse is cut off. This structure can judge easily whether the thermal battery can be used or not with a simple structure.

BRIEF DESCRIPTION OF THE DRAWINGS

FIG. 4 is a view showing a state of a storage battery 40 estimated from each voltage input;

FIG. 25 is a view for explaining an operation of the first example;

DETAILED DESCRIPTION OF PREFERRED EMBODIMENTS

First Embodiment

Figure 5:
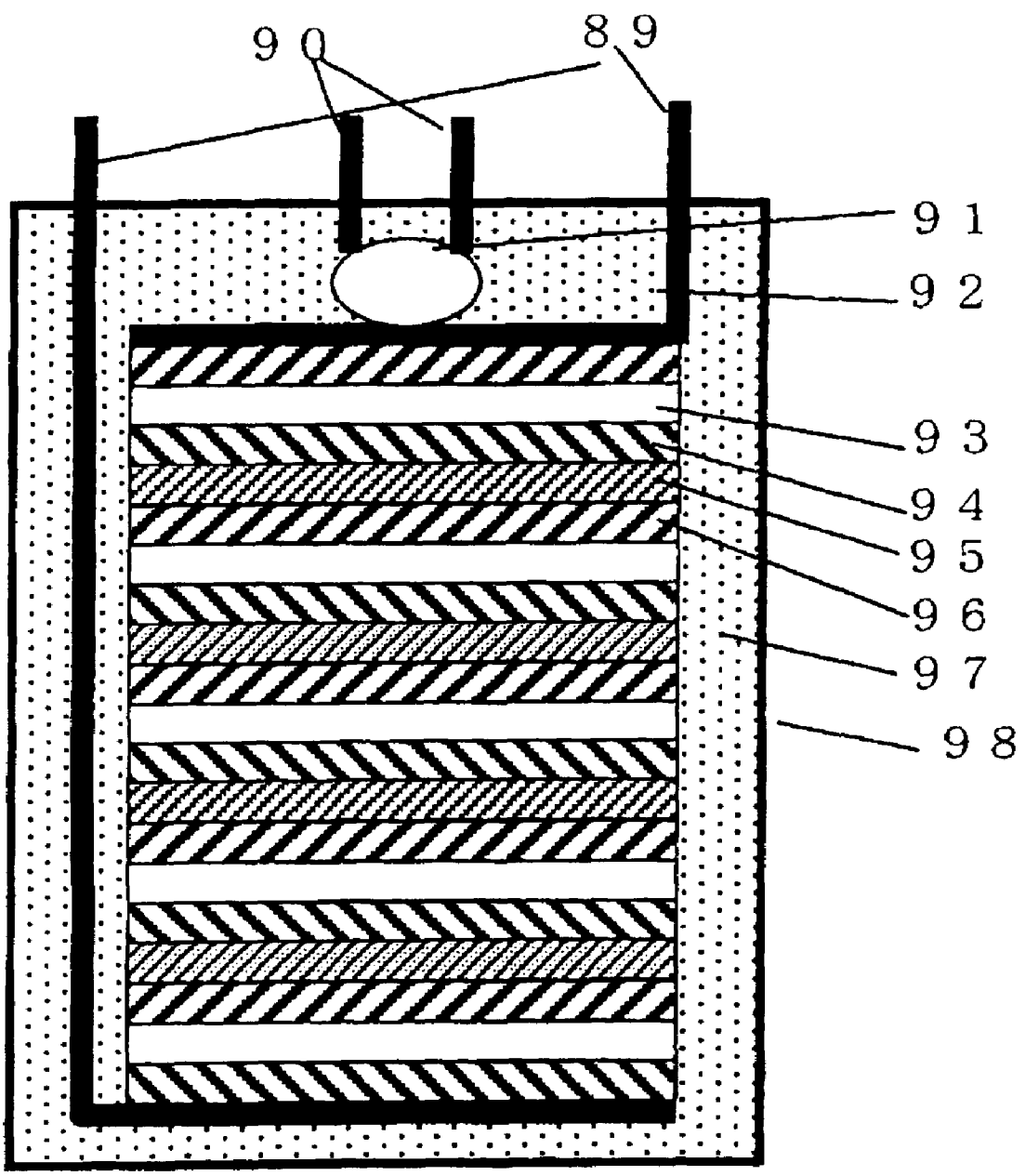
FIG. 5 is a view showing one example of a structure of a thermal battery.

FIG. 5 shows one example of a structure of a thermal battery employed in the present invention. In the same figure, a positive electrode 94, an electrolyte 95, a negative electrode 96 and a heat generating agent 93 correspond to one cell, and they are laminated to obtain a prescribed voltage. A cell group, together with a thermal insulation material 97 and a squib 91 are inserted and held, and sealed in a metal container 98. When current is carried to a terminal for ignition 90 led out to the outside of the metal container 98, the squib fires, the heat generating agent 93 starts combustion and a temperature of the inside of the thermal battery increases. This heat melts the electrolyte 95, which allows electric power to be taken out from the output terminal 89 through a current collector 92.

A thermal battery is a reserve battery (battery which can be stored for a long period and can be used immediately when needed) which employs an "inorganic salt electrolyte which is a non-conductive solid at room temperature" and an "ignition material in an amount large enough to supply thermal energy to melt electrolyte" as its essential constituent materials. Since its volume energy density is high, it is relatively small-sized compared to the required electric power. This thermal battery ignites the fusehead 91 by adding energy from an external energy source to the internal squib 91, ignites the heat generating agent 93 with it as an ignition source, and melts the electrolyte 95 to generate conductivity. The battery is thus activated so as to supply high electromotive force in a short time period. The storage life of a thermal battery is longer than 10 years in an inactive state. The discharge capacity of this thermal battery depends mainly on the chemical reaction or structure of the thermal battery, and are determined by various requirements when used. Although a thermal battery becomes a condition in which discharge is possible once activated, when the entire heat generating agent inside the thermal battery finishes an exothermic reaction, the molten electrolyte 95 (heat generating agent 93) solidifies to turn into an operation stop state, that is, a state in which discharge is impossible (for example, see JP H05-182674A).

A system in which calcium is employed for a negative electrode and calcium chromate for a positive electrode as active materials of a thermal battery is well known and furthermore, a thermal battery for high capacity and high power, in which lithium or lithium alloy is employed for a negative electrode and sulfide or oxide for a positive electrode has also been developed. As lithium alloy, the alloy which is made from lithium and other materials such as boron, aluminum, silicon, gallium and germanium can be employed.

For a positive electrode, iron, sulfide and oxide of nickel, chromium, cobalt, copper, tungsten, molybdenum or the like are frequently employed, and these materials have high electromotive force and energy density. Furthermore, a material which has improved thermostability or discharge characteristic by using a complex compound of these metals or partially doping lithium ion is sometimes employed.

For electrolyte, while eutectic salt of LiCl-59 mol % and KCl-41 mol % is generally employed, other molten salts which have high ion conductivity, such as KBr—LiBr—LiCl system, LiBr—KBr—LiF system and LiBr—LiCl—LiF system are also available, and sometimes used with no fluidity by mixing with insulator powders such as kaolin, oxidation magnesium, oxidation boron and oxidation zirconium. Electrolyte is an ion conductor when a thermal battery operates and at the same time acts as a separator of a positive electrode and a negative electrode.

As a heat generating agent, the mixture of iron powder and potassium perchlorate is generally employed by forming and laminating alternately with a unit cell. A heat generating agent produces oxidation reduction reaction by igniting when a battery is activated, generates heat and heats the inside of the battery to its operation temperature. This heat generating agent contains iron in excess than a required amount for exothermic reaction, maintains high conductivity even after exothermic reaction, and also acts as a connector between adjacent unit cells.

In addition, as an ignition means to the heat generating agent, other than energization as described above, means by tension and shock application are also available.

It is to be noted that it is impossible to be judged whether a thermal battery is unused or used from its appearance. Consequently, it is preferable that a thermal battery is provided with a use condition judgment means by attaching a label which changes color according to a temperature (thermo label) to the outside of the thermal battery; incorporating a fuse which blows out at a prescribed temperature inside the thermal battery; or the like, utilizing the characteristic that the temperature increases when the thermal battery is activated, since the judgment whether the thermal battery is unused or used becomes possible by visual observation or a electric means with the result that inappropriate uses such as leaving a used thermal battery mounted can be prevented.

Next, a description will be given for an electronic control system of the invention of this application, which drives an actuator on conveyance operation based on an electrical signal; and makes adjustments such as acceleration/deceleration and movement direction of the conveyance, taking an automobile as an example. Here, a description is given for a so-called by-wire-type control device.

Figure 1:
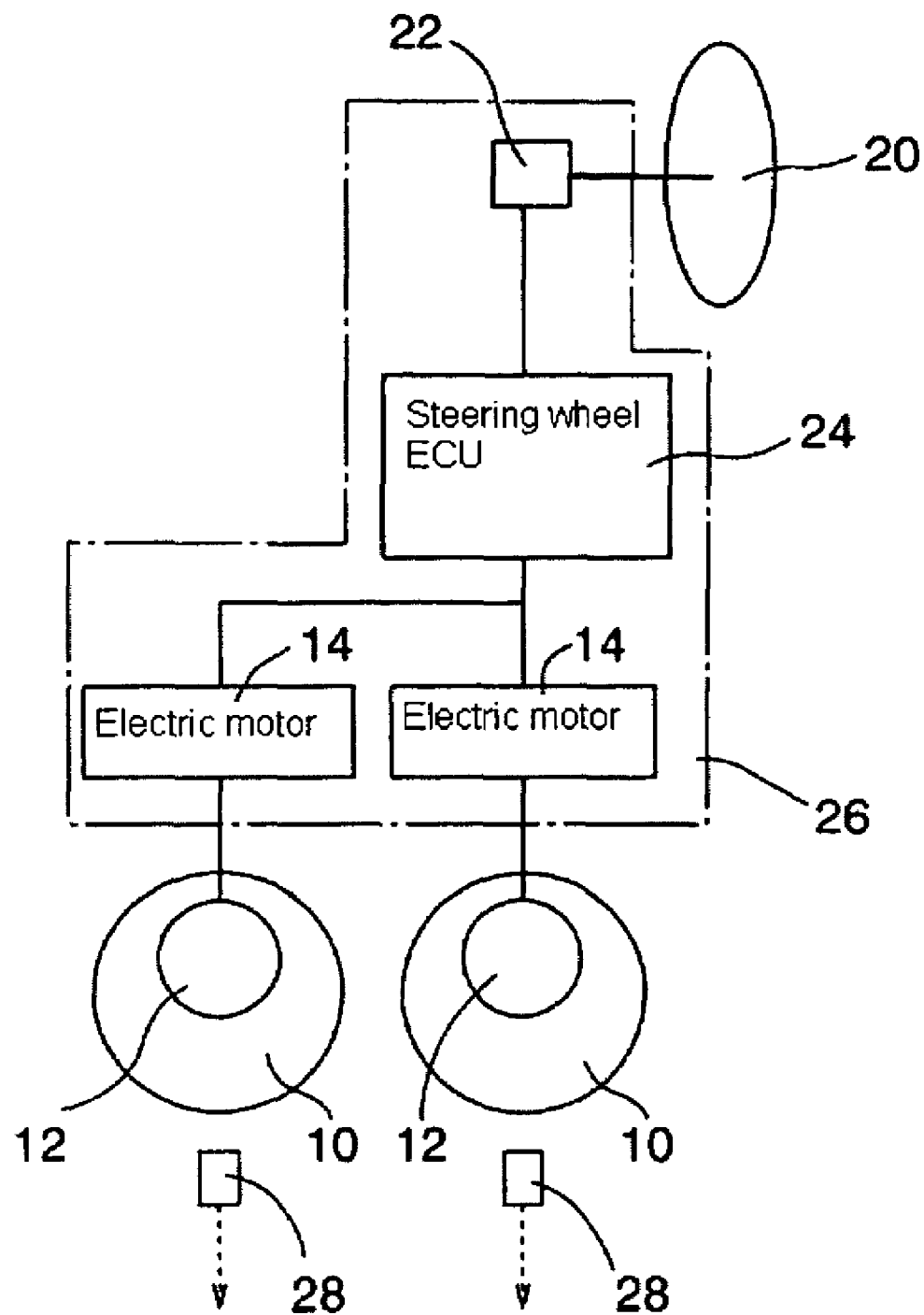
FIG. 1 is a frame format showing a structure of an automobile which is provided with a by-wire-type steering control means.

FIG. 1 is a frame format showing a structure of a vehicle which is provided with a by-wire type steering control device. When operating a steering wheel 20, the displacement amount (rotation amount) of the steering wheel is transmitted to a displacement amount sensor 22, and an electrical signal depending on the displacement amount is input into a steering wheel electronic control unit 24 (hereinafter, referred to as steering wheel ECU 24). Depending on this input signal, the steering wheel ECU 24 emits an electrical output signal to an electric motor 14 for moving a steering 12 for controlling the direction change of a wheel (front wheel) 10. The electric motor 14 performs a prescribed operation depending on this output signal from the steering wheel ECU and changes the direction of the steering 12 to turn the wheel 10 around and to change the traveling direction of the vehicle. The displacement amount sensor 22, the steering wheel ECU 24 and the electric motor 14 compose a control device 26.

The displacement amount sensor 22 is a device for detecting the rotation amount of the shaft of the steering wheel, and a device which can generate an electrical signal depending on the rotation amount. The steering wheel ECU 24 is a type of computer provided with a ROM, a RAM, input/output circuits and their connecting wires, and a device which sends an electrical signal to the electric motor 14 for deciding the direction change amount of the steering 12 depending on an output signal of the displacement amount sensor 22 depending on the rotation amount of the steering wheel 20.

If a detection signal of a speed sensor 28 for detecting the rotation speed of the wheel 10 can be input into the steering wheel ECU 24, it is frequently preferable when another control is performed since the travel speed of the vehicle can be detected.

Figure 2:
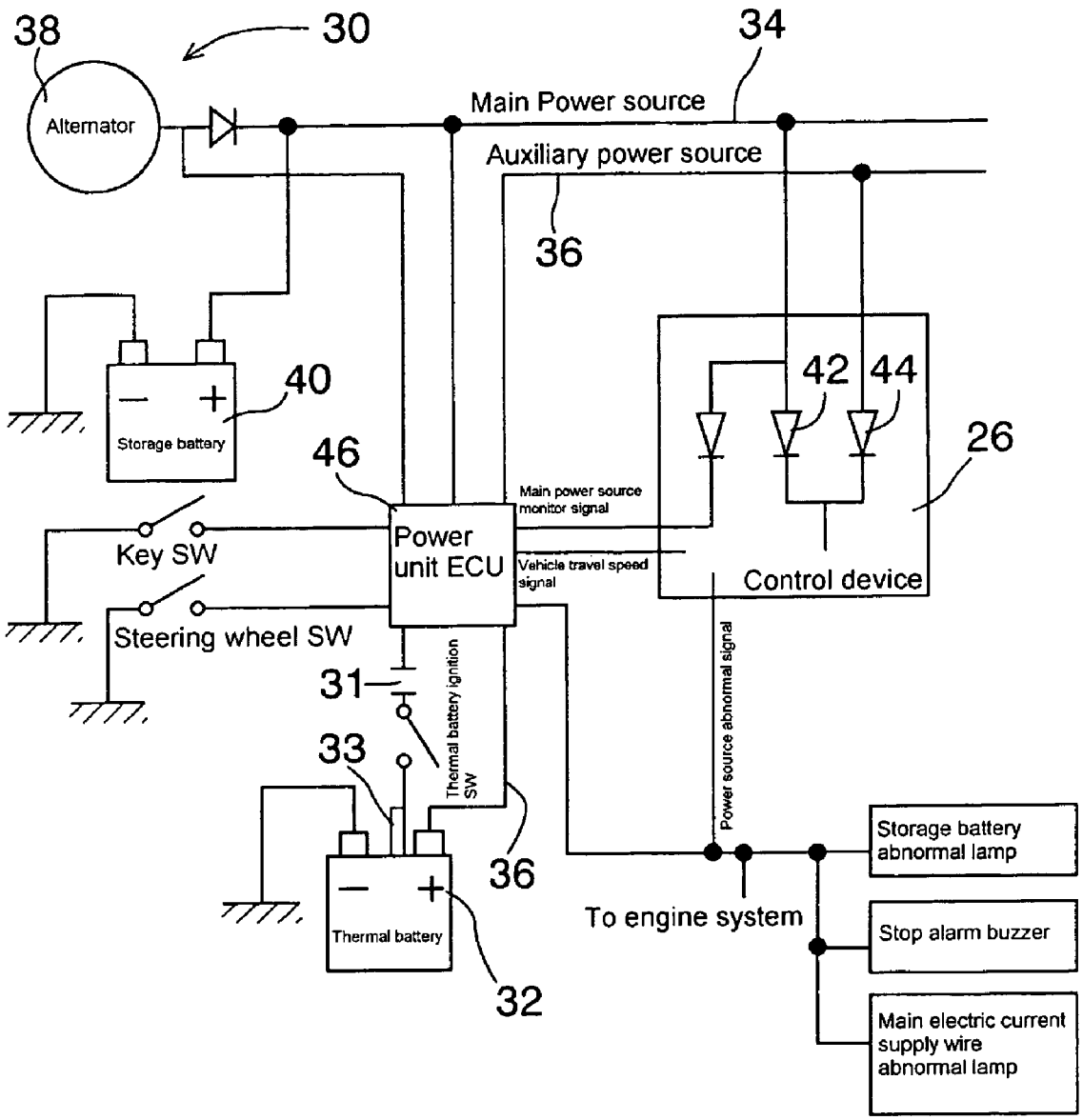
FIG. 2 is a structural diagram of a power unit for conveyance which contains a control device 26.

FIG. 2 is a structural diagram of a power unit for conveyance containing the control device 26 shown in FIG. 1. To the control device 26, a main power unit 30 (main power source) composed of an alternator 38 which is an on-vehicle generator and a storage battery 40 is connected through a main electric current supply wire 34, and a thermal battery 32 which becomes a stand-by power source is connected through a auxiliary electric current supply wire 36. Diodes 42, 44 protect the main power unit 30 connected to the control device 26 through the main electric current supply wire 34 from reverse electric current flow (electric current flow to the main power unit 30 when the thermal battery 32 is activated). Furthermore, voltage of the main power unit 30 is partially output from the control device 26 to a power unit electronic control unit 46 (hereinafter, referred to as a power unit ECU 46) (hereinafter, this voltage is referred to as a main power source monitor signal).

Figure 3:
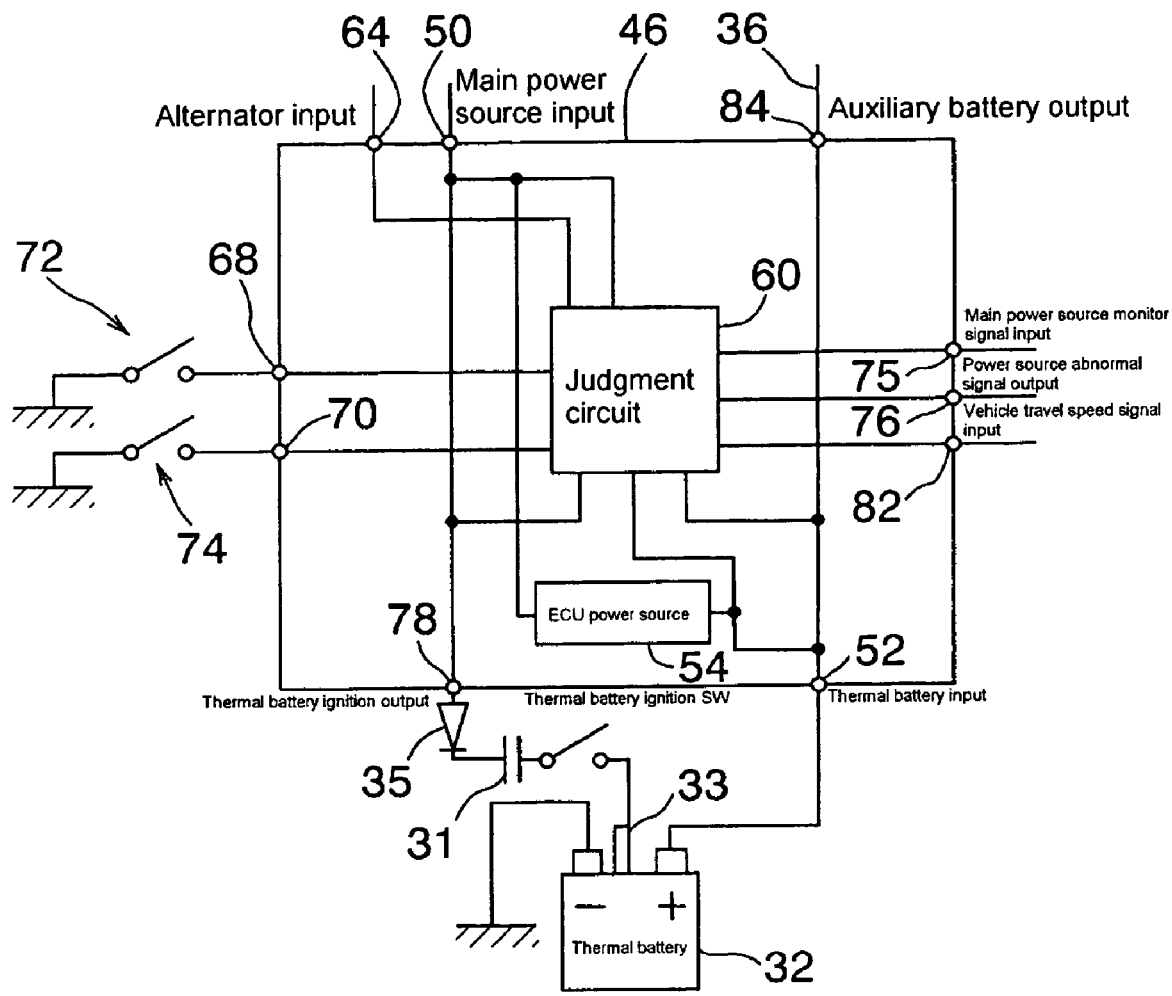
FIG. 3 is a view showing a circuit structure of a power unit ECU 46.

FIG. 3 is a view showing a circuit structure of the power unit ECU 46. A voltage of the main power unit 30 composed of an alternator 38 and a storage battery is input into an input terminal 50 of the power unit ECU 46. It is to be noted that the main power unit 30 branches from the main electric current supply wire 34 and is connected to the power unit ECU 46 in FIG. 2, but the main electric current supply wire 34 can also be connected to the power unit ECU 46 directly. The thermal battery 32 is connected to an input terminal 52 of the power unit ECU 46, and voltage of the thermal battery 32 in an activated state is input into the input terminal 52 (The voltage of the thermal battery 32 is zero in a non-activated state).

A power source for driving the power unit ECU 46 is an ECU power source 54. This ECU power source 54 is connected to the main power unit 30 and the thermal battery 32 through the input terminals 50, 52, and can be supplied electric current from at least either one of the main power unit 30 or the thermal battery 32 when activated. When abnormality of the main power unit 30, abnormality of the main electric current supply wire 34 or the like is detected by operation of the power unit ECU 46, the thermal battery 32 is activated so as to start electric current supply to the control device 26. The thermal battery 32 is activated through thermal battery ignition output of the power unit ECU 46.

In order to judge whether the thermal battery needs activation or not, the power unit ECU 46 is provided with a judgment circuit 60. The judgment circuit 60 is a type of computer, and a voltage of the main power unit 30 is input through the input terminal 50. Furthermore, not only voltage of the main power unit 30 but also voltage only of the alternator 38 which is a part of the main power unit 30 is input through an input terminal 64 as shown in FIG. 3. It is to be noted that voltage only of the storage battery 40 which is a part of the main power unit 30 can also be input through the input terminal 64.

Furthermore, a key switch 72 for judging whether an ignition key of the vehicle is at an operation position or not is connected to the power unit ECU 46 through an input terminal 68. Furthermore, a steering wheel switch 74 for judging whether a steering wheel has been operated is also connected through an input terminal 70. When the ignition key of the vehicle is at an operation position, the key switch 72 closes and emits an ON signal. This ON signal allows various devices of the vehicle, for example, the electric motor 14 to operate, for example, by a relay or the like. When the steering wheel 20 is handled in this state, the electric motor 14 operates and changes the direction of the steering 12.

By handling the steering wheel 20, the steering wheel switch 74 emits a signal depending on its handled amount. This signal allows the electric motor 14 to operate by a relay or the like, and the direction of the wheel 10 is changed by an amount equivalent to the signal. Since the voltage of the main power unit 30 is applied to the input terminal 50 of the control device 26 apart from the key switch 72 and the steering wheel switch 74, even when the key switch 72 is not ON, the steering 12 can be operated if the steering wheel 20 is handled.

Furthermore, the power unit ECU 46 is provide with an input terminal 75 for receiving a voltage signal (main power source monitor input) which is a part of voltage of the main power unit 30, passing through the control device 26. The input terminal 75 then connects to the judgment circuit 60. This allows the power unit ECU 46 to judge through the input terminal 75 that voltage from the main power unit 30 is applied to the control device 26.

In the meanwhile, the control device 26 operates when the voltage is applied from the main power unit 30 to the control device 26 whereas the control device stops operation when the voltage application from the main power unit 30 to the control device 26 stops because of failure of the main power unit 30 or disconnection of the main electric current supply wire 34 connecting the main power unit 30 to the control device 26, with the result that a by-wire type control means (steering wheel in this case) stops operation. Major damage is unlikely to occur while the vehicle is stopping whereas the vehicle becomes out of control while the vehicle is traveling.

In order to prevent such a situation, a thermal battery is provided as an auxiliary power source. In the power unit ECU 46 shown in FIG. 3, to its output terminal 78, the thermal battery 32 is connected through a condenser 31 and a thermal battery ignition switch. Furthermore, a diode 35 is connected between the output terminal 78 and the condenser 31, and such a structure preferably stops flow of electric charge stored in the condenser 31 to the main power source input 50. In this device, when the voltage application to the control device 26 from the main power unit 30 stops, electric energy stored in the condenser 31 (stored by the main power unit 30 or the ECU power source 54) is applied to a terminal for ignition 33 of the thermal battery 32 by turning a thermal battery ignition switch ON (turning opening contact to closed contact) so as to activate the thermal battery. It is to be noted that this example relates to the case in which the condenser 31 and the thermal battery ignition switch are employed, but is not limited to this method as long as other methods can apply electric energy to the terminal for ignition 33 of the thermal battery 32 selectively.

The input terminal 52 of the power unit ECU 46 to which output of the activated thermal battery 32 is connected, is connected to an output terminal 84 of the power unit ECU 46, and the output terminal 84 is connected to the control device 26 through the auxiliary electric current supply wire 36. Even if the voltage application from the main power unit 30 should stop, electric power is immediately supplied from the thermal battery 32, which is an auxiliary battery, and the control device 26 can operate so that the vehicle will not become out of control. It is to be noted that since the operating time of the thermal battery 32 is ordinarily about several minutes to over ten minutes, the vehicle becomes out of control again unless the vehicle stops safely within a prescribed time after the activation of the thermal battery 32. Consequently, it is preferable that an output terminal 76 for power source abnormal signal output is provided, and that the vehicle has warning means for giving warning to a lamp, a buzzer, recorded voice or the like which requires the driver to stop the vehicle in a safe place since the thermal battery 32 is activated based on this signal.

It is to be noted that since whether the vehicle is traveling or not can be detected by inputting a signal which has detected the rotation speed of the wheel 10 into another input terminal 82 provided in the power unit ECU 46, it is preferable, for example, that a travel state detection means employed such a structure is provided and that a warning means for informing the driver of abnormality when abnormality occurs in a stop condition is provided. FIG. 2 shows an example in which a storage battery abnormality lamp 102, a stop alarm buzzer 104 and a main electric current supply wire abnormality lamp 106 for informing abnormality to the driver are provided.

When the power unit ECU 46 is provided with the voltage input terminal 50 of the main power unit 30 and the voltage input terminal 64 of the alternator 38 as shown in FIG. 3 as an example, states of the storage battery 40 estimated from the respective voltage inputs are shown by a table in FIG. 4. "No voltage applied state" shown as OFF in FIG. 4 denotes a state in which there is no voltage input of 12V or more, an open circuit voltage of the storage battery 40. A "voltage applied state" shown as ON in FIG. 4 denotes a state in which there is an input voltage of 12V or more, an open circuit voltage of the storage battery 40. If there is no voltage input from the alternator 38 into the power unit ECU 46, and if there is no voltage input from the main power unit 30 as shown in the first line of FIG. 4, it is judged that the storage battery 40, which is the other power source composing the main power unit 30, is abnormal. Next, if there is no voltage input of the alternator 38 to the power unit ECU 46 but there is voltage input from the main power unit 30 as shown in the second line of FIG. 4, it is judged that the storage battery 40, which is the other power source composing the main power unit 30, is normal. If there is voltage input of the alternator 38 to the power unit ECU 46 as shown in the third and fourth lines of FIG. 4, the state of the storage battery 40, which is the other power source composing the main power unit 30, cannot be judged regardless of whether there is voltage input from the main power unit 30 or not.

Next, a description will be given for a method for judging whether the thermal battery 32 is activated to supply electric current to the control device 26 or not. Taking FIG. 3 for example, the first requirement for activating the thermal battery 32 is that a voltage of a main power source monitor signal should be a prescribed value (the lowest voltage which can drive the control device 26) or under. It is to be noted that although it is more preferable if voltage decrease continuing for about 0.05 to 0.1 sec can be detected regarding momentary voltage drop so that the thermal battery 32 is not be activated, this time period has to be selected carefully since if the time becomes longer, a time during which the vehicle is out of control is likely to be longer. The next requirement is that the vehicle is traveling. This can be detected by detecting revolutions of the wheel with a sensor or the like as described above. It is to be noted that the judgment that the vehicle is traveling is not required any more if the wheel is at a certain speed such that an emergency brake can stop the vehicle although does not stop completely. This is because at least a large-scale accident is unlikely to occur as long as the vehicle stops as is described above. With these two as the requirements, for example, various conditions including with or without input of the key switch 72 can be selected as required.

When at least either one of abnormality of the main power unit 30 or abnormality of the main electric current supply wire 34 is detected, an abnormal signal is output, and electric current is supplied by the activated thermal battery 32, since the thermal battery is available only for a prescribed time period and once, the driver can stop the vehicle in a safe place as quickly as possible while the thermal battery is starting up.

It is to be noted that the thermal battery can start power supply within some hundreds millisecond after an ignition signal is emitted. Furthermore, it is preferable that a thermal battery whose operating time is about several minutes to over ten minutes is selected.

Second Embodiment

There is shown a first preferable structure to solve the problem 1 referring to the accompanying drawings.

Figure 6:
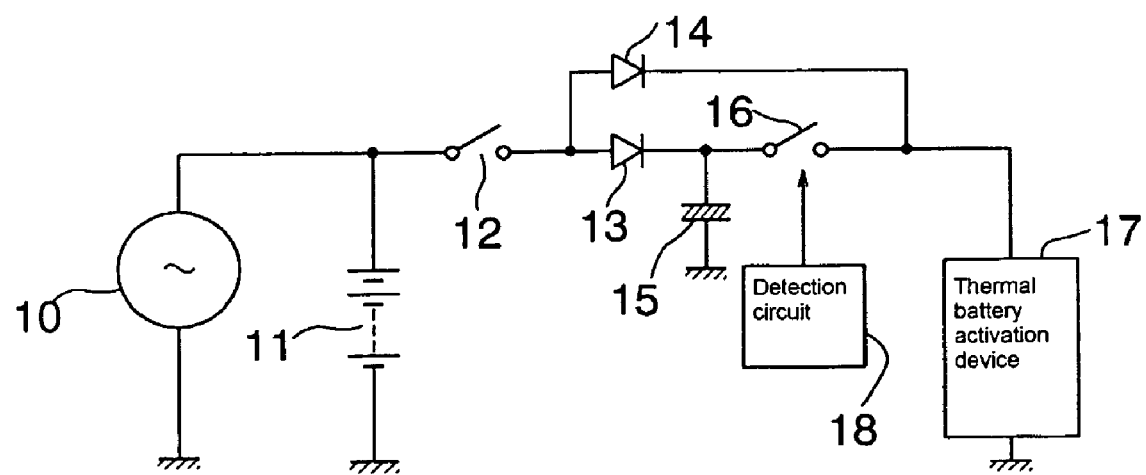
FIG. 6 is a structural diagram showing a first example of a power unit of a second embodiment.

FIG. 6 is a structural diagram showing a first example of a power unit of this structure. A generator 10 and a main storage battery 11, which are the main power sources, are connected to diodes 13, 14 through an ignition switch 12 in the forward direction respectively. When the ignition switch 12 (first switch means) is turned ON (turning to a closed contact), electric current flowing through one diode 13 charges a backup condenser 15 which is a backup power source. The charged backup condenser 15 never discharges by the operation of the diode 13 even when a voltage of the generator 10 and/or the main storage battery 11 decreases. This current discharged from the backup condenser 15 is supplied to a thermal battery activation device 17 through a normally open switch 16 which is a second switch means. At the same time, electric current from the generator 10 and/or the main storage battery 11 is separately supplied to the thermal battery activation device 17 through the diode 14.

The normally open switch 16 is operated by a detection circuit 18 for determining whether to discharge the backup condenser 15 through the thermal battery activation device 17. When the detection circuit 18 determines to discharge the condenser 15, the detection circuit 18 closes the contact of the normally open switch 16 to flow the current discharged from the backup condenser 15 through the thermal battery activation device 17.

Figure 7:
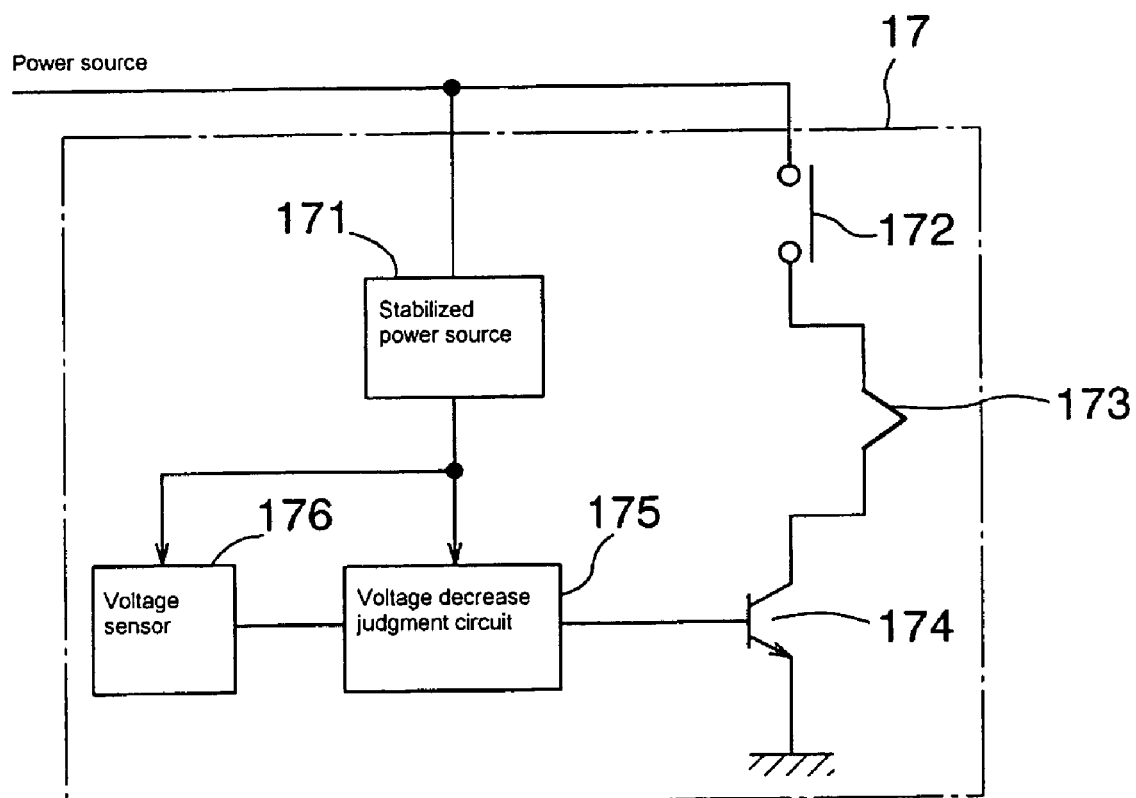
FIG. 7 is a view showing details of a thermal battery activation device 17.

FIG. 7 is a view showing details of the thermal battery activation device 17. The thermal battery activation device 17 is provided with a stabilized power source 171 which uses electric current flowing through the diode 14 and electric current flowing through the switch 16 shown in FIG. 1 as power sources; a voltage sensor 176 for detecting voltage of the generator 10 and/or the main storage battery 11; a voltage decrease judgment circuit 175 which is operated by the voltage sensor 176; a switch 172 for closing a normally open contact, which is a first switch means, by a signal emitted by the voltage decrease circuit 175; and a ignition device for thermal battery activation 173 to which electric current is supplied through the switch 172. It is to be noted that the ignition device 173 is grounded through the transistor 174.

The voltage decrease judgment circuit 175, judging voltage decrease of the generator 10 and/or the main storage battery 11 (ordinarily, both of the generator 10 and the main storage battery 11 are preferable) by the voltage sensor 176, emits a signal for turning ON the transistor 174. That is, when the voltage sensor 176 detects voltage decrease of the generator 10 and/or the main storage battery 11, the voltage decrease judgment circuit 175 judges that the by-wire type control means requires power supplied from a thermal battery for stand-by power source and activates the thermal battery. According to this judged result, the transistor 174 turns ON.

Here, a power source of the voltage decrease judgment circuit 175 and the voltage sensor 176 is the stabilized power source 171.

Figure 8:
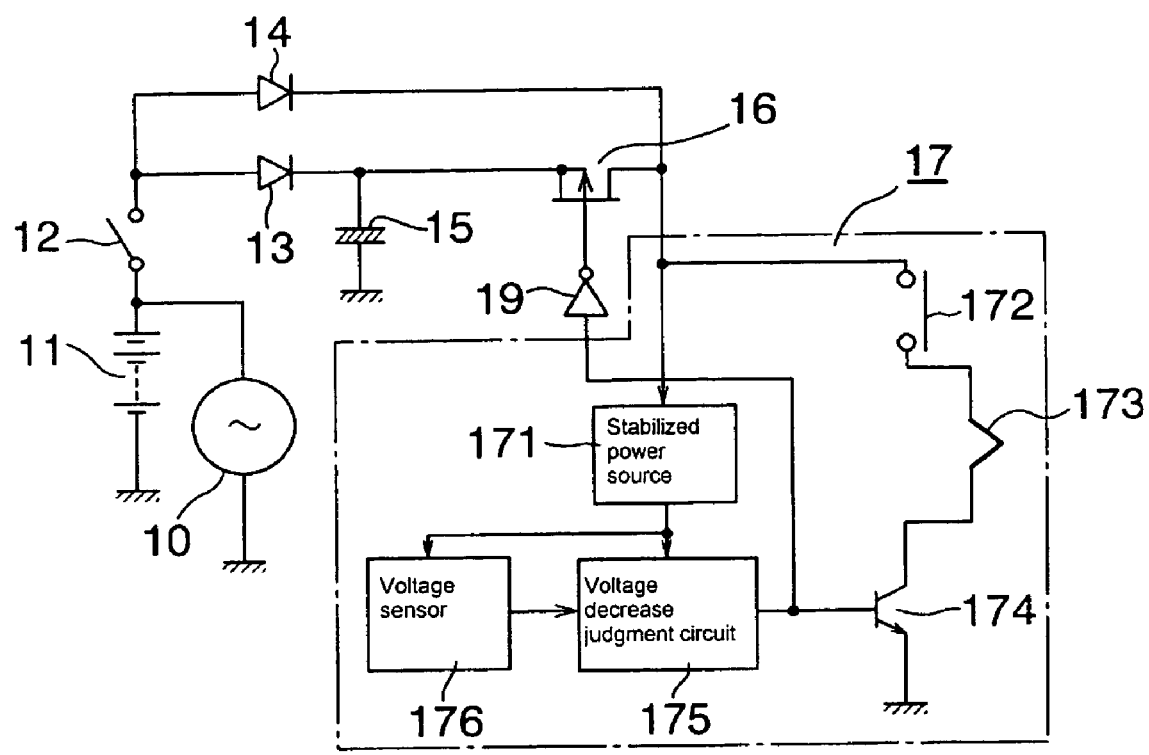
FIG. 8 is a view showing details of a first example of the second embodiment.

FIG. 8 shows the practical example of FIG. 6 in further detail. In FIG. 8, the normally open switch 16, which is the second switch means, is composed of P-channel FETs. The thermal battery activation device 17 inverts an output signal which the voltage decrease judgment circuit 175 emits caused by voltage decrease of the generator 10 and/or the main storage battery 11 detected by the voltage sensor 176, by the inverter 19, and supplies the output signal to an FET gate composing the switch 16. When the voltage sensor 176 does not detect voltage decrease of the generator 10 and/or the main storage battery 11, the voltage decrease judgment circuit 175, without emitting an output signal, keeps output from the voltage decrease judgment circuit 175 to a low level, gives a high-level signal to the FET gate to keep the normally open switch 16 opened.

Then, when the voltage sensor 176 detects voltage decrease of the generator 10 and/or the main storage battery 11, the output from the voltage decrease judgment circuit 175 reaches high level; output of the inverter 19 is inverted to low level; and the FET closes the normally open switch 16. At the same time, the switch 172 is also closed.

As described above, the thermal battery for stand-by power source of the movable body device according to the present invention is a primary battery, which cannot be reused after used once. Therefore, it is required for the thermal battery to be activated reliably when the thermal battery requires activation. At the same time, it is more preferable to provide a protective circuit to prevent activation of the thermal battery by malfunction. For such a protective circuit, it is preferable that a signal indicating that a movable body is traveling, for example, tire revolutions for a vehicle and speed on a speedometer for other movable bodies, is input into the thermal battery activation circuit, and that the thermal battery is activated when voltage of the generator 10 and/or the main storage battery 11 decreases and the signal indicating that the movable body is traveling is input.

In the movable body device of the present invention, since an output signal is not emitted in the voltage decrease judgment circuit 175 of the thermal battery activation device 17 in a state that the generator 10 and/or the main storage battery 11 of the movable body functions normally, both the normally open switch 174 which is the first switch means and the normally open switch 16 which is the second switch means become OFF state (opening contact). In this state, when the movable body is traveling, that is, the ignition switch 12 is ON (turning to closed contact), the backup condenser 15 is charged by the generator 10 and/or the main storage battery 11 as described above. Since the backup condenser 15 is not connected to the thermal battery activation device 17 in this state, this backup condenser 15 can hold a prescribed charge voltage.

Furthermore, as described above, even when the voltage of the generator 10 and/or the main storage battery 11 decrease, this backup condenser 15 does not discharge to the diode 13. Even in this case, however, the thermal battery activation device 17 can continue operation by receiving voltage directly supplied from the generator 10 and/or the main storage battery 11 through the diode 14.

When a vehicle is taken as an example, the voltage of the generator 10 and/or the main storage battery 11 decreases (preferably both voltages of the generator 10 and the main storage battery 11 decrease) and the vehicle is more preferably traveling, the normally open switch 172 which is the first switch means is turned ON (closed contact) by an output signal of the voltage decrease judgment circuit 175, and at the same time, the output from the voltage decrease judgment circuit 175 reaches high level to turn ON the transistor 174. Since the output signal of the voltage decrease judgment circuit 175 turns ON (closed contact) the normally open switch 16 which is the second switch means in this case, the electric charge stored in the backup condenser 15 flows to the ignition device 173 of the thermal battery activation device 17 to activate the thermal battery so as to operate by-wire type control of a vehicle (movable body) provided with a by-wire type control means for a certain amount of time. When the thermal battery is activated, unless the vehicle (movable body) is stopped in a safe place within a time period that the by-wire type control means can be operated, the by-wire-type control means cannot be reoperated after a certain period of time. Therefore, it is more preferable to provide a system for give warning to a driver of the movable body by a buzzer, a lamp, recorded voice or the like at the same time when the thermal battery is activated.

Figure 9:
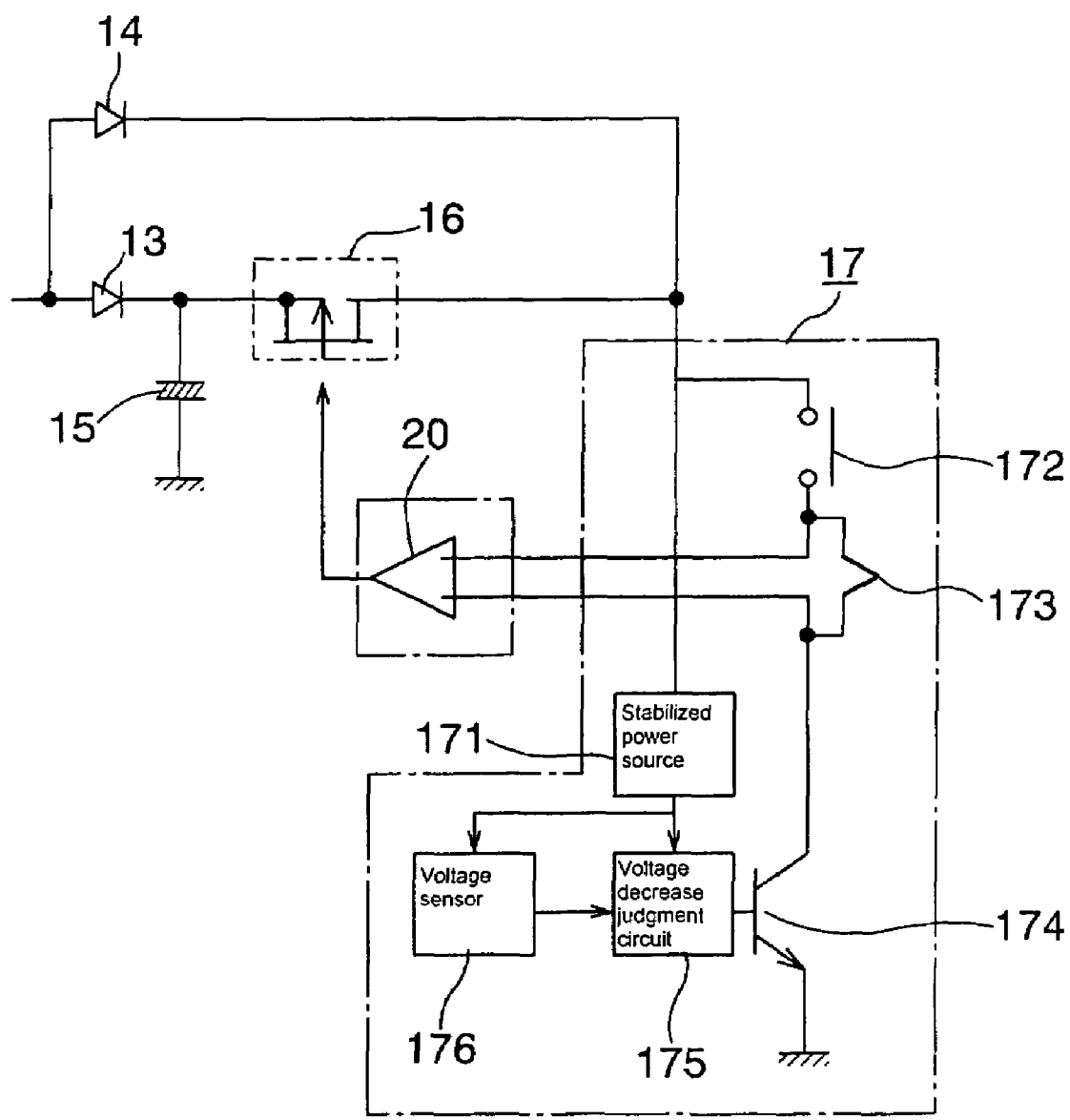
FIG. 9 is a structural diagram showing a second example of the power unit of the second embodiment.

FIG. 9 is a structural diagram showing a second example of the power unit of this structure. In FIG. 9, the voltage generated between both ends of the ignition device 173 is detected by a differential amplifier 20. The output of this differential amplifier 20 turns ON (closed contact) the normally open switch 16 which is the second switch means. That is, unless the voltage of the generator 10 and/or the main storage battery 11 of the movable body decrease, electric current does not flow through the ignition device 173 since the transistor 174 together with the normally open switch 172 which is the first switch means in the thermal battery activation device 17 are OFF. At the same time, since the differential amplifier 20 does not detect voltage, its output keeps a low level and the normally open switch 16 which is the second switch means, keeps OFF (opening contact).

In contrast, when the voltage of the generator 10 and/or the main storage battery 11 of the movable body, the normally open switch 172 which is the first switch means and the transistor 174 are turned ON by the voltage decrease judgment circuit 175, electric current flows through the ignition device 173 to increase the voltages of both ends thereof, the output of the differential amplifier 20 reaches high level, thereby electric charge stored in the backup condenser 15 flows through the ignition device 173.

Figure 10:
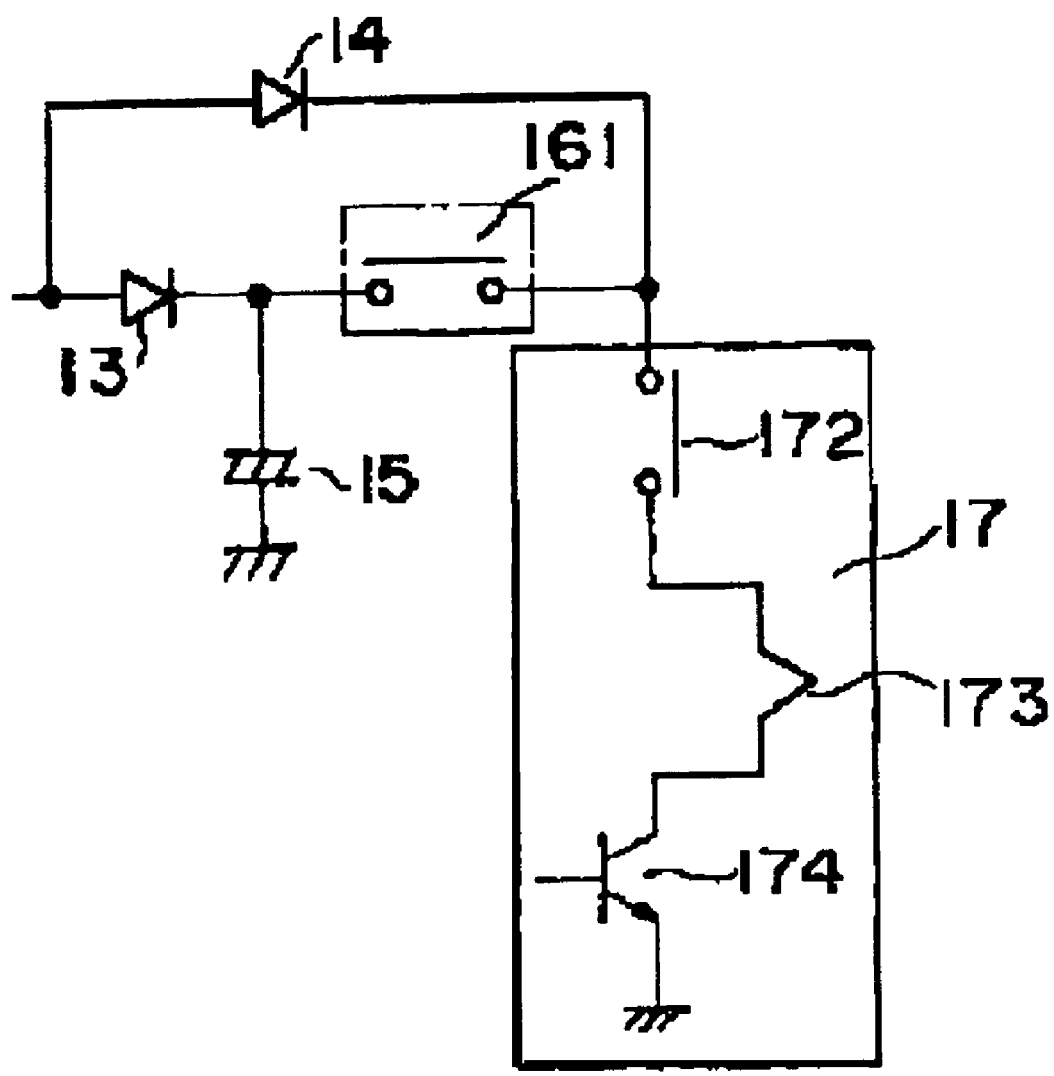
FIG. 10 is a structural diagram showing a third example of the power unit of the second embodiment.

FIG. 10 is a structural diagram showing a third example of the power unit of this structure. It is to be noted that FIG. 10 omits the stabilized power source 171 for operating the normally open switch 172 which is the first switch means, the voltage decrease judgment circuit 175 and the voltage sensor 176. A switch 161, which is the second switch means shown in FIG. 10, is composed of a switch which is turned ON by voltage decrease of the generator 10 and/or the main storage battery 11, similarly to the transistor 174. Consequently, the switch 161 combines a function to determine whether energy stored in the backup condenser 15 flows through the thermal battery activation device 17 and a function to switch energy stored in the backup condenser 15. This switch 161 functions as the second switch means and a connection control means independently. This embodiment is advantageous in that the circuit becomes simple.

Figure 11:
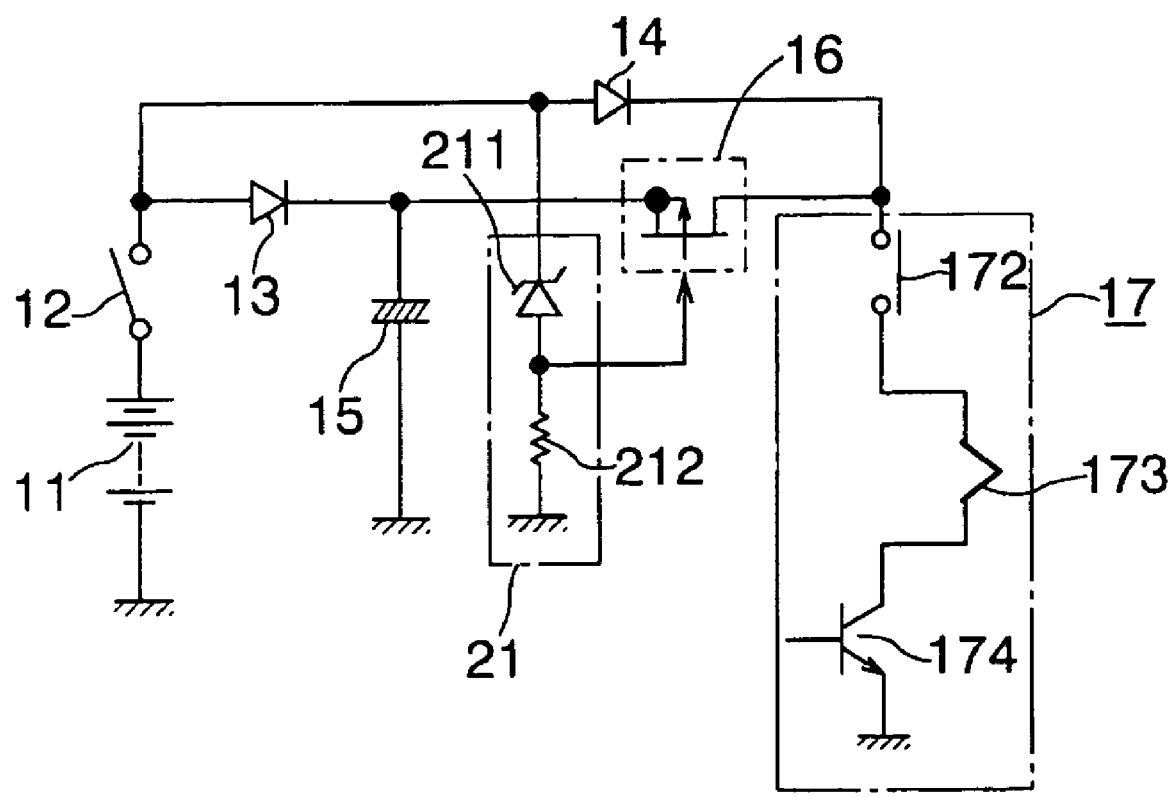
FIG. 11 is a structural diagram showing a fourth example of the power unit of the second embodiment.

FIG. 11 is a structural diagram showing a fourth example of the power unit of this structure. FIG. 11, similarly to FIG. 10, omits the stabilized power source 171 for operating the normally open switch 172 which is the first switch means, the voltage decrease judgment circuit 175 and the voltage sensor 176. In the fourth practical example, a voltage monitoring circuit 21 is located on the input side of the diode 14. The voltage monitoring circuit 21 is composed of a zener diode 211 connected to the input side of the diode 14 and a resistor 212 provided on the ground side of this zener diode 211. The voltage monitoring circuit 21 monitors the voltages of the generator 10 and the main storage battery 11. When the voltages of the generator 10 and the main storage battery 11 is kept high enough to operate the thermal battery activation device 17 normally, the switch 16 which is the second switch means is kept OFF (opening contact) by a voltage signal obtained by the zener diode 211 and the resistor 212.

When the voltages of the generator 10 and the main storage battery 11 decreases to a voltage in which the thermal battery activation device 17 cannot operate normally, for example the case in which the voltages of the generator 10 and the main storage battery 11 decrease to a prescribed value or less, the case in which a cable connected to the generator 10 and/or the main storage battery 11 disconnect, or the like, electric current which flows through the resistor 212 decreases, the voltage between its terminals decreases, and the switch 16 turns ON so that electric charge stored in the backup condenser 15 flows through the thermal battery activation device 17.

Figure 12:
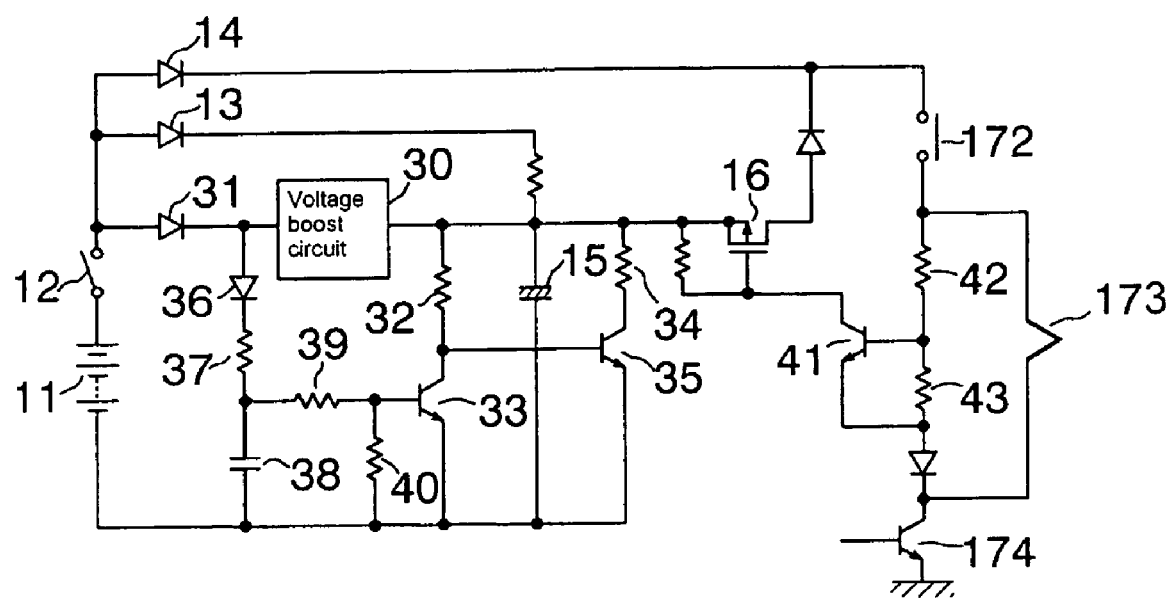
FIG. 12 is a structural diagram showing a fifth example of the power unit of the second embodiment.

FIG. 12 is a structural diagram showing a fifth example of the power unit of this structure. This figure, similarly to FIG. 10 and FIG. 11, omits the stabilized power source 171 for operating the normally open switch 172 which is the first switch means, the voltage decrease judgment circuit 175 and the voltage sensor 176. In the fifth practical example, a discharge control circuit for flowing electric charge stored in the backup condenser 15 to the thermal battery activation device 17 in a prescribed amount of time after the voltages of the voltage boost circuit 30, the generator 10 and the main storage battery 111 become zero.

In the voltage boost circuit 30, electric current flows from the generator 10 and/or the main storage battery 11 through the diode 31, and electric current flows to the backup condenser 15 through this voltage boost circuit 30. That is, the voltage boost circuit 30 increases the voltage of the generator 10 and/or the main storage battery 11 and then charges the backup condenser 15. It is to be noted that, in this practical example, the voltage boost circuit 30 can have a small capacity since the diodes 13, 31, 36 prevent the backup condenser 15 from discharging.

This voltage boost circuit 30 allows energy enough to operate the thermal battery activation device 17 to be stored in the backup condenser 15 even when the voltage of the generator 10 and/or the main storage battery 11 decreases. This voltage boost circuit 30 can be composed of a DC-DC converter, a charge pump or the like which is heretofore known.

Output from the voltage boost circuit 30 is grounded by a resistor 32 and a transistor 33 and by a resistor 34 and a transistor 35. The transistor 35 is parallelly connected to the backup condenser 15, and a circuit having these transistors 33, 35 composes a discharge control circuit.

The electric current which has passed through the diode 31 is grounded through the diode 36, the resistor 37 and the condenser 38. At the same time, the electric current which has branched from the resistor 37 and the condenser 38 flows to a base of the transistor 33 through the resistor 39. Here, the base of the transistor 33 is grounded through the resistor 40. As a result, output voltage from the generator 10 and/or the main storage battery 11 is applied to the base of the transistor 33 through a CR circuit composed of the condenser 38, the resistor 39 and the resistor 40. Then by turning ON this transistor 33, a base of the transistor 35 becomes a ground potential and turns OFF, so that a discharge circuit of the backup condenser 15 is shut off.

In other words, by turning the ignition switch 12 ON, charge voltage from the generator 10 and/or the main storage battery 11 is applied to the condenser 38. Depending on this charge of the condenser 38, base potential of the transistor 33 increases and the conduction of this transistor 33 become controlled. Here, the voltage increased in the voltage boost circuit 30 is applied to the backup condenser 15. Consequently, if resistance value of the resistor 32 serially connected to the transistor 33 is set at a relatively high value, discharge from the backup condenser 15 through the resistor 32 can be suppressed.

In the circuit shown in FIG. 12, when voltage of the generator 10 and/or the main storage battery 11 becomes zero, including the case in which the ignition switch 12 is OFF, electric charge stored in the condenser 38 is discharged through the resistor 39 and the resistor 40. Consequently, the transistor 33 turns OFF in a prescribed amount of time after voltage of the generator 10 and/or the main storage battery 11 becomes zero (this prescribed amount of time is determined by the condenser 38, the resistor 39 and the resistor 40). When this transistor 33 turns OFF, electric charge charged in the backup condenser 15 elevates base potential of the transistor 35 through the resistor 32 to control the conduction of the transistor 35. At the same time, electric charge charged in the backup condenser 15 is discharged through the resistor 34 and the transistor 35. Consequently, when the ignition switch 12 turns OFF, for example, when the vehicle stops, electric charge charged in the backup condenser 15 is discharged in a prescribed amount of time, which prevents energy which can start up the thermal battery activation device 17 from remaining stored in the backup condenser 15.

According to the practical example shown in FIG. 12, by preventing discharge from the backup condenser 15 normally, miniaturization of the backup condenser 15, reduction in capacity of the voltage boost circuit 30 and the like can be achieved whereas operation of the thermal battery activation device 17 can be prevented when there is no need for activating the thermal battery, that is, when the ignition switch 12 is OFF or the like with the result that reliability for preventing malfunction of the movable body device provided with the by-wire-type control means of the present invention can be improved.

Furthermore, in this practical example, ON and OFF of the switch 16 is controlled by the transistor 41. A voltage from the connection point between the resistor 42 and the resistor 43 is supplied to a base of the transistor 41. A series circuit of the resistor 42 and the resistor 43 is parallelly connected to the ignition device 173. As a result, voltage generated at both ends of the ignition device 173 is divided by the resistor 42 and the resistor 43, and the divided voltage is given to the base of the transistor 41. Consequently, when electric current flows through the ignition device 173 to increase voltage between both ends thereof, base voltage of the transistor 41 increases and the transistor 41 has continuity with the ignition device 173. By turning ON the transistor 41, a gate of the switch 16 which is the second switch means is grounded to turn ON, and electric current flows from the backup condenser 15 to the ignition device 173. The operation principle of the switch 16 which is the second switch means described above, is similar to the example shown in FIG. 9, but is not limited to the second practical example. Electric current to the ignition device 173 can also be detected by the structure combining the transistor 41, the resistor 42 and the resistor 43 as described in this fifth practical example.

It is to be noted that although both of the practical examples of the above embodiment relate to the case in which the switch 16 which is the second switch means is composed of a P-channel FET, the normally open switch 16 which is the second switch means can also be composed of a bipolar transistor, a N-channel FET, a relay circuit or the like in addition.

Third Embodiment

There is shown a second preferable structure to solve the problem 1 referring to the accompanying drawings.

Figure 13:
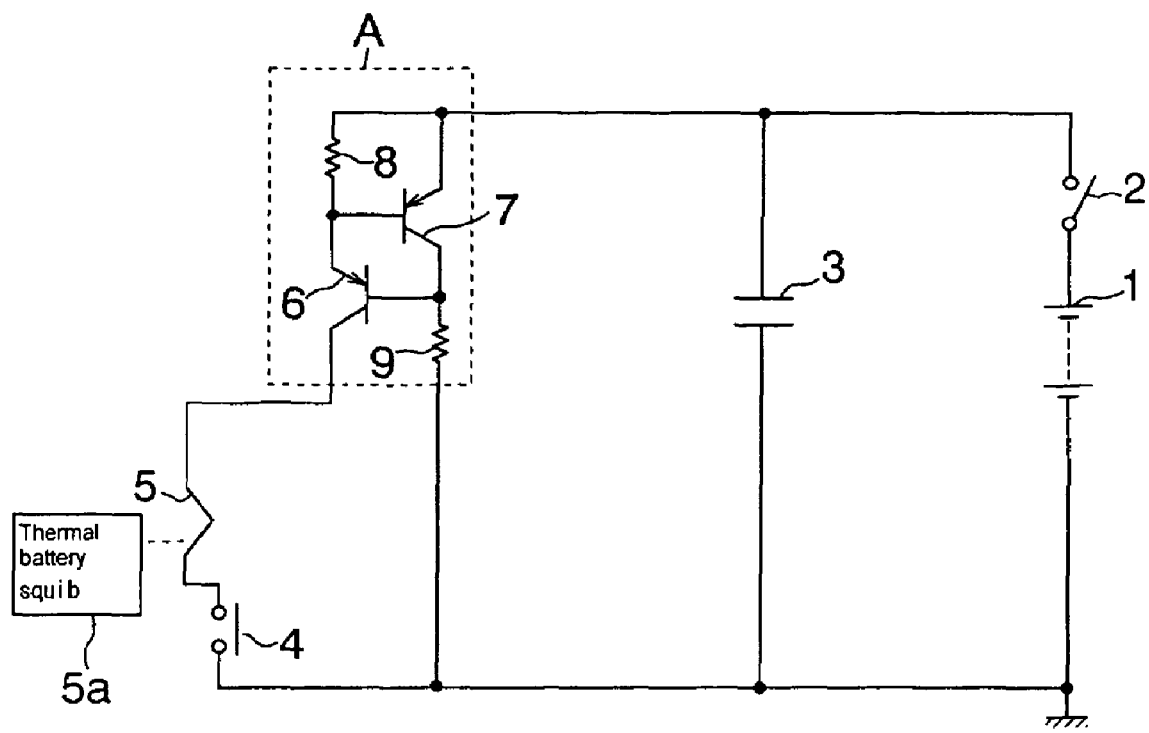
FIG. 13 is a structural diagram showing a first example of a power unit of a third embodiment.

FIG. 13 is a view showing one example of a circuit of a thermal battery squib ignition device of this structure. This circuit is provided with a main storage battery 1 and an ignition switch 2 which are serially connected and a backup condenser 3 which is parallelly connected. The backup condenser 3 is charged by the main storage battery 1 by operating the ignition switch 2 (closing a contact).

A constant current circuit A is connected to a power source unit which is provided with the main storage battery 1, the ignition switch 2 and the backup condenser 3 (energy storage means), a prescribed constant current generated in the constant current circuit A flows to a thermal battery squib ignition part 5 for igniting a squib 5a of a thermal battery for stand-by power source. It is to be noted that reference numeral 4 denotes a voltage detection switch (first switch means) for detecting voltage of a generator (not shown) and/or the main storage battery 1 to control energization of the thermal battery fusehead ignition part 5.

Next, a description is given for the constant current circuit A. The constant current circuit A is composed of transistors 6, 7 for controlling the amount of electric current flowing to the thermal battery squib ignition part 5, an electric current detection resistor 8, and a bias resistor 9 for giving current carrying capability to the transistor 6, and the resistors 8, 9 and the transistors 6, 7 are set so that constant current for starting up the thermal battery electric match ignition part 5 reliably can flow.

As described above, when turning the ignition switch 2 ON to close the contact of the switch, the main storage battery 1 charges the backup condenser 3. This backup condenser 3 is a power source for a thermal battery squib ignition for emergency which allows the constant current circuit A to flow electric current through the thermal battery squib ignition part 5 reliably even when a prescribed power cannot be supplied caused by failure or damage of both an alternator (not shown) which is an on-vehicle generator and the main storage battery, removal or disconnection of a generator cable and a main storage battery cable, or the like. It is to be noted that although not shown in FIG. 13, a diode (not shown) is preferably series-connected to the backup condenser 3 so that discharge of the backup condenser 3 can be prevented when voltage of the main storage battery 1 varies.

When the state in which a prescribed power cannot be supplied arises as described above while the vehicle is traveling (detected by tire revolutions detection means including a sensor), that is, the state in which a movable body provided with a by-wire type control means (here denotes a vehicle) cannot supply electric power enough to operate the by-wire type control means, the voltage detection switch 4 turns ON, a power source unit provided with the thermal battery squib ignition part 5, the main storage battery 1 and the backup condenser 3 composes a closed circuit, electric current flows through the thermal battery squib ignition part 5 to ignite a thermal battery squib.

Next, a description is given for the constant current circuit A. The sum electric current of electric current flowing through the thermal battery squib ignition part 5 and base drive electric current of the transistor 7 flows through the electric current detection resistor 8 of the constant current circuit A. However, if the electric current amplification of the transistor 6 is high enough, electric current flowing through the thermal battery squib ignition part 5 is roughly equal to electric current flowing through the electric current detection resistor 8. Consequently, a voltage at both ends of the electric current detection resistor 8 is proportional to electric current which flows through the thermal battery squib ignition part 5 serially connected to the constant current circuit A. When the transistor 7 becomes active by the voltage at both ends of the electric current detection resistor 8, the transistor 6 is reverse biased in the bias resistor 9 with the result that electric current flowing the thermal battery squib ignition part 5 is limited. Consequently, since the voltage between both ends of the electric current detection resistor 8 decreases and the transistor 7 comes to be in an unoperated state, reverse bias of the transistor 6 decreases and electric current carried to the thermal battery squib ignition part 5 increases. Based on such a principle, constant electric current flows through the thermal battery squib ignition part 5. In other words, when the voltage detection switch 4 turns ON, that is, when the contact of the voltage detection switch 4 closes, constant electric current regulated by the constant current circuit A flow through the thermal battery squib ignition part 5, and the thermal battery squib ignition part 5 ignites the thermal battery fusehead 5a so that discharge of the thermal battery become possible.

Here, when a prescribed power cannot be supplied for some reason or other as described above, the backup condenser 3 functions as a power source to supply electric power to the thermal battery squib ignition part 5 to ignite the thermal battery squib 5a.

Furthermore, in the state in which a prescribed power cannot be supply as described above, not when complete no power can be supplied, but when voltages of the main storage battery 1 and the backup condenser 3 are low, since electric current flowing through the thermal battery squib ignition part 5 becomes small, voltage at both ends of the electric current detection resistor 8 decreases. Here, the transistor 7 does not become active, the transistor 6 is completely held in ON state. Consequently, since the full voltage of the main storage battery 1 or the full voltage of the backup condenser 3 is applied to the thermal battery squib ignition part 5 except for a slight voltage decrease in a wiring resistor or the constant current circuit A, enough electric current can flow to the thermal battery squib ignition part 5 even when voltages of the main storage battery 1 backup condenser 3 are low with the result that the thermal battery electric match 5a is reliably ignited.

Figure 14:
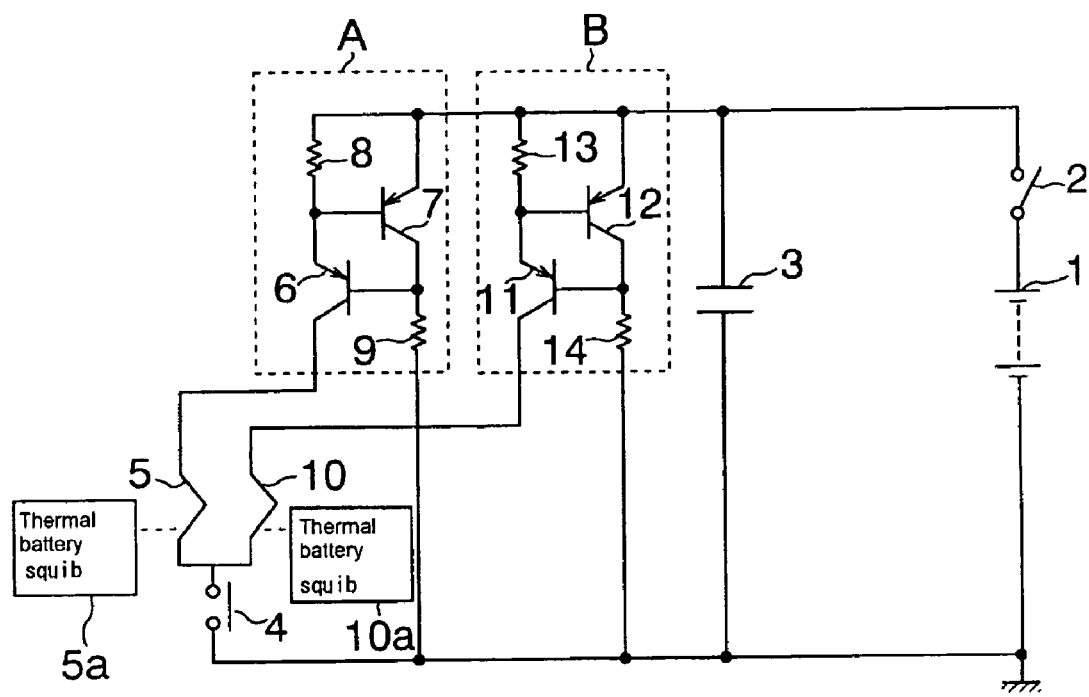
FIG. 14 is a structural diagram showing a second example of the power unit of the third embodiment.

In addition to this, the thermal battery squib ignition part can be arranged at two positions of 5 and 10 as shown in FIG. 14. By providing a squib at two positions of 5a and 10a for one thermal battery, reliability can be improved when the thermal battery is activated. In FIG. 14, the components which have the identical function in FIG. 13 have the same reference numbers. FIG. 14B shows an alternative constant current circuit. Reference numeral 11, 12, similarly to 6, 7, denote the transistors for controlling the amount of electric current flowing through the thermal battery fusehead ignition part 10. Reference numeral 13, similarly to 8, denotes the electric current detection resistor, and 14, similarly to 9, denotes the bias resistor for giving current carrying capability to the transistor 11.

Figure 15:
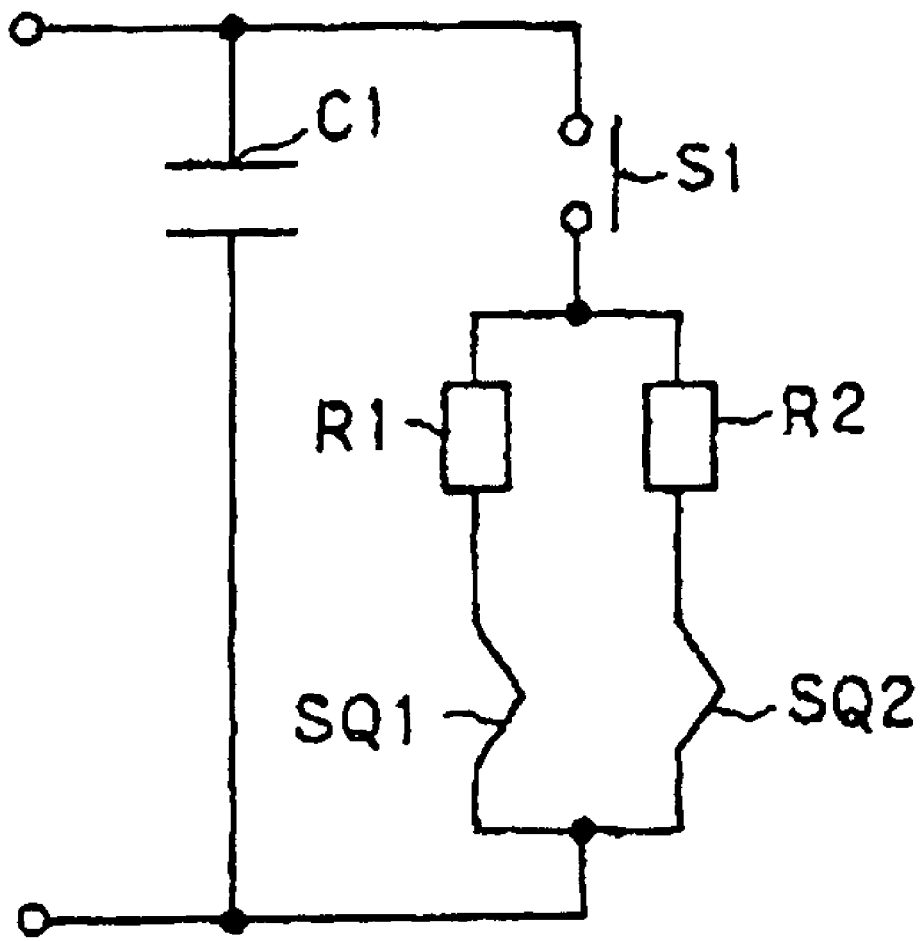
FIG. 15 is an explanatory diagram of a substantial part in which a shunt resistor is conventional employed.
Figure 16:
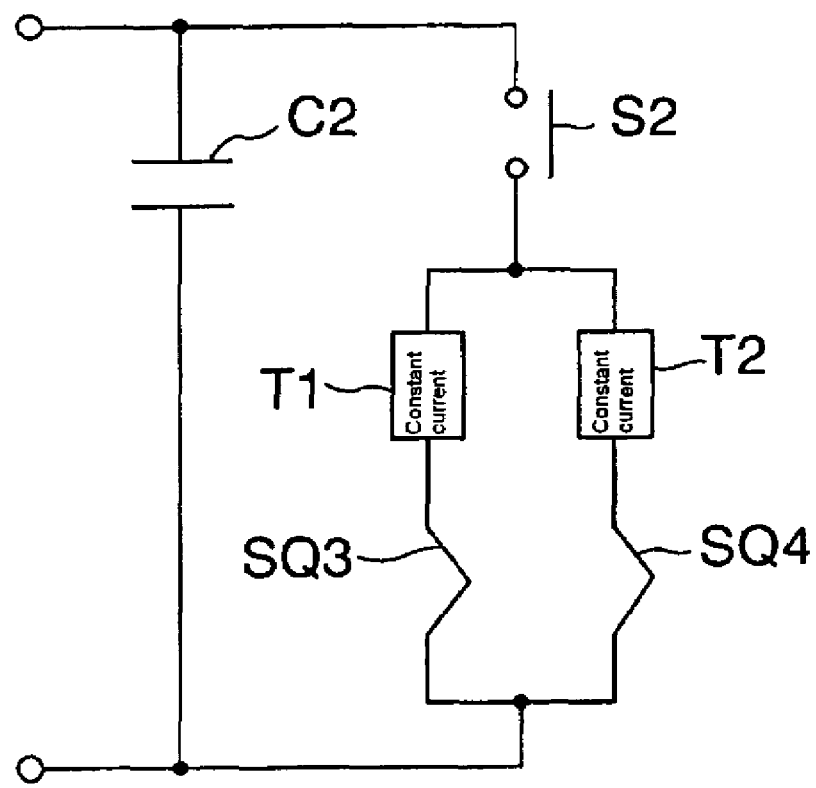
FIG. 16 is an explanatory diagram of a substantial part of this example in which a constant current circuit is employed.

In the case of FIG. 14, a description is given for advantages by employing a constant current circuit without employing a shunt resistor in the invention of this application. FIG. 15 is an explanatory diagram of a substantial part of an ignition circuit in which a shunt resistor is employed, and FIG. 16 is an explanatory diagram of a substantial part of an ignition circuit in which a constant current circuit is employed according to the invention of this application. FIG. 15, which shows an ignition circuit employing a shunt resistor, is composed of a backup condenser C1, a voltage detection switch S1, shunt resistors R1, R2, and thermal battery squib ignition parts SQ1, SQ2. If internal resistances RSQ1, RSQ2 of the thermal battery fusehead ignition parts SQ1, SQ2 are respectively set to 1Ω, shunt resistors R1, R2 are respectively set to 1Ω, electric current flowing through the thermal battery squib ignition parts SQ1, SQ2 is set to 2A, the following voltage is required for the condenser C1 at the time of ignition:

$$(RSQ1+R1) \times 2(A) = (1+1) \times 2 = 4(V)$$

Here, if either of the thermal battery squib ignition parts short-circuits, electric current from the backup condenser C1 is as follows:

$$4/(1+1) + 4/(1+0) = 6.5(A)$$

Next, FIG. 16, which shows an ignition circuit employing a constant current circuit, is composed of a backup condenser C2, a voltage detection switch S2, constant current circuits T1 and T2, and thermal battery squib ignition parts SQ3 and SQ4. Similarly to the abovementioned case, if internal resistances RSQ1, RSQ2 of the thermal battery electric match ignition parts SQ1 and SQ2 are respectively set to 1Ω, constant current value is set to 2 A, saturation voltage of the constant current circuit is set to 1V, the following voltage is required for the condenser C2 at the time of ignition:

$$1 \times 2 + 1 = 3(V)$$

When either of the thermal battery fusehead ignition parts SQ3 SQ4 short-circuits, electric current flowing from the condenser is as follows:

$$2 + 2 = 4(A)$$

In order to ignite the reliably thermal battery fuseheads 5a, 10a, condenser voltage of 4V is required when the shunt resistor is employed as described above, whereas condenser voltage of 3V is sufficient when the constant current circuit is employed. Furthermore, when either of the thermal battery squib ignition parts short-circuits, electric current flowing from the condenser is 6.5 A in the case in which the shunt resistor employed, whereas 4 A in the case in which the constant current circuit employed. In both cases, the condenser can have a smaller capacity when the constant current circuit is employed.

The above practical example relates to the case in which the electric current detection resistor and the transistor are employed for the constant current circuit. However, the constant current circuit is not limited to the electric current detection resistor and the transistor, and for example, an electric current detection resistor and an operational amplifier can be employed as shown in FIG. 17.

Figure 17:
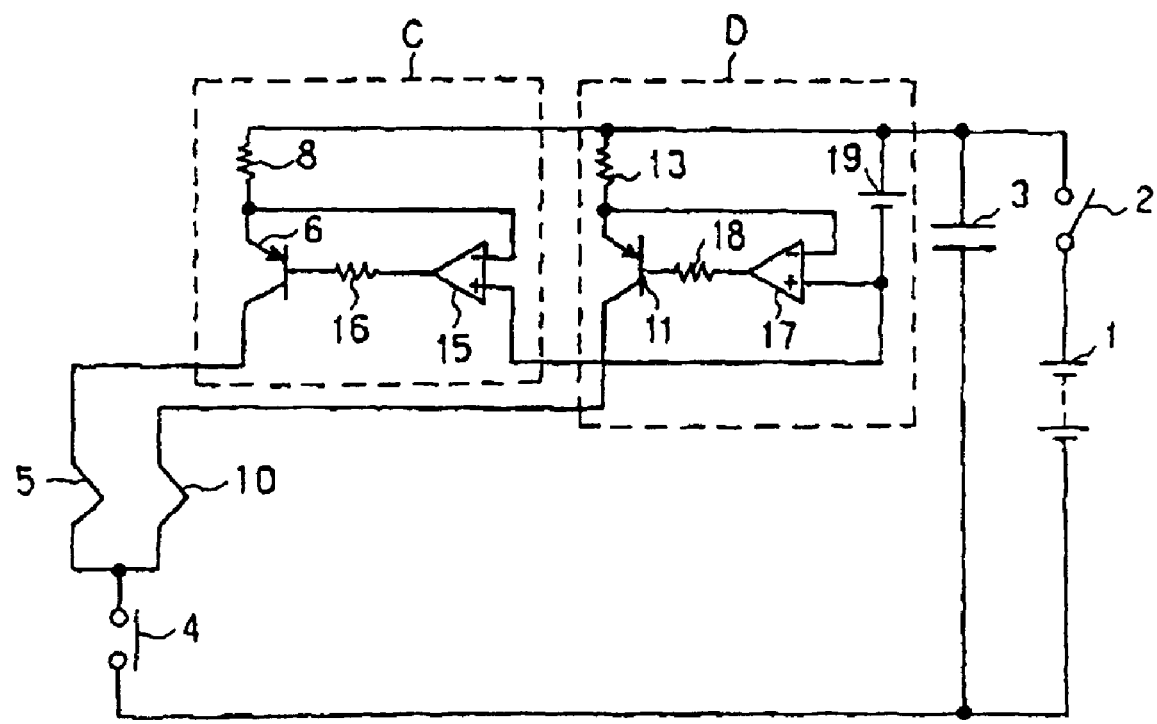
FIG. 17 is a structural diagram showing a third example of the power unit of the third embodiment.

The thermal battery squib ignition circuit shown in FIG. 17, in addition to the members which have the same reference numbers as used in FIG. 13 and FIG. 14, is composed of bias resistors 16 and 18, operational amplifiers 15 and 17, and a reference voltage source 19. The operation of a constant current circuit C in FIG. 17 is to flow the same electric current as that in the thermal battery squib ignition part 5 through the electric current detection resistor 8 by turning ON the voltage detection switch 4. Here, voltage between both ends of the electric current detection resistor 8 is proportional to electric current flowing through the thermal battery squib ignition part 5, and when the voltage between both ends of the electric current detection resistor 8 increases, electric current flowing from the operational amplifier 15 becomes large. As a result, the transistor 6 is reverse biased, and electric current flowing through the thermal battery squib ignition part 5 is subject to a certain limitation to become a prescribed value.

The operation of a constant current circuit D shown in FIG. 17 is similar to the operation of the constant current circuit C described above. Here, when voltage of the reference voltage source 19 is set to about 0.1V, since resistance values of the electric current detection resistor 8, 13 can be small, the electric current detection resistors 8, 13 can reduce voltage drops of themselves. Consequently, even when a storage battery voltage or a backup condenser voltage is low, the thermal battery squib ignition parts 5, 10 can reliably be started.

Furthermore, as other practical examples, a similar structure can be obtained by composing the constant current circuit using a magnetic field generated by electric current, or giving electric current limiting capability to a component itself (for example, using a constant current diode). Furthermore, instead of the voltage detection switch described in this practical example, a semiconductor sensor, a piezoelectric element or the like can also be employed. Furthermore, a storage battery can also be employed instead of a backup condenser.

Fourth Embodiment

There is shown third and fourth preferable structures to solve the problem 1 referring to the accompanying drawings.

FIRST EXAMPLE

Figure 18:
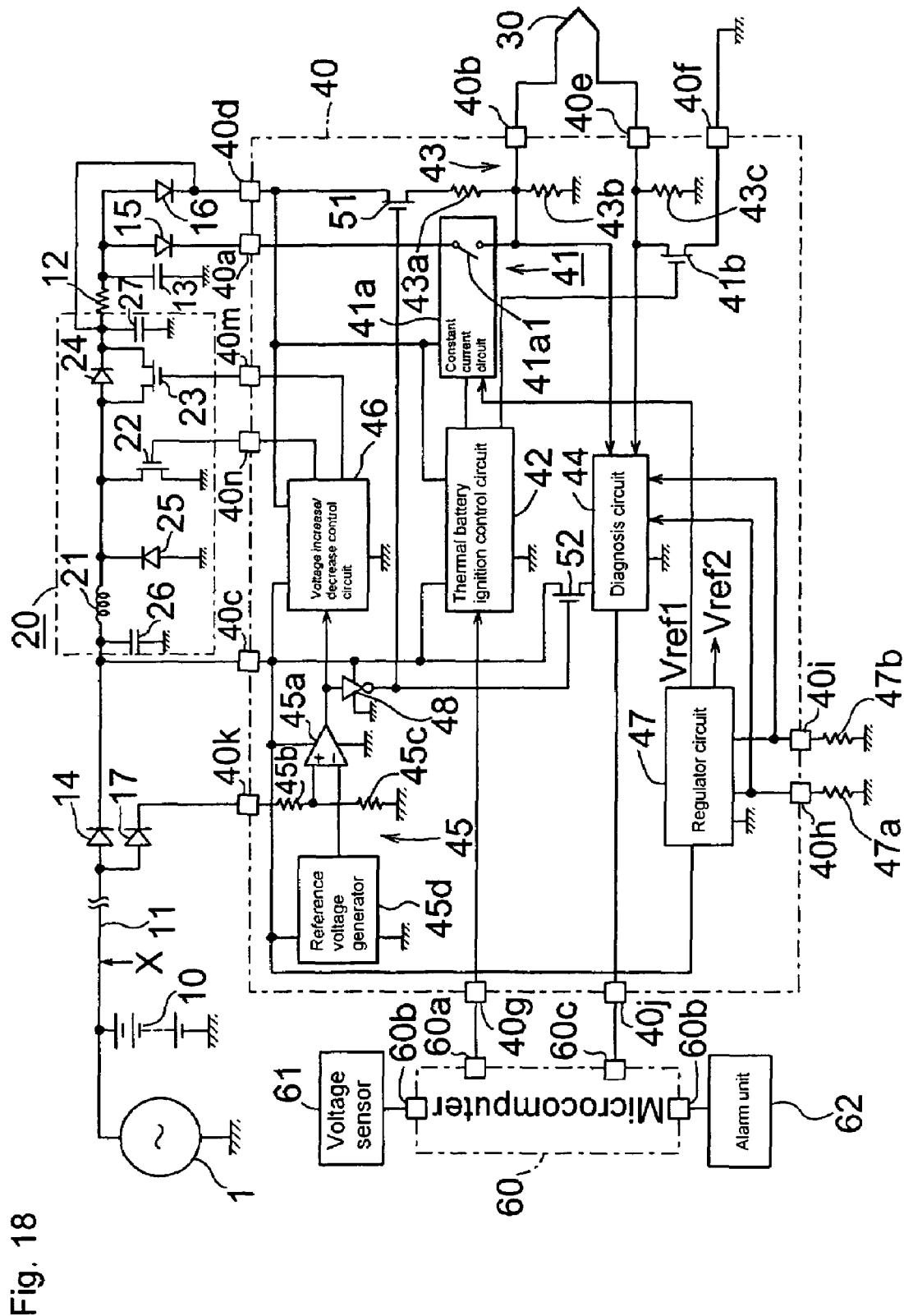
FIG. 18 is a structural diagram showing a first example according to a power unit of a fourth embodiment.

FIG. 18 is a structural diagram showing a circuit structure of a first power unit according to this structure.

Voltage Conversion Circuit 20

A thermal battery activation device shown in FIG. 18 is provided with a resistor 12 and a backup power source which is a condenser 13 having a relatively large capacity, and they are connected to a power supply wire 11 connecting to one end of a main storage battery 10 and/or a generator 1. The other end of the main storage battery 10 and/or the generator 1 and one end of the condenser 13 are respectively grounded. A voltage conversion circuit 20 composed of a coil 21, FETs (field-effect transistor) 22, 23, diodes 24, 25, condensers 26, 27, is provided adjacent to the resistor 12 of the power supply wire 11. One end of the coil 21 provided with the voltage conversion circuit 20 is connected to the main storage battery 10 and/or the generator 1 (main power source) through a diode 14, and the other end of the same coil 21 is connected to an anode of the diode 24 whereas a cathode of the diode 24 is connected to the resistor 12. A drain and a source of the N-channel-type FET 22 are connected between, between the coil 21 and the anode of the diode 24, and the ground. Here, the FET 22 turns ON when a high level signal is applied to the gate, and turns OFF when a low level signal is applied to the gate. By applying a pulse signal to the gate of the FET 22 to repeat ON/OFF operations of the FET 22, voltage of the main storage battery 10 increases by a voltage increase function of the coil 21, the FET 22 and the diode 24 with the result that electric charge is stored in the condenser 13 through the resistor 12.

In this voltage conversion circuit 20, a drain and a source of a P-channel-type FET 23 is parallely connected to both ends of the diode 24. Here, the FET 23 turns ON when a low level signal is applied to the gate, and turns OFF when a high level signal is applied to the gate. An anode of the diode 25 is grounded, and a cathode of the diode 25 is connected between the coil 21 and the FET 23. By applying a pulse signal to the gate of the FET 23 to repeat ON/OFF operations of the FET 23, voltage of the condenser 13 decreases by a voltage decrease function of the coil 21, the FET 23 and the diode 25 to apply voltage to the main storage battery 10 and/or the generator 1. Condensers 26, 27 is provided in the voltage conversion circuit 20 has a relatively small capacity, for removing ripple generated by voltage increase/decrease operations by the above voltage conversion circuit 20.

A thermal battery activation device having the above voltage conversion circuit 20 is further provided with a control circuit 40 for controlling an ignition device 30 for activating the thermal battery. This control circuit 40, which is composed of a semiconductor integrated circuit for example, is provided with a thermal battery ignition circuit 41, a thermal battery ignition control circuit 42, a resistance circuit 43, a diagnosis circuit 44, a disconnection detection circuit 45, a voltage increase/decrease control circuit 46 and a regulator circuit 47.

Thermal Battery Ignition Circuit 41

The thermal battery ignition circuit 41 ignites the ignition device 30 with the condenser 13 as a power source to activate a thermal battery for stand-by power source when voltage of the main storage battery 10 and/or the generator 1 (both of the main storage battery 10 and the generator 1 are preferable) decreases to a prescribed value or under. The thermal battery ignition circuit 41 is provided with a constant current circuit 41*a* and an N-channel type FET 41*b* which is a switching element. The constant current circuit 41*a* is provided with a normally open switching element 41*a*1 connected between a terminal 40*a* and a terminal 40*b* of the control circuit 40. The thermal battery ignition control circuit 42 controls the normally open switching element 41*a*1, and the normally open switching element 41*a*1 turns ON to flow constant current to one end of the ignition device 30 through the terminal 40*b* when voltage of the main storage battery 10 and/or the generator 1 decreases to a prescribed value or under. It is to be noted that the constant current to flow here is required to be sufficient electric current enough to ignite the ignition device 30 to activate the thermal battery.

Here, since the thermal battery for stand-by power source of the movable body device according to the present invention is a primary battery which becomes unusable once used as described above, the thermal battery requires to be activated reliably when activation thereof is required whereas a protective circuit for preventing malfunction causing thermal battery activation is more preferably provided. For such a protective circuit, it is preferable that a signal indicating that a movable body is traveling, for example, tire revolutions for a vehicle and speed on a speedometer for other movable bodies, is input into the thermal battery activation circuit, and that the thermal battery is activated when voltage of the main storage battery 10 and/or the generator 1 decreases and the signal indicating that the movable body is traveling is input.

The terminal 40*a* provided in the control circuit 40 is connected to one end of the condenser 13 through the diode 15. This terminal 40*a* is a first voltage supply terminal (backup power source supply terminal) of the control circuit 40 which is connected to the condenser 13 increasing voltage of the main storage battery 10 and/or the generator 1 and storing electric charge.

A constant current circuit 41*a* provided in the thermal battery ignition circuit 41 is also connected to a terminal 40*d* provided in the control circuit 40 in order to obtain voltage required for driving the switching element 41*a*1. A terminal 40*d* provided in the control circuit 40 is a second voltage supply terminal of the control circuit 40 which is connected to an output part of the voltage conversion circuit 20 (between the diode 24 and the resistor 12) whereas is connected to one end of the condenser 13 through the diode 16.

An FET 41*b* provided in the thermal battery ignition circuit 41 is connected to a terminal 40*e* and a terminal 40*f* whose drains and sources are respectively provided in the control circuit 40. It is to be noted that the FET 41*b* turns ON when a high level signal is applied to a gate, and turns OFF when a low level signal is applied thereto. The ignition device 30 is connected to a terminal 40*b* and a terminal 40 of the control circuit 40, and the terminal 40*f* thereof is grounded.

Thermal Battery Ignition Control Circuit 42

The thermal battery ignition control circuit 42, in response to a signal indicating that the voltage of the main storage battery 10 and/or the generator 1 (both of the main storage battery 10 and the generator 1 are preferable), to be applied to the terminal 40*g* of the control circuit 40, detected by a voltage sensor 61 through a terminal 60*b* of a microcomputer 60, decreases to a prescribed value or under, outputs a control signal for generating constant current to the constant current circuit 41*a* of the thermal battery ignition circuit 41, as well as outputs a control signal for turning ON the FET 41*b* of the thermal battery ignition circuit 41. In order to operate this thermal battery ignition control circuit 42, voltage of the main storage battery 10 and/or the generator 1 from the terminal 40*c* of the control circuit 40 is also applied. Furthermore, the thermal battery ignition control circuit 42 is also grounded. The terminal 40*c* of the control circuit 40, which is connected to a part between the diode 14 of the power supply wire 11 and the coil 21 of the voltage conversion circuit 20, is a voltage supply terminal of voltage of the main storage battery 10 and/or the generator 1, or the condenser 13 whose voltage decreases. Furthermore, an increased voltage for operating the switching element 41*a*1 of the constant current circuit 41*a* provided in the thermal battery ignition circuit 41 is also input into this thermal battery ignition control circuit 42 from the terminal 40*d*.

Resistance Circuit 43

The resistance circuit 43, with the condenser 13 as a power source and applies voltage between both ends of the ignition device 30 so as to diagnose whether the ignition device 30 is good or not, is composed of a resistor 43a, a resistor 43b and a resistor 43c. The resistors 43a, 43b of the resistance circuit 43 are respectively series-connected and the part between them is connected to the terminal 40b of the control circuit 40. One end of the resistor 43a of the resistance circuit 43 is connected to the terminal 40d of the control circuit 40 through a drain and a source of an FET 51, and one end of the resistor 43b of the resistance circuit 43 is grounded.

And a resistor 43c of the resistance circuit 43, one end of which is connected to a terminal 40e of the control circuit 40 and the other end is grounded.

The FET 51 connected to one end of the resistor 43a of the resistance circuit 43, applies voltage from the terminal 40d of the control circuit 40 to the resistance circuit 43 in ON state, inhibits voltage applied from the terminal 40d of the control circuit 40 in OFF state, and composes a shutoff circuit for shutting off electric power supplied to the resistance circuit 43 when the power supply wire 11 disconnects. It is to be noted that the FET 51, which is P-channel type, becomes ON state when a low level signal is applied to a gate, and becomes OFF state when a high level signal is applied to a gate.

Diagnosis Circuit 44

The diagnosis circuit 44 diagnoses the ignition device 30. In further detail, in order to judge whether the ignition device 30 or a connecting wire connecting to the ignition device 30 has abnormalities such as disconnection and short circuit, both voltages of the terminal 40b and the terminal 40d of the control circuit 40 are input into the diagnosis circuit 44. Furthermore, as will hereinafter be described in detail, voltages of a terminal 40h and a terminal 40i of the control circuit 40 are input into the diagnosis circuit 44 in order to judge whether a prescribed reference voltage is generated in the regulator circuit 47. And a diagnosis result of the diagnosis circuit 44, that is, the respective voltages of the terminal 40b, the terminal 40d, the terminal 40h and the terminal 40i are output to a terminal 60c of the microcomputer 60 through a terminal 40j of the control circuit 40. A power source for operating this diagnosis circuit 44, which is voltage of the main storage battery 10 and/or the generator 1, or the condenser 13 whose voltage decreases, is input from the terminal 40c of the control circuit 40 through the FET 52, and the diagnosis circuit 44 is grounded.

The FET 52 connecting to the diagnosis circuit 44 applies voltage from the terminal 40c of the control circuit 40 to the diagnosis circuit 44 in ON state, does not apply voltage from the terminal 40c of the control circuit 40 in OFF state, and becomes an operation stop control circuit of the diagnosis circuit when the power supply wire 11 disconnects. It is to be noted that the FET 52, which is P-channel-type, becomes ON state when a low level signal is applied to a gate, and becomes OFF state when a high level signal is applied to a gate.

The respective voltage signals output from the diagnosis circuit 44 are input into the microcomputer 60 through the terminal 60c of the microcomputer 60 connected to the terminal 40j of the control circuit 40. The microcomputer 60 then judges whether the respective voltage signals the diagnosis circuit 44 outputs are normal or not. If determining that the respective voltage signals the diagnosis circuit 44 outputs are abnormal, the microcomputer 60 records a time when the abnormality generated and at the same time, outputs a signal indicating abnormality to an alarm unit 62 (for example, a warning light, a buzzer and a recorded voice) connected to the terminal 60d of the microcomputer 60. The alarm unit 62 informs the driver of abnormality depending on this signal.

Disconnection Detection Circuit 45

The disconnection detection circuit 45 is a circuit for detecting disconnection of the power supply wire 11 connecting the main storage battery 10 and/or the generator 1 and the voltage conversion circuit 20, having a comparator 45a. Electric potential between a resistor 45b and resistor 45c serially connected between a terminal 40k of the control circuit 40 and the ground is applied to the positive side input terminal of this comparator 45a. The terminal 40k of the control circuit 40, similarly to the terminal 40c of the control circuit 40, is a part between the main storage battery 10 of the power supply wire 11 and the coil 21, away from the main storage battery 10, and is connected to a part of the coil 21 side through the diode 17. Reference voltage of a reference voltage generator 45d provided in the disconnection detection circuit 45 is applied to the negative side input terminal of the comparator 45a. A power source for operating the comparator 45a and the reference voltage generator 45d provided in the disconnection detection circuit 45 is voltage of the main storage battery 10 and/or the generator 1, or the condenser 13 whose voltage decreases. Furthermore, the comparator 45a and the reference voltage generator 45d provided in the disconnection detection circuit 45 are respectively grounded.

Here, reference voltage of the reference voltage generator 45d provided in the disconnection detection circuit 45 is set to a small value. In a state that the power supply wire 11 does not disconnect and voltage from the main storage battery 10 and/or the generator 1 is normally applied to the terminal 40k of the control circuit 40, the comparator 45a of the disconnection detection circuit 45 outputs a high level signal. In contrast, when the power supply wire 11 disconnects and ground potential is applied to the terminal 40k of the control circuit 40, the comparator 45a outputs a low level signal. The signal emitted by the comparator 45a of the disconnection detection circuit 45 is applied to a voltage increase/decrease control circuit 46, which will be described later in detail, and at the same time to the gate of the FET 51 and the gate of the FET 52 through an inverter circuit 48, which will be described later in detail.

Voltage Increase/Decrease Control Circuit 46

The voltage increase/decrease control circuit 46 is a circuit for performing switching control selectively between voltage increase/decrease operations of the conversion circuit 20 by controlling the disconnection detection circuit 45. In further detail, the voltage increase/decrease control circuit 46, when a high level signal is applied from the comparator 45a of the disconnection detection circuit 45, applies the high level signal to a gate of the FET 23 through a terminal 40m of the control circuit 40 to maintain the FET 23 in OFF state. At the same time, the voltage increase/decrease control circuit 46 applies a pulse signal repeating a low level signal and a high level signal to a gate of the FET 22 through a terminal 40n of the control circuit 40 to turn ON/OFF the FET 22 periodically. The voltage increase/decrease control circuit 46, when a low level signal is applied from the comparator 45a of the disconnection detection circuit 45, applies the low level signal to the gate of the FET 22 through the terminal 40n of the control circuit 40 to maintain the FET 22 in OFF state. At the same time, the voltage increase/decrease control circuit 46 applies a pulse signal repeating a low level signal and a high level signal to a gate of the FET 23 through a terminal 40m of the control circuit 40 to turn ON/OFF the FET 23 periodically.

A power source for operating this voltage increase/decrease control circuit 46 is the main storage battery 10 and/or the generator 1 connected to the terminal 40c of the control circuit 40 or the condenser 13 whose voltage decreases. Furthermore, the voltage increase/decrease control circuit 46 is grounded. It is to be noted that voltage of the condenser 13 is input from the terminal 40d of the control circuit 40 to the voltage increase/decrease control circuit 46 in order to operate the P-channel-type FET 23.

Inverter Circuit 48

The inverter circuit 48 is a circuit for inverting a high level signal or a low level signal emitted by the comparator 45a of the disconnection detection circuit 45 into a low level signal or a high level signal respectively to output the signal. A power source for operating this inverter circuit 48 is the main storage battery 10 and/or the generator 1 connected to the terminal 40c of the control circuit 40 or the condenser 13 whose voltage decreases. Furthermore, the inverter circuit 48 is also grounded.

Regulator Circuit 47

The regulator circuit 47 generates a first reference voltage Vref1 for flowing constant current through the ignition device 30 and a second reference voltage Vref2 for flowing constant current for diagnosis of the ignition device 30. The regulator circuit 47 outputs the first reference voltage Vref1 and the second reference voltage Vref2 by the terminal 40h of the control circuit 40, a resistor 47a and a resistor 47b connected to the terminal 40i. A power source for operating the regulator circuit 47 is the main storage battery 10 and/or the generator 1 connected to the terminal 40c of the control circuit 40, or the condenser 13 whose voltage decreases. Here, as described above, the reason why voltages of the terminal 40h and the terminal 40i of the control circuit 40 is input into the diagnosis circuit 44 is to diagnose whether the constant current circuit 41a provided in the thermal battery ignition circuit 41 operates normally, and to diagnose ignition control of the ignition device 30 (diagnose whether constant current for diagnosing the ignition device 30 generates normally). It is to be noted that the resistor 47a and the resistor 47b are preferably attached to the control circuit 40 from the outside, not providing the resistor 47a and the resistor 47b in the control circuit 40. This is because of the difficulty of forming a high-precision resistor in a semiconductor integrated circuit like the control circuit 40.

Description of Circuit Operations

There is shown operations of the circuits as constituted above. First, a description is given for a case in which the power supply wire 11 connected to the main storage battery 10 and/or the generator 1 does not disconnect. In this case, voltage from the main storage battery 10 and/or the generator 1 is applied to the terminal 40c and the terminal 40k of the control circuit 40. Power supply voltage (constant voltage) from the main storage battery 10 and/or the generator 1 is applied to the thermal battery ignition control circuit 42, the comparator 45a and the reference voltage generator 45d provided in the disconnection detection circuit 45, the voltage increase/decrease control circuit 46, the regulator circuit 47 and the inverter circuit 48 respectively through the terminal 40c of the control circuit 40. This allows the thermal battery ignition control circuit 42, the comparator 45a and the reference voltage generator 45d provided in the disconnection detection circuit 45, the voltage increase/decrease control circuit 46, the regulator circuit 47 and the inverter circuit 48 to be ready for operation. Furthermore, the comparator 45a of the disconnection detection circuit 45 outputs a high level signal based on voltage applied to the terminal 40k of the control circuit 40. Since this high level signal is inverted into a low level signal by the inverter circuit 48 and applied to the FET 51 and the FET 52, the FET 51 and the FET 52 remain in ON state. Here, power supply voltage from the main storage battery 10 and/or the generator 1 is applied to the diagnosis circuit 44 through the terminal 40c of the control circuit 40, which means the diagnosis circuit 44 is also ready for operation.

In this state, the voltage increase/decrease control circuit 46 maintains the FET 23 in OFF state by applying a high level signal to the terminal 40m of the control circuit 40 through the gate of the FET 23. At the same time, the voltage increase/decrease control circuit 46 turns the FET 22 ON/OFF periodically by applying a pulse signal repeating a low level signal and a high level signal to the gate of the FET 22 through the terminal 40n of the control circuit 40. Consequently, in the voltage conversion circuit 20, the coil 21, the FET 22 and the diode 24 increase voltage from the main storage battery 10 and/or the generator 1, the increased voltage is directly applied to the terminal 40d to be further applied to the constant current circuit 41a provided in the thermal battery ignition circuit 41, the thermal battery ignition control circuit 42, the voltage increase/decrease control circuit 46 and the FET 51 through the terminal 40d of the control circuit 40.

Furthermore, the voltage from the main storage battery 10 and/or the generator 1 increased by the voltage conversion circuit 20 is stored in the condenser for backup 13 through the resistor 12. The condenser 13, which is connected to the terminal 40a of the control circuit 40 through the diode 15, applies voltage to the switching element 41a1 of the constant current circuit 41a of the thermal battery ignition circuit 41. The condenser 13, at the same time, is connected to the terminal 40d of the control circuit 40 through the diode 16 to apply voltage to the constant current circuit 41a of the thermal battery ignition circuit 41, the thermal battery ignition control circuit 42, the voltage increase/decrease control circuit 46 and the FET 51.

The constant current circuit 41a of the thermal battery ignition circuit 41, the thermal battery ignition control circuit 42 and the voltage increase/decrease control circuit 46 thus become ready for operation by applying the increased voltage of the condenser 13 thereto. Here, since the FET 51 is in ON state, the voltage of the condenser 13 applied to the terminal 40d of the control circuit 40 is also applied to the resistor 43a and the resistor 43b as described above. This voltage, divided by the resistor 43a and the resistor 43b, is applied to one end of the ignition device 30 through the terminal 40b of the control circuit 40. This voltage is not for starting up the ignition device 30, but for flowing a slight electric current through the ignition device 30 and the resistor 43c. Therefore, the voltage of the terminal 40e of the control circuit 40 is slightly higher than the ground voltage.

In addition to voltages of the terminal 40b and the terminal 40e of the control circuit 40, voltages between the regulator circuit 47 and the terminal 40h, the terminal 40i of the control circuit 40 are applied to the diagnosis circuit 44. The diagnosis circuit 44 then outputs these voltages to the microcomputer 60 through the terminal 40j of the control circuit 40. The microcomputer 60, which receives signals from the diagnosis circuit 44, judges from these signals whether ignition control of the ignition device 30 is normal or not. The judgment starts with the ignition device 30, the resistor 47a and the resistor 47b, and if abnormalities such as circuit disconnection and short circuit do not generate at the periphery thereof at the same time if voltage output by the diagnosis circuit 44 is normal, the microcomputer 60 judges that the thermal battery activation device is normal. However, if there is circuit disconnection, short circuit or the like, or if the voltage output by the diagnosis circuit 44 is abnormal, the microcomputer 60 judges that the thermal battery activation device is abnormal, records a time when the abnormality generated and at the same time, outputs an abnormal signal to the alarm unit 62.

The alarm unit 62 gives an alarm based on this abnormal signal to inform the driver that abnormality has generated in the thermal battery activation device.

In a state that the microcomputer 60 judges that the thermal battery activation device is normal, when voltage of the main storage battery 10 and/or the generator 1 (preferably, the respective of the main storage battery 10 and the generator 1) input to the voltage sensor 61 decreases to a prescribed value or under, preferably while the vehicle is moving by tire revolutions or the like, the microcomputer 60 emits a signal to the terminal 40g of the control circuit 40 through the terminal 60a of the microcomputer 60. This signal is then input into the thermal battery ignition control circuit 42. The thermal battery ignition control circuit 42 into which the signal is input, outputs a control signal to the constant current circuit 41a of the thermal battery ignition circuit 41, and at the same time applies a high level signal to the FET 41b to switch the FET 41b from OFF state to ON state. This allows the constant current circuit 41a of the thermal battery ignition circuit 41 to generate constant current with the condenser 13 through the terminal 40a of the control circuit 40 as a power source. In this case, since the FET 41b is in ON state as described above, the constant current generated by the constant current circuit 41a of the thermal battery ignition circuit 41 flows through the ignition device 30 to activate the thermal battery. It is to be noted that the first reference voltage Vref1 of the regulator circuit 47 is also used when generating this constant current.

Additionally, when the power supply wire 11 disconnects for some reason or other even though voltage of the main storage battery 10 and/or the generator 1 is normal, control of a movable body provided with a by-wire type control means become impossible. For example, if disconnection generates between the main storage battery 10 and/or the generator 1, and the diode 13 (shown as X in the figure), the comparator 45a of the disconnection detection circuit 45 outputs a low level signal to the voltage increase/decrease control circuit 46. The voltage increase/decrease control circuit 46 to which the low level signal is output, outputs a low level signal to the gate of the FET 22 through the terminal 40n of the control circuit 40 to maintain the FET 22 in OFF state. At the same time, the voltage increase/decrease control circuit 46 supplies a pulse signal repeating a low level signal and a high level signal to the gate of the FET 23 through the terminal 40m of the control circuit 40 to turn ON/OFF the FET 23 periodically. As a result, the coil 21 of the voltage conversion circuit 20, the FET 23 and the diode 25 decrease voltage of the condenser for backup 13 to apply the decreased voltage to the terminal 40c of the control circuit 40.

The decreased voltage is used as power sources for the thermal battery ignition control circuit 42, the comparator 45a of the disconnection detection circuit 45, the reference voltage generator 45d of the disconnection detection circuit 45, the voltage increase/decrease control circuit 46, the regulator 47 and the inverter circuit 48, respectively. Consequently, these circuits can continue proper operations even when the power supply wire 11 disconnects for some reason or other. In contrast, voltage of the condenser 13 not decreased is applied to the switching element 41a1 of the constant current circuit 41a of the thermal battery ignition circuit 41, the thermal battery ignition control circuit 42, and the voltage increase/decrease control circuit 46 through the diode 16 and the terminal 40d of the control circuit 40. This allows these circuits to continue maintaining normal operations with the result that normal operation of the thermal battery activation device becomes possible. As a result, the thermal battery activation device can operate even when the power supply wire 11 disconnects for some reason or other, to activate the thermal battery as an auxiliary power source so that by-wire type control of the thermal battery as a power source becomes possible.

When the power supply wire 11 disconnects for some reason or other, a high level signal inverted by the inverter circuit 48 is applied to the FET 51 and the FET 52 and the FET 51 and the FET 52 become OFF state respectively. Since the condenser 13 is shut off from the resistance circuit 43 when the FET 51 becomes OFF state, electric current for diagnosis stops flowing from the condenser 13 to the ignition device 30 and the resistance circuit 43. Furthermore, the FET 52 becoming OFF state stops voltage application to the diagnosis circuit 44. When the power supply wire 11 thus disconnects for some reason or other, electric power consumption of the condenser 13 can be suppressed with the result that the circuits necessary for starting up the thermal battery activation device can be operated for a long time.

SECOND EXAMPLE

Figure 19:
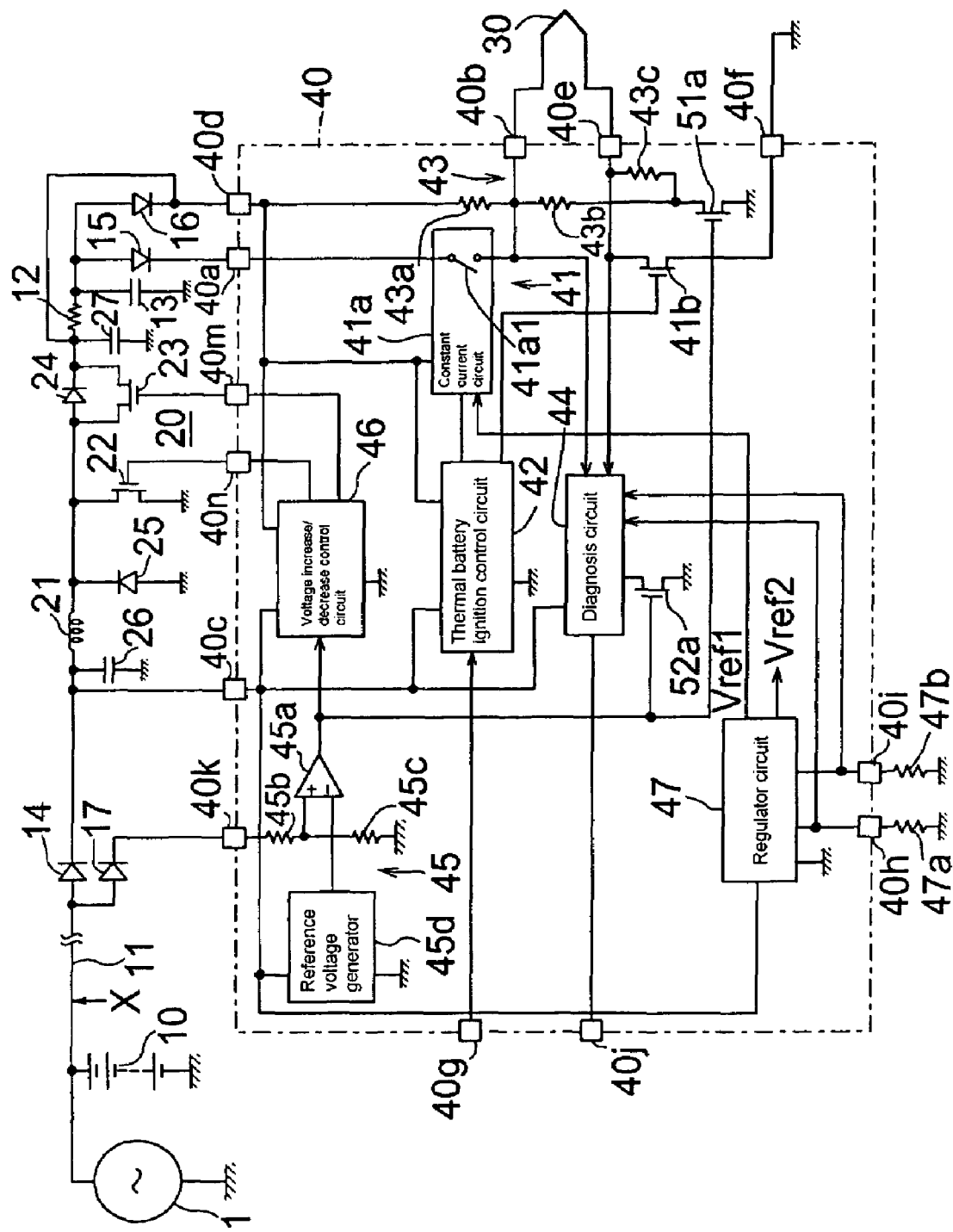
FIG. 19 is a structural diagram showing a second example according to the power unit of the fourth embodiment.

Next, there is shown an alternative practical example. This thermal battery activation device, which is provided with circuits shown in FIG. 19, is different from the one shown in FIG. 18 in connection locations of the FETs 51a and 52a for shutting off voltage application to the resistance circuit 43 and the diagnosis circuit 44 when the power supply wire 11 disconnects. It is to be noted that in FIG. 19, the description of the microcomputer 60 shown in FIG. 18 is omitted, the components which have the identical function in FIG. 18 have the same reference numbers and the detail description thereof will be omitted.

In the practical example shown in FIG. 19, the resistor 43a of the resistance circuit 43 is directly connected to the terminal 40d of the control circuit 40, the resistor 43b of the resistance circuit 43 is connected to the terminal 40b of the control circuit 40 whereas the other side thereof is connected to the resistor 43c of the resistance circuit 43. The resistor 43c of the resistance circuit 43 is connected to the terminal 40e of the control circuit 40 whereas the other side thereof is connected to the resistor 43b of the resistance circuit 43.

In FIG. 19, the diagnosis circuit 44 is directly connected to the terminal 40c of the control circuit 40, and the diagnosis circuit 44 is grounded through the FET 52a. It is to be noted that these FET 51a and FET 52a, which are N-channel-type FETs, become ON state when a high level signal is applied to a gate and become OFF state when a low level signal is applied to a gate. Consequently, the inverter circuit 48 shown in FIG. 1 can be omitted.

Also in the practical example shown in FIG. 19, since a high level signal is output from the comparator 45a of the disconnection detection circuit 45 to turn the FET 51a and the FET 52a ON state unless the power supply wire 11 disconnects, electric power is supplied from the terminal 40d and the terminal 40c of the control circuit 40, so that the resistance circuit 43 and the diagnosis circuit 44 can continue their operations. In contrast, when the power supply wire 11 disconnects, the comparator 45a of the disconnection detection circuit 45 outputs a low level signal, both of the FET 51a and the FET 52a become OFF state, and electric power supply from the terminal 40d and the terminal 40c of the control circuit 40 is shutoff with the result that the resistance circuit 43 and the diagnosis circuit 44 stop their operation to suppress electric power consumption. Thus, also in the practical example shown in FIG. 2, similar effects to the ones in the practical example shown in FIG. 18 can be obtained.

THIRD EXAMPLE

Figure 20:
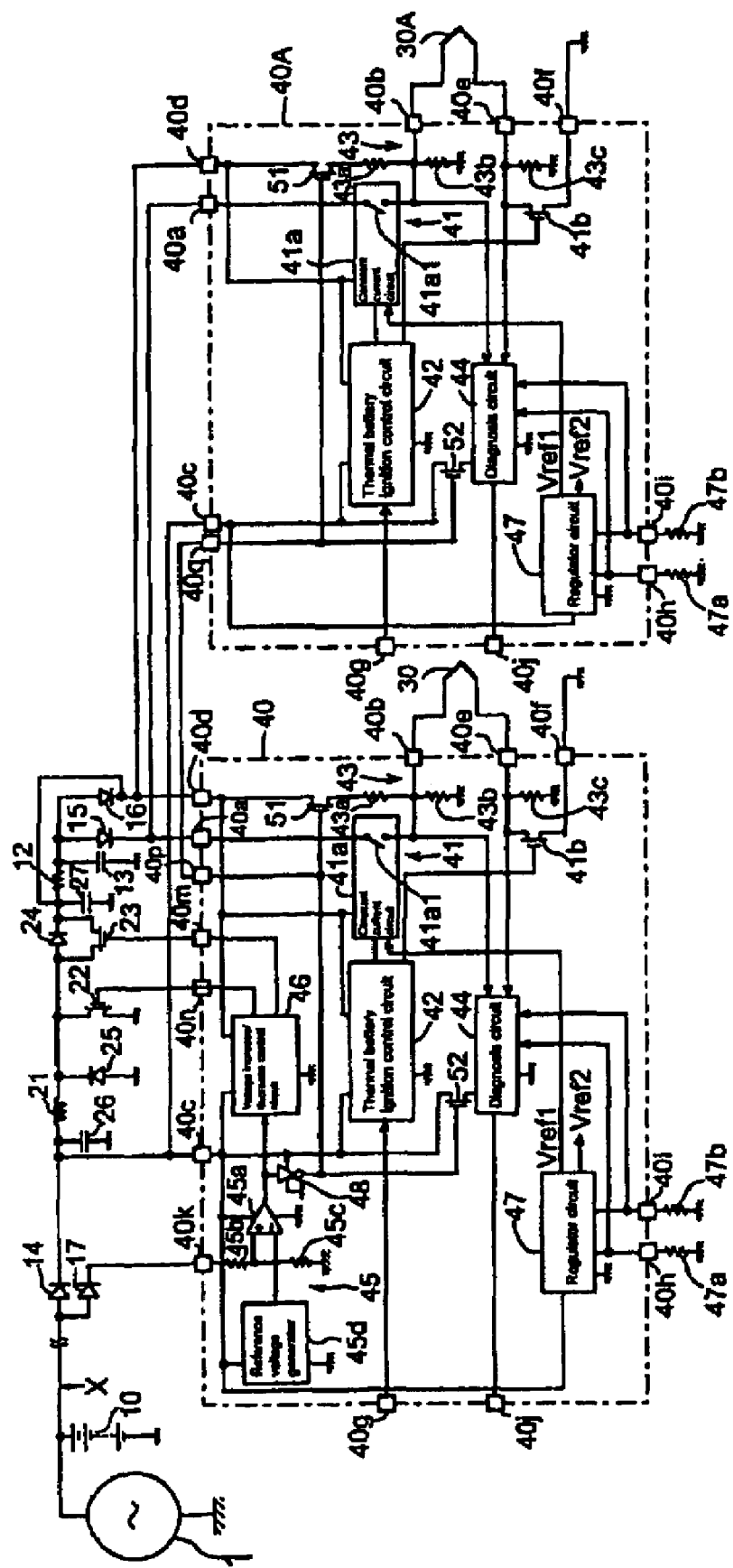
FIG. 20 is a structural diagram showing a third example according to the power unit of the fourth embodiment.

Next, there is shown a further alternative practical example. This thermal battery activation device, which is provided with circuits shown in FIG. 20, is different from the ones shown in FIG. 18 and FIG. 19, can control not only ignition of the first ignition device 30 but also of the second ignition device 30A with the result that activation reliability of the thermal battery is improved. Although the condenser 13 for controlling the first ignition device 30, the voltage conversion circuit 20, the control circuit 40 and the like are almost identical to the ones in the practical example shown in FIG. 18, a terminal 40p for outputting an output signal of the inverter circuit 48 to the outside is provided in the control circuit 40. It is to be noted that the components which have the same function have the same reference numbers and the description thereof will be omitted. Also in this case, the microcomputer 60 similar to the ones in the practical example shown in FIG. 19 is omitted.

A control circuit 40A of a second ignition device 30A shown in FIG. 20, similarly to the control circuit 40 of the first ignition device 30, is composed of a semiconductor integrated circuit. The control circuit 40A of the second ignition device 30A is provided with the thermal battery ignition circuit 41 which is similarly to the control circuit 40 for the first ignition device 30, the thermal battery ignition control circuit 42, the resistance circuit 43, the diagnosis circuit 44, the regulator 47, the FET 51, the FET 52 and the terminal 40a to the terminal 40j. Similarly to the control circuit 40 of the first ignition device 30, electric power is supplied to the control circuit 40A of the second ignition device 30A from the condenser 13 and the voltage conversion circuit 20. It is to be noted that the control circuit 40A of the second ignition device 30A is not provided with the disconnection detection circuit 45 and the voltage increase/decrease control circuit 46, but provided with a terminal 40q which is connected to a terminal 40p newly provided in the control circuit 40. The terminal 40q is connected to the gates of the FET 51 and the FET 52 in the control circuit 40A of the second ignition device 30A.

In the practical example shown in FIG. 20, this structure controls ignition of the ignition device 30A or abnormality diagnosis similarly as in the practical example shown in FIG. 18. It is to be noted that in this control circuit 40A, disconnection of the power supply wire 11 is not detected, but the control circuit 40 detects disconnection of the power supply wire 11 to control operation or stop of the resistance circuit 43 and the diagnosis circuit 44. In the practical example shown in FIG. 20, ignition of a plurality of ignition devices 30, 30A can be controlled accurately and at the same time the ignition devices 30, 30A can be diagnosed accurately. Furthermore, consumption of electric power stored in the condenser for backup 13 can be suppressed even when the power supply wire 11 disconnects.

It is to be noted that if a control circuit similar to the control circuit 40A shown in FIG. 20 is parallelly connected to the control circuit 40 as shown in FIG. 20, ignition of larger number of the ignition devices can be controlled easily and reliability of the thermal battery activation device can be improved. Furthermore, also in the practical example shown in FIG. 20, in which the FET 51 and the FET 52 are provided on the ground side as in the practical example shown in FIG. 19, when the power supply wire 11 disconnects, operation or stop of the resistance circuit 43 and the diagnosis circuit 44 can also be controlled. In that case, it is preferable that output of the comparator 45a of the disconnection detection circuit 45 is directly applied to the terminal 40p of the control circuit 40.

Furthermore, although the practical examples shown in FIG. 18 to FIG. 20 relate to the case in which the FET 51, the FET 52, the FET 51a, and the FET 52a are used for shutting off electric power supplied from the terminal 40c and the terminal 40d of the control circuit 40, switching elements such as a transistor and a relay switch other than an FET can be used instead of an FET.

Fifth Embodiment

There is shown a fifth preferable structure to solve the problem 1 referring to the accompanying drawings.

Figure 21:
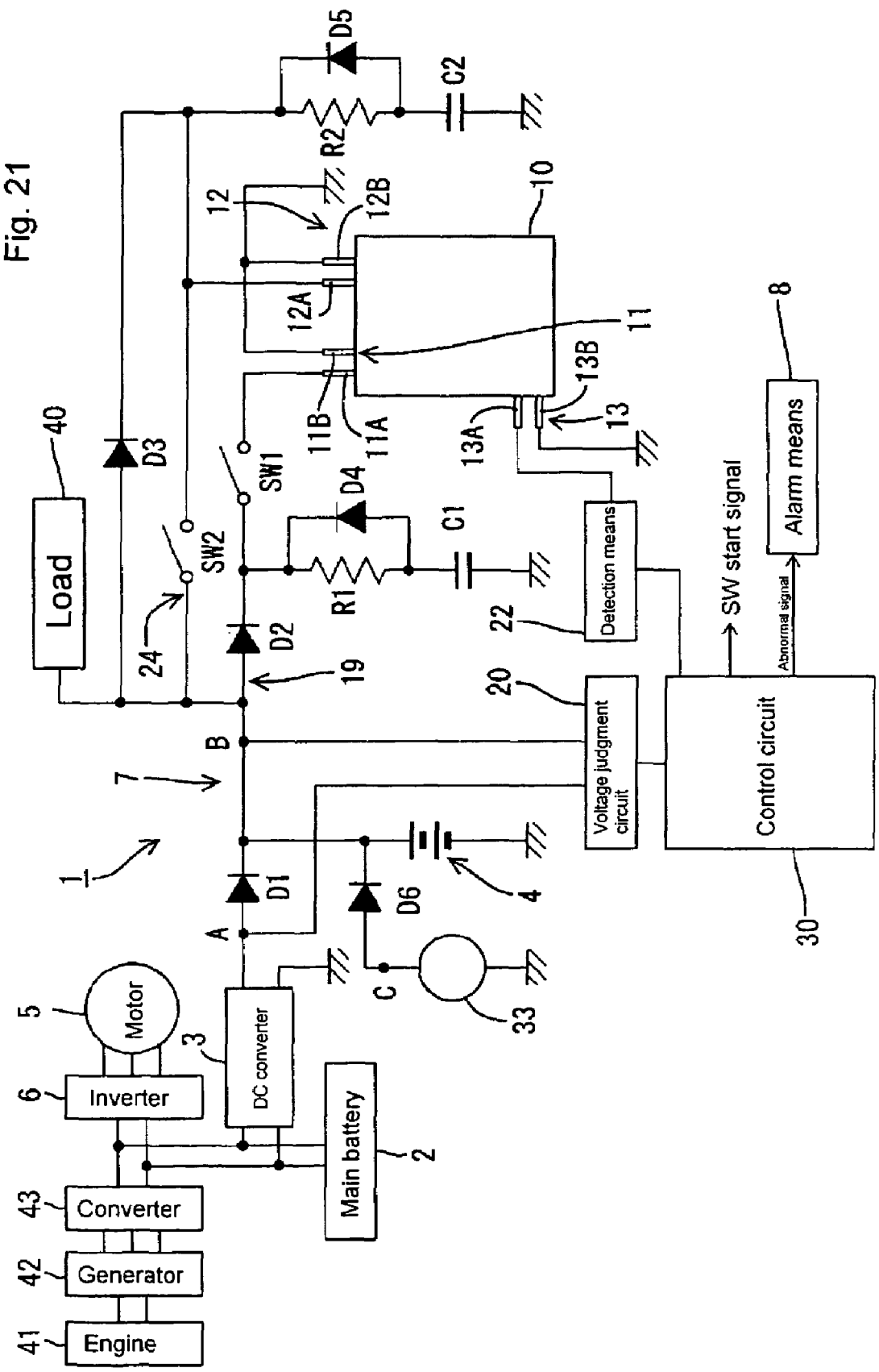
FIG. 21 is a structural diagram showing a first example according to a power unit of a fifth embodiment.

As shown in FIG. 21, a power unit for vehicles 1 (hereinafter, simply referred to as power unit 1) is constituted for a hybrid-type electric vehicle. This hybrid-type electric vehicle, which is mounted with a generator 42 driven by an engine, a motor for travel 5 connected to drive wheels of the vehicle for driving, and a main battery 2 constituted so that it can supply power to the motor for travel 5, is constituted so that the hybrid-type electric vehicle travels by driving the motor for travel 5 with electric power from the generator 42 or the main battery 2 whereas allows regenerative braking at the time of braking. As a concrete structure, the main battery 2 is connected to the motor for travel 5 through an inverter 6 whereas the generator 42 is connected to the inverter 6 and the main battery 2 through the converter 43. And it is constituted that an engine 41 is connected to the generator 42 so as to be driven, and that electric power of the generator 42 is supplied to the motor for travel 5 and the main battery 2 through the converter 43.

At the same time, a battery for auxiliary equipment 4 is provided as a second battery, composed of a lead-acid battery or other batteries for example. This battery for auxiliary equipment 4 is connected to the main battery 2 through a DC-DC converter 3 (hereinafter, also referred to as DC converter 3) composing a voltage transformation device, and voltage of the battery for auxiliary equipment 4 is decreased by this DC converter 3 from a level of the power supply system for travel to a level of the power supply system for auxiliary equipment. And auxiliary equipment electric apparatuses including control system electric apparatus such as an electric brake system, which will be described later, an electric power steering, a motor controller for controlling the motor for travel 5 (omitted in the figure), a generator controller for controlling the generator 42 (omitted in the figure) are connected to this battery for auxiliary equipment 4 as a load 40.

When the hybrid-type electric vehicle as constituted above travels on battery, electric power stored in the main battery 2, which is supplied to the motor for travel 5 through the inverter 6, can travel the electric vehicle by rotating and driving a drive wheel 11 connected to the motor for travel 12 so as to be driven. When the electric power stored in the main battery 2 decreases, hybrid travel being selected, the vehicle can be traveled by driving an engine 18 to operate the generator 42, storing generated electric power in the main battery 2 and supplying electric power to the motor for travel 5 through the inverter 6 at the same time, and then driving this motor for travel 5. At the time of regenerative braking, in contrast, regenerative electric power generated in the motor for travel 5 by regenerative brake is supplied to the main battery 2 and the DC converter 3 through the inverter 6.

Furthermore, at the time of battery travel, electric power stored in the main battery 2 is transformed by the DC converter 3 and stored in the battery for auxiliary equipment 4, and various loads 40 can be operated by electric power supplied from this DC converter 3 and the battery for auxiliary equipment 4. Furthermore, at the time of regenerative braking, in addition to electric power stored in the main battery 2, regenerative electric power is transformed by the DC converter 3 to be supplied to the battery for auxiliary equipment 4 and the loads 40.

In such a hybrid-type electric vehicle, the power unit 1 is provided with the main battery 2 and the battery for auxiliary equipment 4 which are constituted as batteries, and a thermal battery 10 which functions as the main power source which can be ordinarily used by the generator 42 for generating electric power when a prescribed requirement is met, and the motor for travel 5, at the same time functions as a stand-by power source for supplying power to the load 40 only at the time of abnormality when abnormality of power supply of the main power source is detected, in addition to these main power sources.

Referring now to FIG. 21, there is shown a power supply structure to the load 40.

As shown in FIG. 21, this power unit for vehicles 1 has a constitution such that power is normally supplied to the load 40 by the battery for auxiliary equipment 4 and the DC converter 3 and furthermore, a voltage judgment circuit 20 for detecting voltage levels of the DC converter 3 and the battery for auxiliary equipment 4 as a main power source abnormality detection means for detecting abnormality of this power supply. In the voltage judgment circuit 20 in FIG. 21, a terminal A for detecting voltage level of the DC converter 3 and a terminal B for detecting voltage level of the battery for auxiliary equipment 4 are respectively provided. And it is constituted so that the voltage levels of the terminals A, B can be detected with respect to each terminal and that the voltage levels of these terminals can be judged whether to be equal to a prescribed reference value or above, or not.

It is to be noted that the example in FIG. 21 shows the constitution in which an alternator 33 for auxiliary equipment as a power supply means for auxiliary equipment is provided, and that the alternator for auxiliary equipment 33 also functions as a part of the main power source here. Consequently, abnormality of the main power source may also be judged by detecting output voltage level of the alternator for auxiliary equipment 33. For example, voltage level of a terminal C can be judged by the voltage judgment circuit 20 through a detection wire (not shown). Furthermore, it may also be constituted that such an alternator for auxiliary equipment 33 is not provided.

It is to be noted that the constitution for detecting abnormality shown here is only an example, and it may be constituted that voltage level of any one of the DC converter 3, the battery for auxiliary equipment 4 and the alternator for auxiliary equipment 33 is detected. Furthermore, abnormality detection methods other than the method by voltage detection may be employed. For example, a method such that revolutions of the generator 42 or the alternator for auxiliary equipment 33 are detected so as to judge these abnormalities based on its revolutions. In any case, various constitutions are available as long as the constitutions detect abnormality of power supplied from the main power source. It is to be noted that as a concrete structure for the voltage judgment circuit 20, it is enough if output voltage level of the DC converter 3 or the battery for auxiliary equipment 4 can be detected whether to be equal to a prescribed reference value or above, or not. Various structures are conceivable and for example, it may be constituted that output voltage of the DC converter 3 or the battery for auxiliary equipment 4 is detected in a comparison circuit for comparing with a prescribed reference voltage. Here, when at least either one of voltage levels of the terminal A and the terminal B is equal to a prescribed value or under, the main power source determines abnormality and outputs a signal indicating abnormality of the main power source from the voltage judgment circuit 20 to the control circuit 30, and the control circuit 30 then starts up the thermal battery 10 based on the signal by a control method, which will be described later.

Next, there is shown a power source means for starting up the thermal battery 10.

Since the thermal battery 10 as constituted above has a constitution such that the squib 15 (FIG. 23) is ignited and activated by carrying electric current to the terminal for ignition 11, electric current is carried to the terminal for ignition 11 by turning ON a switch SW1 when starting up the thermal battery 10. When turning ON the switch SW1, electric power for start is supplied from the DC converter 3, the battery for auxiliary equipment 4 and the like. Specifically, power for start is supplied from auxiliary power source means (the motor for travel 5, the generator 42 and the like) other than batteries (the main battery 2, the battery for auxiliary equipment 4) to the thermal battery 10, and the thermal battery 10 can be started reliably regardless of battery residual capacity.

It is to be noted that although the constitution in the FIG. 21 relates to the case in which electric power for start is supply from both the auxiliary power source means and the battery, electric power for start may be supplied only from the auxiliary power source means. In any case, the auxiliary power source means is a necessary component for supplying electric power for start. It is to be noted that in the constitution in the FIG. 21, when residual electric power of the battery for auxiliary equipment 4 or the main battery 2 is small, or when power cannot be supplied, electric current for ignition mainly composed of electric power from the motor for travel 5 or the generator 42, is supplied to the terminal for ignition 11 through the line for ignition 19.

It is to be noted that although the above constitution shows the example in which electric power for ignition is supplied by the generator, another auxiliary power source means may be provided instead of this generator or together with the generator. In the constitution of FIG. 21, a condenser C1 parallelly connected to the battery for auxiliary equipment 4 is provided. This condenser C1 is parallelly connected to the main power source through a resistor for charge R1, and is charged by the main power source. Furthermore, a diode D2 for preventing reverse flow is provided in the line for ignition 19. Furthermore, a diode D4 for rapid discharge is connected parallel to the resistor for charge R1, when turning ON the switch SW1 with the condenser C1 being charged, electricity is rapidly discharged to the terminal for ignition 11 through this diode D4. It is to be noted that it may be constituted that the resistor for charge R1 and the diode D4 are not used, and that it may also constituted that such a condenser C1 are not provided.

Furthermore, an output line 24 leading from the output terminal 12 of the thermal battery 10 to the load 40 is provided, and the switch SW2 intervenes between the output terminal 12 and the load 40. By turning ON the switch SW2, output electric current from the thermal battery 10 is supplied to the load 40. It is to be noted that, although not shown here in the figure, it may be constituted that by intervention of the constant voltage circuit between the output terminal 12 of the thermal battery 10 (specifically, positive electrode terminal 12A) and the load 40 constant voltage can be supplied to the load.

Figure 22:
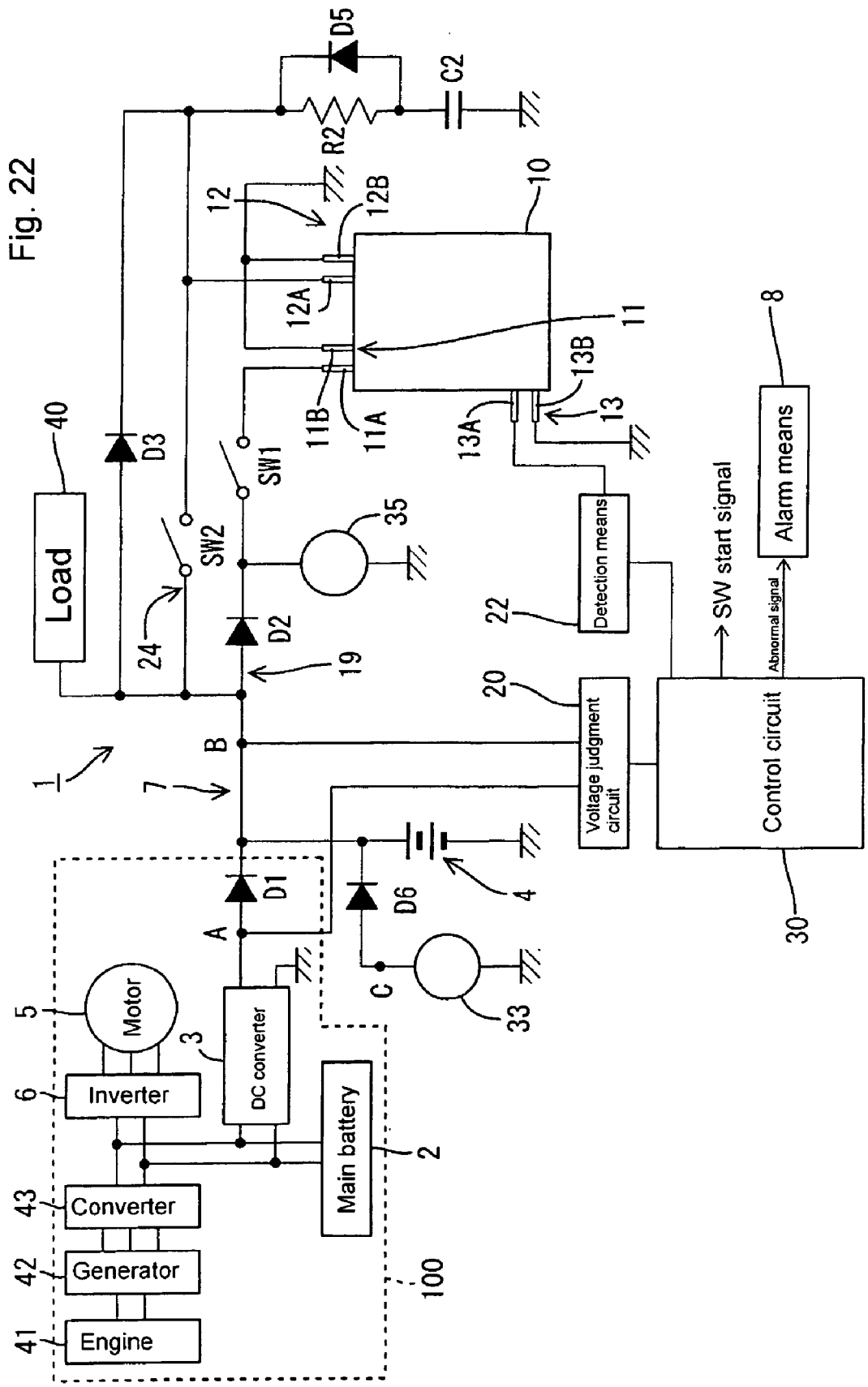
FIG. 22 is a structural diagram showing a second example according to the power unit of the fifth embodiment.

As another example, there is shown an example in which the generator for start 35 for starting up the thermal battery 10 is independently provided as an auxiliary power source means (FIG. 22). It is to be noted that regarding the other parts, since almost identical to the ones in the first embodiment, the description thereof is omitted. This generator for start 35 can be constituted as an alternator (alternating current generator) or a dynamo (direct current generator) so as to be driven by an engine, for example. It is to be noted that the generator for start 35 can be small-sized since it is enough if it generates electromotive force required for ignition.

Although the above embodiment describes the case which is applied to a hybrid electric vehicle, may be applied to a fuel battery automobile (fuel battery hybrid automobile included) and the like. It is to be noted that the above first and second embodiments describe the case in which the battery for normal use is composed of two components of the main battery 2 and the battery for auxiliary equipment 4, is similarly applicable to the case of one component or three components or more.

Furthermore, although the thermal battery 10 is constituted as a power source for emergency use for auxiliary equipment in the above embodiment may be constituted as a power source for emergency use for travel and constituted so as to supply power from the thermal battery 10 to the motor for travel 5 in an emergency. Furthermore, although the above embodiment describes an electric vehicle provided with a motor for travel and a hybrid-type electric vehicle, may constitute a power unit which intends vehicles without a motor for travel, only by an engine to drive the wheels.

Sixth Embodiment

There are shown first and second preferable constitutions to solve the problem 2 referring to the accompanying drawings.

Figure 24:
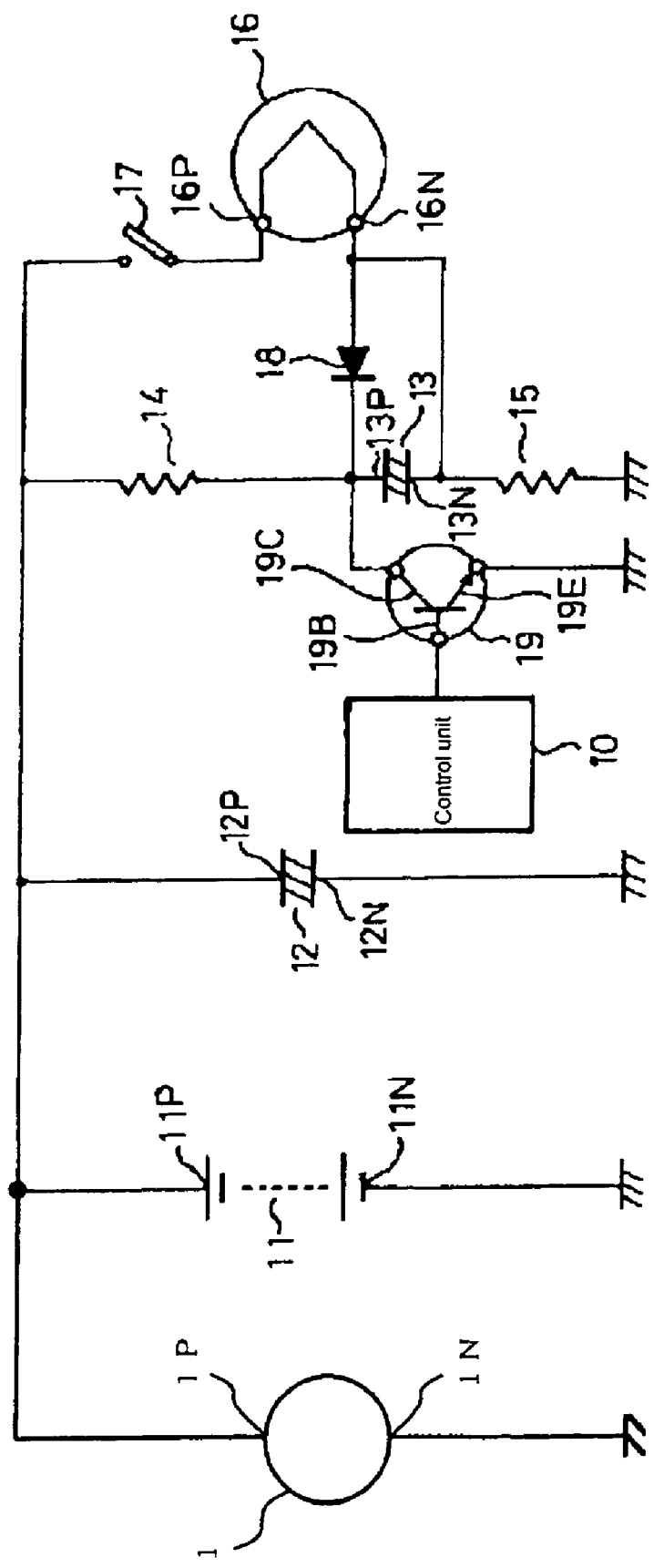
FIG. 24 is a structural diagram showing a first example according to a power unit of a sixth embodiment.

FIG. 24 is a first example showing a circuit of a thermal battery activation device provided in a power unit of this constitution. A main power source of this circuit is composed of a generator 1 and a main storage battery 11. Although this generator 1 is an alternating current generator generally, since the generator 1 is frequently used as a direct current power source when mounted on a movable body, it is general to rectify electric current generated by an alternating current generator, using a rectifier (not shown). The generator 1 is driven by an internal combustion engine (not shown) while the movable body is traveling to supply electric power to various electric apparatuses provided in the movable body, and at the same time generator 1 charges the main storage battery 11. Is to be noted that a negative electrode 1N of the generator 1 and the negative electrode 11N of the main storage battery 11 are earthed to a body.

The circuit shown in FIG. 24 is provided with a first condenser 12 and a second condenser 13. A positive electrode 12P of the first condenser 12 is connected to a positive electrode 1P of the generator 1 and a positive electrode 11P of the main storage battery 11, and a negative electrode 12N of the first condenser 12 is earthed to the body. And a positive electrode 13P of the second condenser 13 is connected to the positive electrode 1P of the generator 1 and the positive electrode 11P of the main storage battery 11 through a positive electrode side current limiting resistor 14, and the negative electrode 13N of the second condenser 13 is grounded through a negative electrode side current limiting resistor 15.

Furthermore, the circuit shown in FIG. 24 is provided with a thermal battery activation circuit 16. A terminal 16P on the positive electrode side of the thermal battery activation circuit 16 is connected to the positive electrode 1P of the generator 1 and the positive electrode 11P of the main storage battery 11 through a voltage sensor 17 which closes electrically by detecting voltage decrease of the main storage battery 11 and/or the generator 1. This prevents operation of the thermal battery activation circuit 16 caused by malfunction of the control unit 10 by the voltage sensor 17. And a terminal 16N on the negative electrode side of the thermal battery activation circuit 16 and the positive electrode 13P of the second condenser 13 are connected through a diode 18. The diode 18, whose anode is connected to the terminal 16N on the negative electrode side of the thermal battery activation circuit 16, its cathode is connected to the positive electrode 13P of the condenser 13.

Furthermore, the circuit shown in FIG. 24 is provided with a NPN transistor 19. A collector 19C of the NPN transistor 19 is connected to the positive electrode 13P of the second condenser 13, an emitter 19E of the NPN transistor 19 is grounded, and a base 19B of the NPN transistor 19 is connected to the control unit 10. This NPN transistor 19 functions as a switch for grounding the positive electrode 13P of the second condenser 13.

The control unit 10 shown in FIG. 24, which is composed of a logic circuit such as a microcomputer, applies bias voltage to a base 19B of the NPN transistor 19 when detecting voltage decrease of the main storage battery 11 and/or the generator 1. The NPN transistor 19 in which bias voltage is applied to the base 19B, become possible to flow electric current. That is, the NPN transistor 19 functions as a main switch.

FIGS. 25 (A) to (C) show an equivalent circuit for illustrating operation of the practical example shown in FIG. 24. (A) shows the case in which both of the first condenser 12 and the second condenser 13 are normal, (B) shows the case in which failure generates on the negative electrode 13N side of the second condenser 13, and (C) shows the case in which failure generates on the positive electrode 12P side of the first condenser 12. It is to be noted that a broken line shown in FIGS. 25 (A) to (C) shows that no operation is performed.

As shown in FIG. 25 (A), in the case in which both of the first condenser 12 and the second condenser 13 are normal, when both of the voltage sensor 17 and the NPN transistor 19 close, the first condenser 12 and the second condenser 13 become substantially series-connected with the result that voltage about twice as high as the voltage of the main storage battery 11 can be applied to the thermal battery activation circuit 16.

As shown in FIG. 25 (B), in the case in which failure generates on the negative electrode 13N side of the second condenser 13, when both of the voltage sensor 17 and the NPN transistor 19 close, a bypass is constituted by the diode 18 with the result that voltage of the first condenser 12 can be applied to the thermal battery activation circuit 16.

As shown in FIG. 25 (C), the case in which failure generates on the positive electrode 12P side of the first condenser 12, when both of the voltage sensor 17 and the NPN transistor 19 close, voltage of the second condenser 13 can be applied to the thermal battery activation circuit 16.

Figure 26:
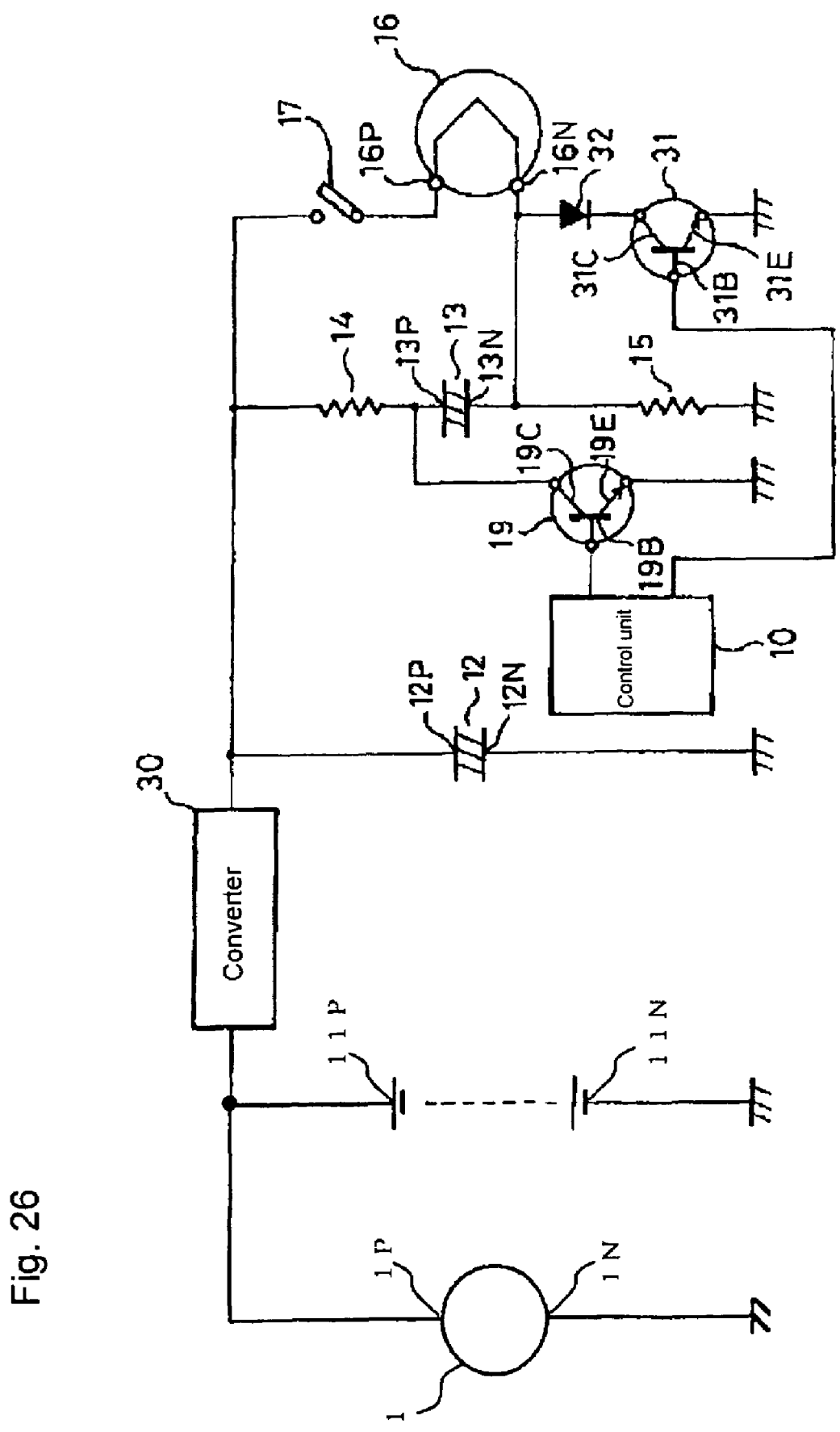
FIG. 26 is a structural diagram showing a second example according to the power unit of the sixth embodiment.

FIG. 26 is a second example showing the circuit of the thermal battery activation device provided in the power unit of this constitution. The same components as in the practical example shown in FIG. 24 have the same reference numbers and a description is given for differences from FIG. 24. The circuit in FIG. 26, in which the generator 1 and the main storage battery 11 are connected to the converter 30, is constituted so that voltage increased to a higher level than the voltages of the generator 1 and the main storage battery 11 can be applied to the thermal battery activation circuit 16.

The circuit shown in FIG. 26 is provided with a diode for negative voltage protection 32 and a second NPN transistor 31 for functioning as a sub switch. An anode of the diode for negative voltage protection 32 is connected to the terminal 16N on the negative electrode side of the thermal battery activation circuit 16, and a cathode of the diode for negative voltage protection 32 is connected to a collector 31C of the second NPN transistor 31. An emitter 31E of the second NPN transistor 31 is grounded and a base 31B of the second NPN transistor 31 is connected to the control unit 10. When detecting voltage decrease of the main storage battery 11 and/or the generator 1, the control unit 10 applies bias voltage to the base 31B of the second NPN transistor 31 immediately after that so that the NPN transistor 31 can flow electric current.

Figure 27:
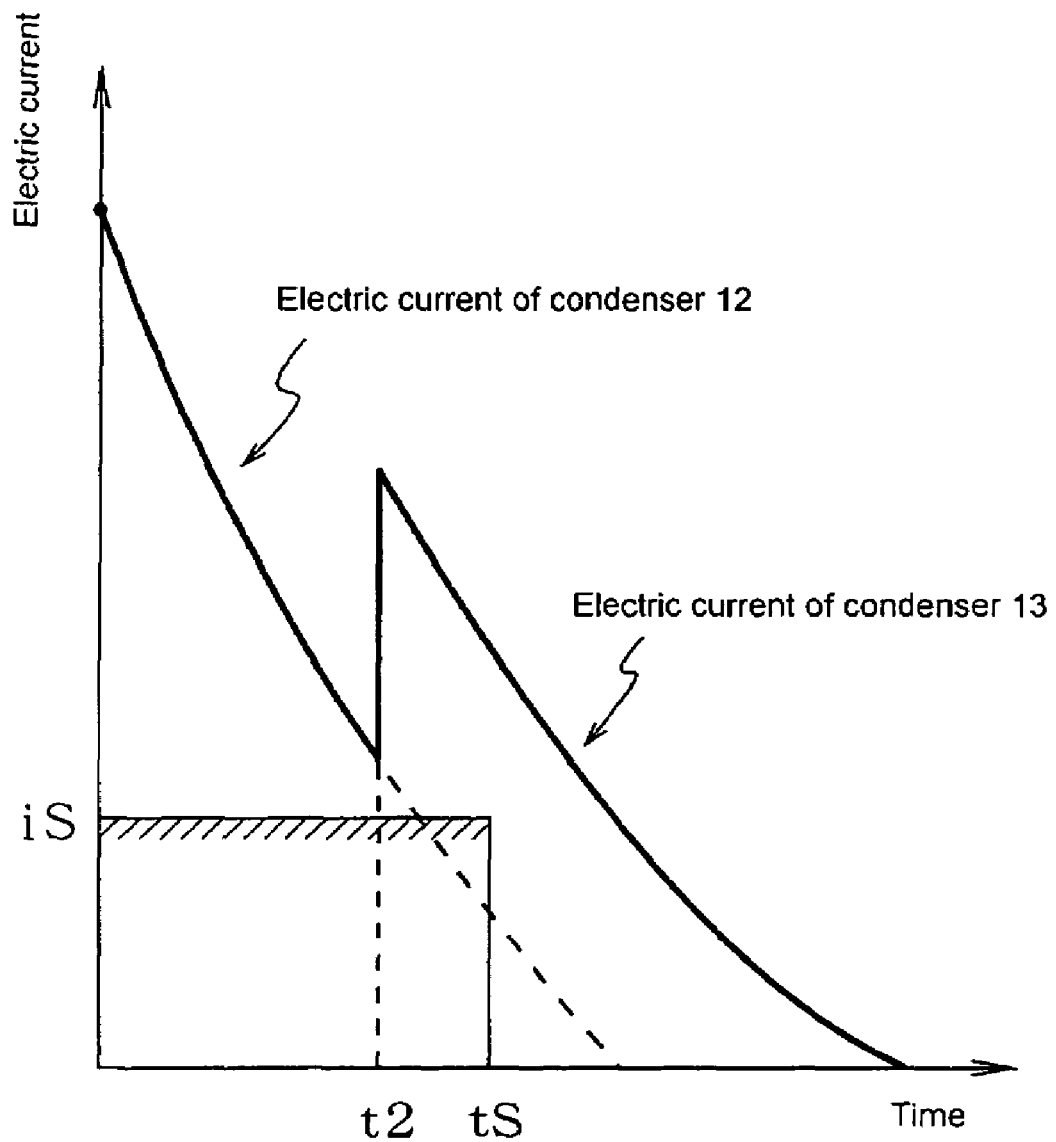
FIG. 27 is a view for explaining an operation of the second example.

FIG. 27 is a explaining an operation of the circuit shown in FIG. 26, in which the horizontal axis indicates time elapsed whereas the vertical axis indicates electric current flowing through the thermal battery activation circuit 16. It is assumed that electric current of a prescribed value iS or above is required to flow continuously for a time of a prescribed value tS or longer for operating the thermal battery activation circuit 16 reliably. In FIG. 26, the first condenser 12 and the second condenser 13, even which have a relatively small capacity, are charged with a voltage having been increased by the converter 30 so as to be charged at high voltage. Consequently, when the voltage sensor 17 closes by detecting voltage decrease of the main storage battery 11 and/or the generator 1 and the second NPN transistor 31 becomes possible to flow electric current, voltage of the first condenser 12 is applied to the thermal battery activation circuit 16.

However, since having a small capacity and consequently a small electric charge quantity stored therein, the first condenser 12 cannot flow electric current of a required amount for a required time for operating the thermal battery activation circuit 16. Consequently, the control unit 10 puts the NPN transistor 19 into a state that electric current can flow after a prescribed time t2 has passed after detecting voltage decrease of the main storage battery 11 and/or the generator 1, and applies electric charge stored in the second condenser 13 to the thermal battery activation circuit 16. As a result, electric charge stored in the condenser 13 at time t2 is superposed on which allows the thermal battery activation circuit 16 to operate reliably.

The third example of this constitution regulates time t2 when the NPN transistor 19 become possible to flow electric current comes earlier as voltage of the main storage battery 11 and/or the generator 1 becomes low. This is because electric current with the condenser 12 as a power source decreases at an early time, and this allows energy to be supplied to the thermal battery activation circuit 16 more reliably.

Seventh Embodiment

There are shown third, fourth and fifth preferable constitutions to solve the problem 2 referring to the accompanying drawings.

Figure 28:
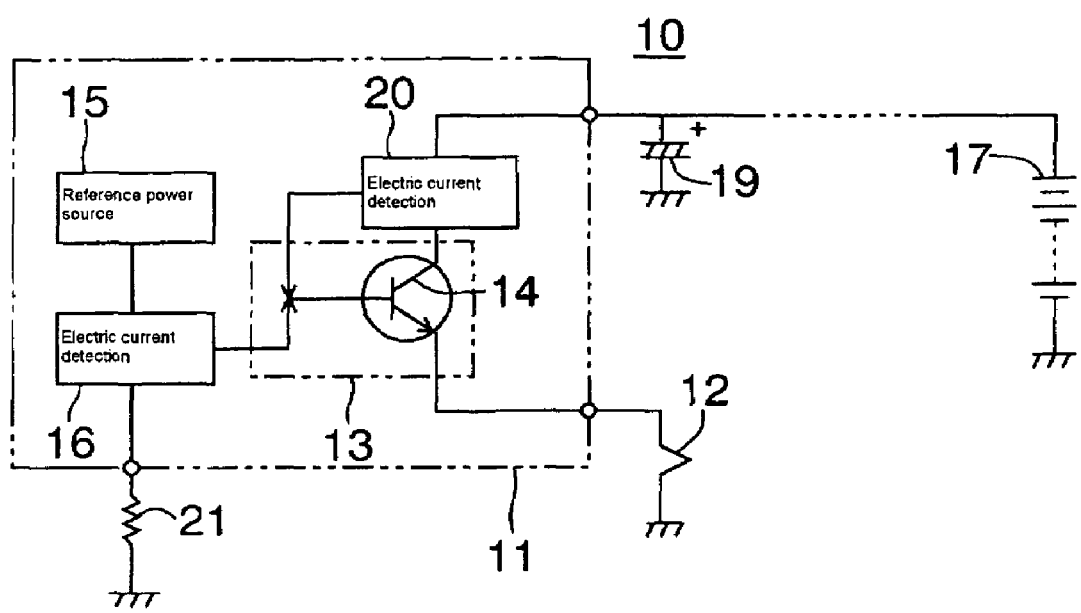
FIG. 28 is a structural diagram showing a first example of an ignition electric current limitation circuit according to a power unit of a seventh embodiment.

FIG. 28 is a view showing schematic constitution of the ignition electric current limitation circuit 10 showing a first example according to this constitution. This ignition electric current limitation circuit 10 is provided with a semiconductor integrated circuit 11, a thermal battery activation circuit 12, a condenser 19, a main storage battery 17 and a pull-down resistor 21. And the semiconductor integrated circuit 11 is provided with an ignition drive circuit 13 connected to the thermal battery activation circuit 12, a reference power supply 15, a reference electric current detection circuit 16 and an ignition electric current detection circuit 20. And furthermore, the ignition drive circuit 13 contains a NPN-type ignition transistor 14.

Electric power supplied to the ignition electric current limitation circuit 10 is supplied from the main storage battery 17 mounted on the vehicle, the generator (not shown) or the like. When voltage of the main storage battery and/or the generator (preferably, the respective of the main storage battery and the generator) decreases to a prescribed value or under (more preferably, the movable body is traveling), the thermal battery activation device flows electric current through the squib of the thermal battery to activate the thermal battery. Additionally, even when a cable connecting to the main storage battery and/or the generator disconnects for some reason or other while the movable body is traveling, the thermal battery requires to be activated. Also in this case, the condenser 19 storing electric charge temporarily from the main storage battery 17 or the generator allows ignition electric current to flow through the thermal battery activation circuit 12.

In this first example, constant reference electric current flows through the pull-down resistor 21 connected to the outside of the semiconductor integrated circuit 11 by reference voltage generated by the reference voltage source 15, and the reference electric current is detected by the reference electric current detection circuit 16. And by controlling the ignition transistor 14 by the comparison between ignition electric current and reference electric current, the ignition electric current is controlled to be within a prescribed range.

Figure 29:
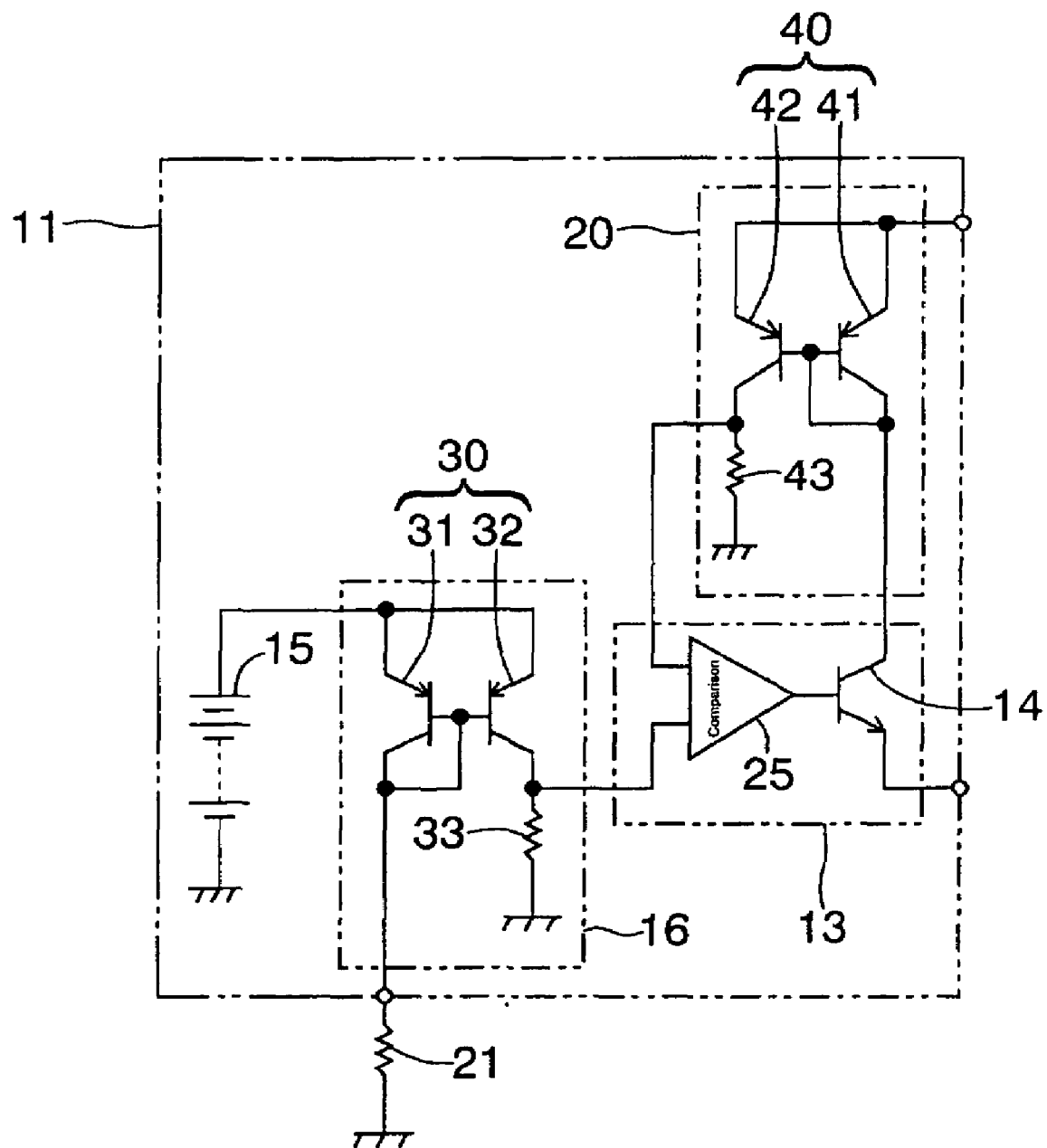
FIG. 29 is a view for explaining details of FIG. 28.

FIG. 29 shows details of the reference electric current detection circuit 16 and the ignition electric current detection circuit 20. In FIG. 29, these circuits 16, 20 are composed of a current mirror circuit. A comparison circuit 25 compares outputs of the two current mirror circuits, and the ignition transistor 14 is controlled by the comparison. A current mirror circuit 30 composing the reference electric current detection circuit 16 is provided with PNP transistors 31, 32 and their emitters and bases are commonly connected. When reference electric current flows between the emitter and the collector of one PNP transistor 31, since the base is commonly connected to this collector, electric current corresponding to the electric current flowing through the emitter and the collector of one PNP transistor 31 flows between the emitter and the collector of the other PNP transistor 32. This electric current generates a prescribed voltage at both ends of the resistor 33.

A current mirror circuit 40 composing the ignition electric current detection circuit 20, similarly, contains PNP transistors 41, 42 whose emitters and bases are commonly connected respectively. When ignition electric current flows between the emitter and the collector of one PNP transistor 41, since the base of the other PNP transistor 42 is commonly connected, electric current corresponding to ignition electric current flows between the emitter and the collector of the other PNP transistor 42. This electric current is detected as voltage drop of the resistor 43.

In the current mirror circuits 30, 40, since electric current corresponding to the electric current flowing between the emitters and the collectors of the transistors 31, 41 flows between the emitters and the collectors of the other transistor 32, 42 depending on the ratio of base-emitter junction areas of the respective transistors 31,32 and 41, 42, the comparison circuit 25 can compare reference electric current and ignition electric current, by setting the ratio of base-emitter junction area and the ratio of resistance values of the resistor 33 and the resistor 43 as required. Here, regarding the resistor 33 and the resistor 43 integrated inside the semiconductor integrated circuit 11, although dispersion in the absolute values of resistance values becomes large as described above, a resistor integrated inside the semiconductor integrated circuit 11 can reduce relative dispersion. Therefore, in the present method, in which the ratio of the resistance values of the resistor 33, the resistor 43 are set, reference electric current and ignition electric current can be compared accurately.

Figure 30:
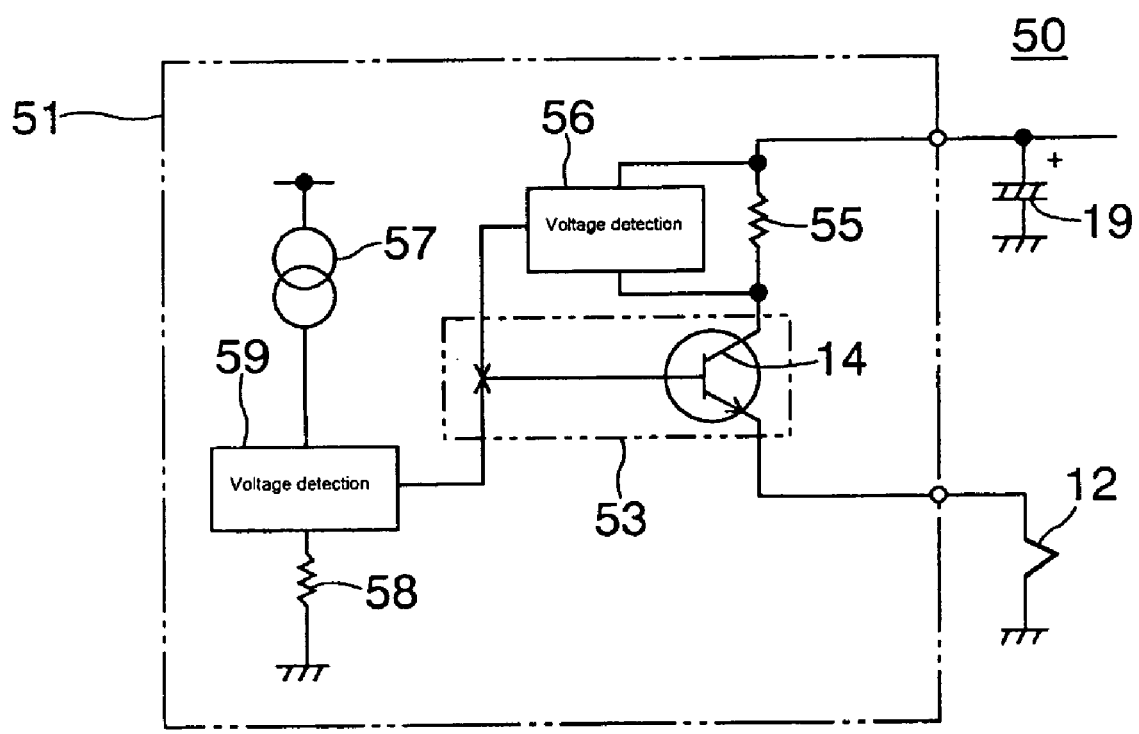
FIG. 30 is a structural diagram showing a second example of the ignition electric current limitation circuit according to the power unit of the seventh embodiment.

FIG. 30 is a schematic constitution of the ignition electric current limitation circuit 50 showing a second example according to this constitution. This ignition electric current limitation circuit 50, similarly to the one shown in FIG. 28, is provided with a thermal battery activation circuit 12, condenser 19, and semiconductor integrated circuit 51. And the semiconductor integrated circuit 51 is provided with an ignition drive circuit 53, an electric current detection resistor 55, a voltage detection circuit 56, a constant current source 57, a pull-down resistor 58, and a voltage detection circuit 59.

The constant current source 57 provided in the semiconductor integrated circuit 51 flows constant electric current to the pull-down resistor 58 provided in the semiconductor integrated circuit 51, and the voltage detection circuit 59 detects the voltage generated by that. With a value of the voltage detected by the voltage detection circuit 59 as reference, the voltage detection circuit 56 reads voltage drop value generating in the electric current detection resistor 55 when ignition electric current flows to limit ignition electric current. Also in this case, although the resistor 55 and the resistor 58 provided in the semiconductor integrated circuit 51 have large dispersion in the absolute values of resistance values, since relative dispersion of the resistors can be reduced as described in the example of FIG. 28, ignition electric current can be limited accurately.

Figure 31:
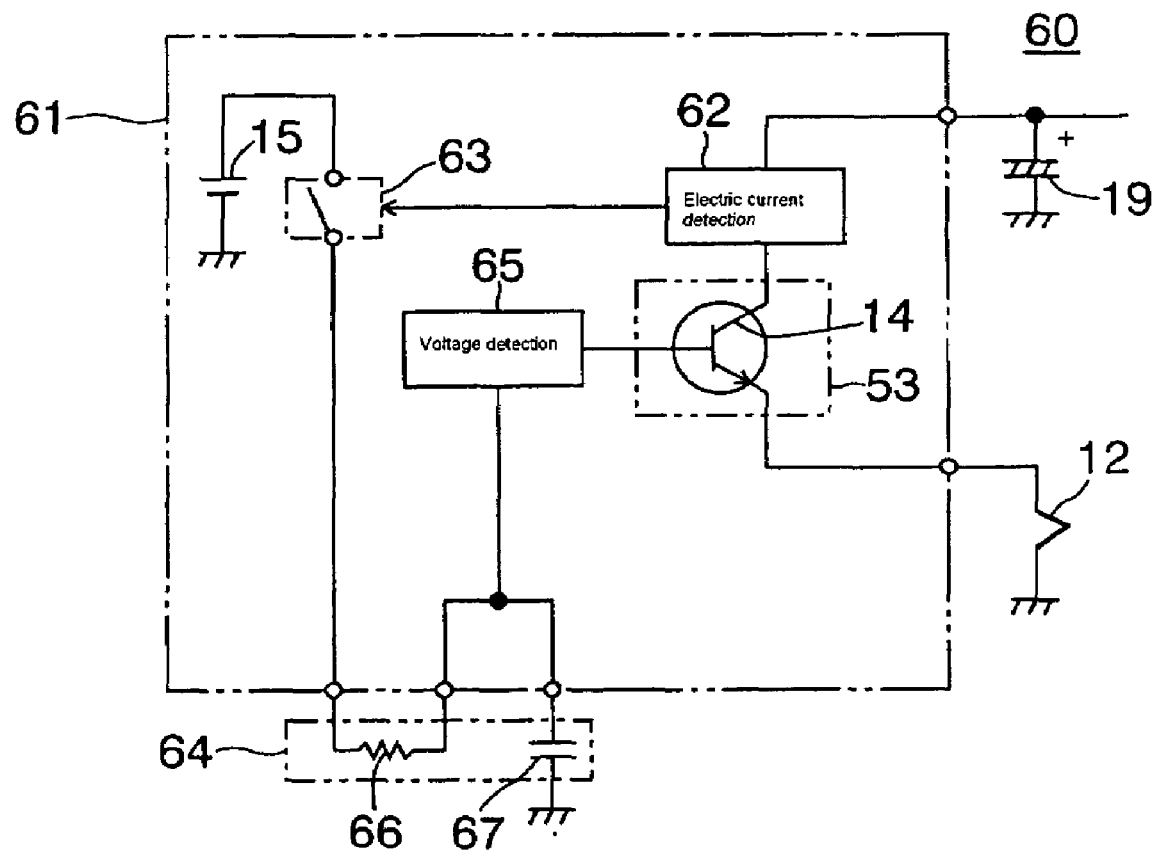
FIG. 31 is a structural diagram showing a third example of the ignition electric current limitation circuit according to the power unit of the seventh embodiment.

FIG. 31 is a schematic constitution of the ignition electric current limitation circuit 60 showing a third example according to this constitution. This ignition electric current limitation circuit 60, similarly to the one shown in FIG. 28, is provided with a thermal battery activation circuit 12, a condenser 19 and a semiconductor integrated circuit 61, and is further provided with a time limitation means 64. And the semiconductor integrated circuit 51 is provided with a reference power supply 15, an ignition drive circuit 53, an electric current detection circuit 62, an electric current limitation switch 63, and a voltage detection circuit 65. The time limitation means 64 is provided with an integrating circuit to which the resistor 66 and the condenser 67 are serially connected.

The electric current detection circuit 62 detects ignition electric current to control the ignition transistor 14 provided in the ignition drive circuit 53. The electric current limitation switch 63 starts electric current limitation when the reference power supply 15 and the electric current detection circuit 62 detect electric current exceeding limit electric current. The time limitation means 64 leads out voltage output corresponding to duration of the reference voltage given from the reference power supply 15 by operation of the electric current limitation switch 63. The voltage detection circuit 65 detects output voltage of the time limitation means 64.

The voltage detection circuit 65 detects charge voltage of the condenser 67 charged at the time constants of the resistor 66 and the condenser 67 through the resistor 66. When charge voltage of the condenser 67 exceeds a prescribed threshold value, the "voltage detection circuit 65 operates to shut off the ignition transistor 14. By changing resistance value of the resistor 66 or capacity of the condenser 67 provided in the time limitation means 64, the prescribed time can be changed.

Figure 32:
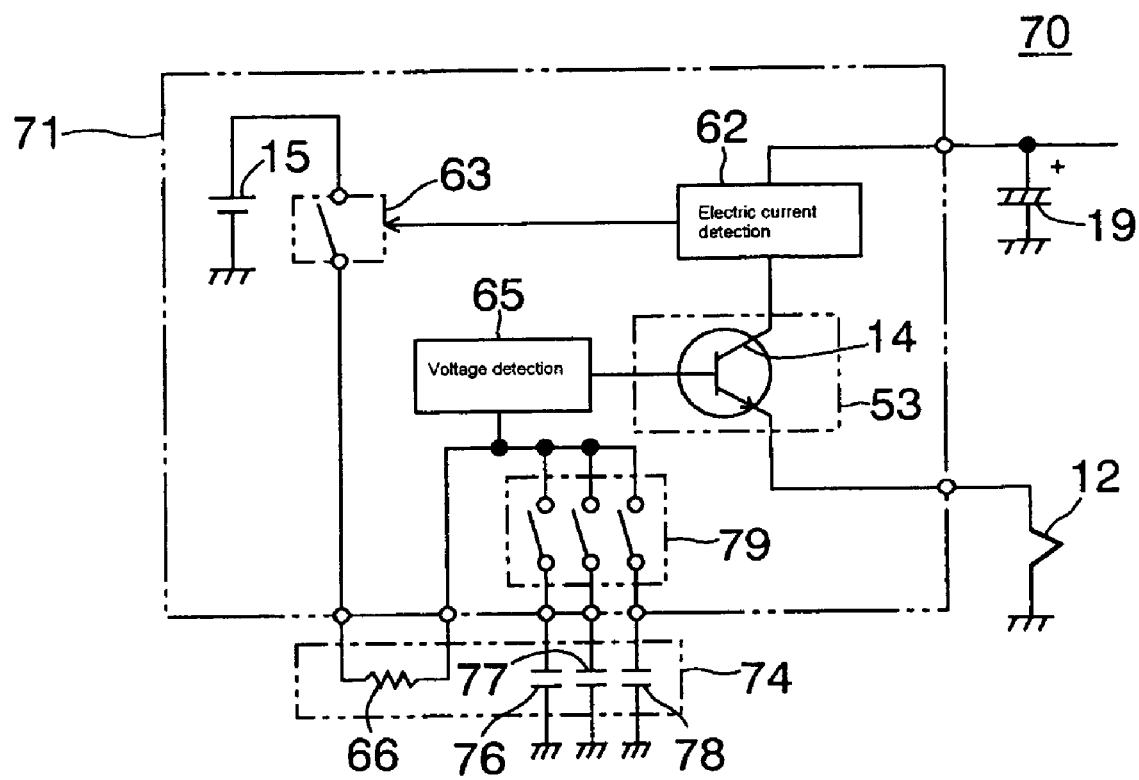
FIG. 32 is a structural diagram showing a fourth example of the ignition electric current limitation circuit according to the power unit of the seventh embodiment.

FIG. 32 is a schematic constitution of the ignition electric current limitation circuit 70 showing a fourth example according to this constitution. This ignition electric current limitation circuit 70, similarly to the one shown in FIG. 28, is provided with a thermal battery activation circuit 12, a condenser 19, and a semiconductor integrated circuit 71, and is further provided with a time limitation means 74. And the semiconductor integrated circuit 71 is provided with a reference power supply 15, an ignition drive circuit 53, an electric current detection circuit 62, an electric current limitation switch 63, a voltage detection circuit 65 and a changeover switch 79. In this fourth embodiment, the time limitation means 74 is provided with a plurality of condensers 76,77,78 and they are connected to the changeover switches 79. Since the time limitation means 74, which is an integrating circuit outside the semiconductor integrated circuit 71, can change time constant by the changeover switches 79 of the condensers 76,77,78, current carrying time of the ignition transistor 14 provided in the ignition drive circuit 53 can be changed arbitrarily. It is to be noted that this changeover switches 79 can be controlled by a microcomputer.

Figure 33:
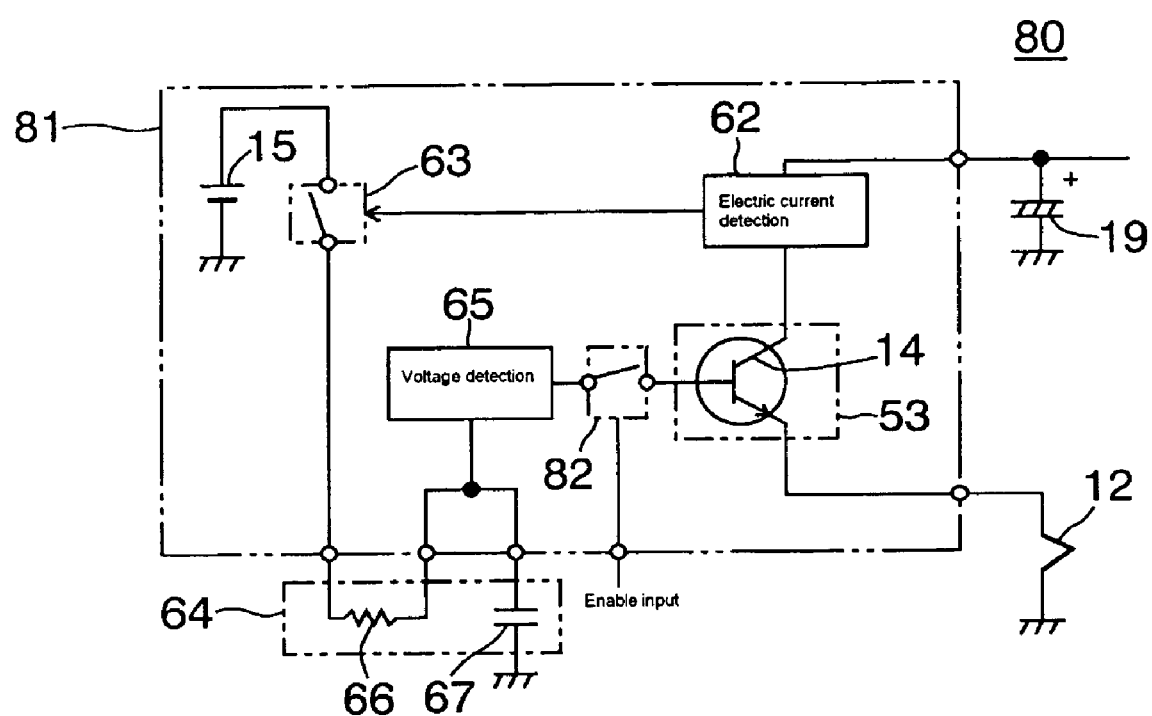
FIG. 33 is a structural diagram showing a fifth example of the ignition electric current limitation circuit according to the power unit of the seventh embodiment.

FIG. 33 is a schematic constitution of the ignition electric current limitation circuit 80 showing a fifth example according to this constitution. This ignition electric current limitation circuit 80, similarly to the one shown in FIG. 31, is provided with a thermal battery activation circuit 12, a condenser 19, a semiconductor integrated circuit 6 and a time limitation means 64. And the semiconductor integrated circuit 51 is provided with a reference power supply 15, an ignition drive circuit 53, an electric current detection circuit 62 an electric current limitation switch 63 and a voltage detection circuit 65, and is further provided with an invalidation switch 82 and an enable terminal. It is to be noted that the components corresponding to the ones in FIG. 31 have the same reference numbers and a description thereof is partially omitted in this fifth embodiment. The invalidation switch 82 invalidates control of ignition electric current carrying time by the time limitation means 64 connected to the outside by inputting from the outside. For example, when the microcomputer for controlling the whole thermal battery activation device applies a signal to an enable input of the invalidation switch 82, the time control by the time limitation means 64 connected to the outside stops, and only an "ignition OFF" command for terminating ignition from the microcomputer to the thermal battery activation circuit 12 becomes valid. This allows for flexible responses when ignition time requires to be changed.

It is to be noted that the above first to fifth examples describe the case an NPN transistor is used for the ignition transistor 14, but are not limited to the NPN transistor, and various switching elements such as a PNP transistor and a MOSFET can be used depending on each circuit. Furthermore, for the reference electric current detection circuit 16 and the ignition electric current detection circuit 20, the case in which a PNP transistor is used for the current mirror circuit 30, 40 has been shown, but is not limited to the PNP transistor as a transistor used for these current mirror circuits, and other type transistors can be used.

Eighth Embodiment

There is shown a preferable constitution to solve the problem 3 referring to the accompanying drawings.

First, a description is given for one example of an electronic control system to be an application object. Examples of the electronic control system to be an application object can include an electric brake system 50 shown in FIG. 35, for example, and this electric brake system 50 is constituted so that when the driver uses a pedal 51, a leg-power sensor 52 detects the leg-power to send an electrical signal to a brake ECU 53 through a communication line depending on the leg-power. This brake ECU 53 can be constituted so as to be provided with a microcomputer, various ICs or the like, for example, to control an electric motor 54 provided for each wheel depending on the electrical signal sent by the leg-power sensor 52, and to press a brake friction pad against a disk by this electric motor 54 to obtain wheel braking force. And it is constituted that electric power generated by the battery 14 or the alternator 33 is supplied through the power source control device 1 for electric power of this electric brake system 50.

Figure 34:
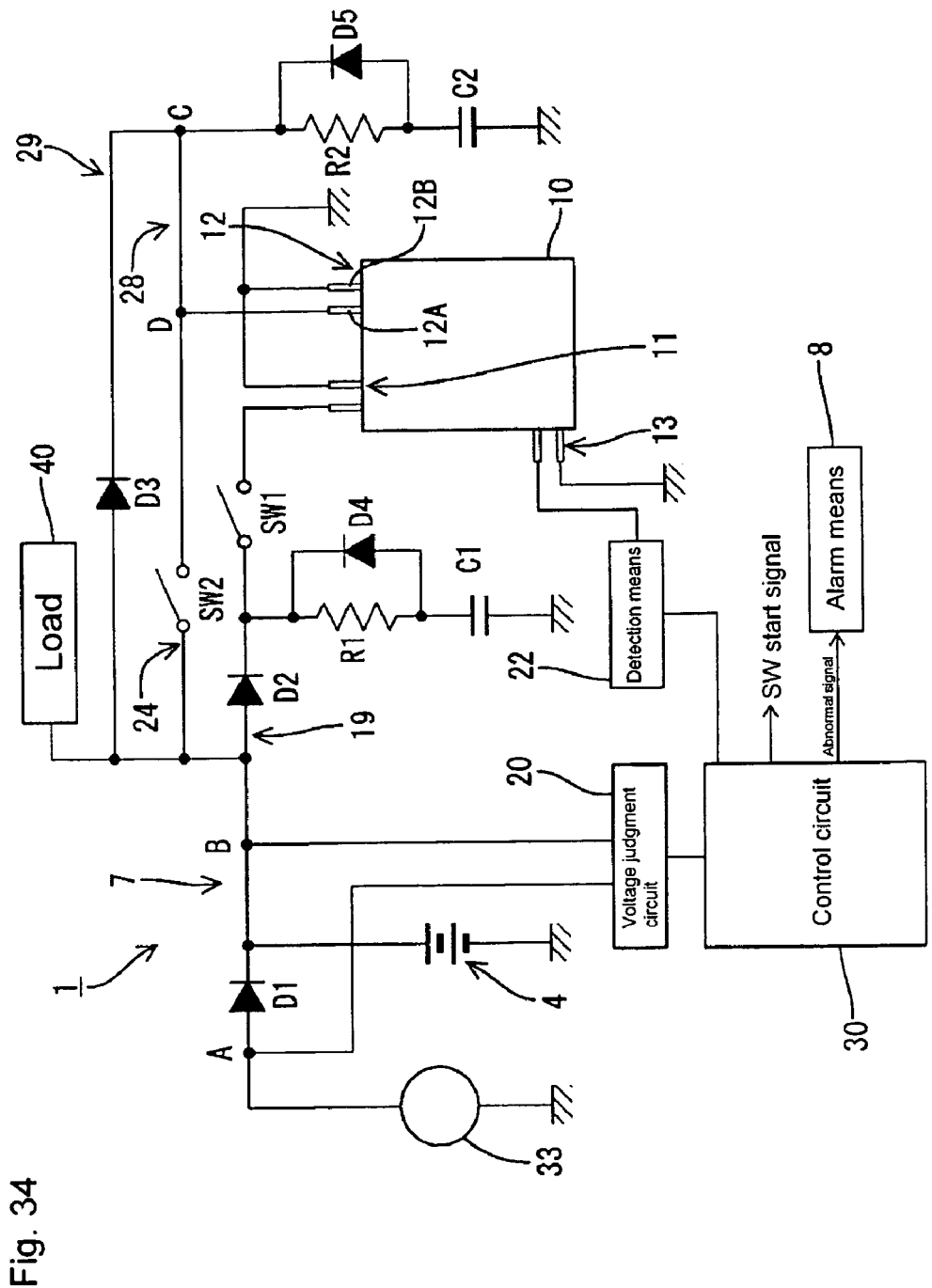
FIG. 34 is a structural diagram showing a first example of a power unit for vehicles according to an eighth embodiment.

Next, there is shown a constitution of the power unit for vehicles 1 for supplying power source to such an electric brake system or the like referring to FIG. 34.

FIG. 34 is a circuit diagram showing an essential part of the power unit for vehicles according to a first example of this embodiment. As shown in the same figure, the power unit 1 is provided with a main power source composed of a battery 4 composed of a lead-acid battery for example, and an alternator 33, for supplying power to a load 40 composed of an electronic control system such as by-wire type control systems including an electric brake system, and a voltage judgment circuit 20 (corresponds to main power source abnormality detection means) for detecting abnormality of the battery 4 or the alternator 33 based on voltage value as a main power source abnormality detection means for detecting abnormality of the main power source. In the voltage judgment circuit 20, a terminal A for detecting voltage level of the alternator 33 and a terminal B for detecting voltage level of the battery 4 are respectively provided. And it is constituted so that the voltage levels of these terminals A, B can be detected for each terminal to judge that the voltage levels of these terminals are equal to prescribed reference value or above. At the same time, it is constituted that a thermal battery 10 for supplying power to the load 40 when abnormality of the main power source is detected by this voltage judgment circuit 20 is provided to allow for power source supply even though the main power source is abnormal. Furthermore, a condenser C2 as a sub power source means for supplying power to the load 40 during the time until power supply by the thermal battery 10 starts up after abnormality is detected by the voltage judgment circuit 20 so that power source supply does not stop at an early stage of starting power source supply by the thermal battery 10.

It is to be noted that the constitution for detecting abnormality shown here is only an example, and it may be constituted that either one of the voltage levels of the alternator 33 and the battery 4 is detected. Furthermore, abnormality detection methods other than the method by voltage detection may be employed. For example, a method such that revolutions of the alternator 33 are detected so as to judge abnormality of the alternator 33 based on the revolutions. In any case, various constitutions are available as long as the constitutions detect abnormality of power supplied from the main power source. It is to be noted that as a concrete structure for the voltage judgment circuit 20, it is enough if voltage level of the alternator 33 or the battery 4 can be detected whether to be equal to a prescribed reference value or above, or not. Various structures are conceivable and for example, it can be constituted that voltage of the alternator 33 or battery 4 is detected in a comparison circuit for comparing with a prescribed reference voltage. Here, when at least either one of voltage levels of the terminal A and the terminal B is equal to a prescribed value or under, the main power source determines abnormality and outputs a signal indicating abnormality of the main power source from the voltage judgment circuit 20 to the control circuit 30, and the control circuit 30 then starts up the thermal battery 10 based on the signal by a control method, which will be described later.

Figure 23:
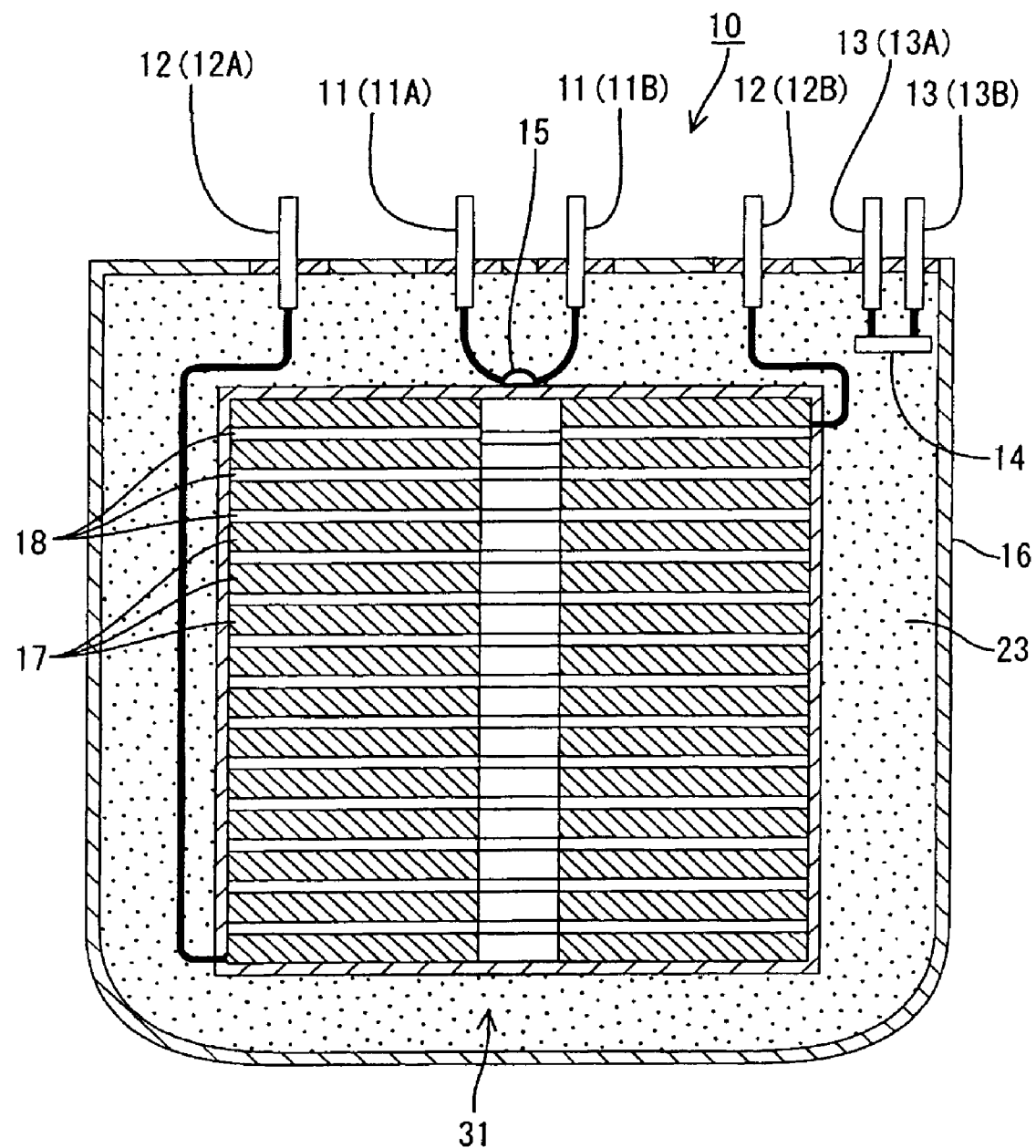
FIG. 23 is a view showing of one example of a thermal battery.

Next, there is shown a thermal battery used when the main power source is abnormal referring to FIG. 23. As shown in FIG. 23, a thermal battery 10 is a high temperature-type battery which uses molten salt for its electrolyte, and it is constituted that a heat generating agent, which is located inside the battery, ignites and combusts the heat generating agent as required so as to melt an inorganic salt which is solid and non-conductive at room temperature for activation. In the example of FIG. 23, the thermal battery 10 is constituted that a plurality of unit batteries 17 being laminated through a heat generating agent layer 18, are sealed in a container 16. This thermal battery 10 is provided with a terminal for ignition 11 for ignition (terminal 11A, terminal 11B) and furthermore, arranges a thermal insulation material 23 for thermal insulation around the unit batteries 17.

Furthermore, generally for electrolyte, LiCl—KCl system salt or other molten salts which have high ion conductivity, KBr—LiBr—LiCl system, LiBr—KBr—LiF system and LiBr—LiCl—LiF system are also available. Such a thermal battery 10, which is solid before activation, has little self-discharge and can be stored for a long period, is suitable as a power source for emergency use. Furthermore, for the heat-generating agent, a mixture of oxidizer and reducer with little amount of gas generation at the time of combustion can be used. In an activated state, high ion conductivity of molten salt allows for high power discharge. For positive active material, $V_2O_5$, $WO_3$, $CaCrO_4$, $FeS_2$ or the like is used, and for negative active material, Mg, Ca, Li, Li alloy or the like is used. And in the thermal battery 10 thus constituted, the thermal battery 10 is activated by carrying ignition electric current to the terminal for ignition 11, electromotive force generates between a positive electrode terminal 12A and a negative electrode terminal 12B of an output terminal 12 with the result that power can be supplied to the load 40 (FIG. 34) such as an electronic brake system for a prescribed time period.

Furthermore, as shown in FIG. 23, the thermal battery 10 is provided with a thermal fuse 14 which is cut off at high temperature (for example, one hundred and several tens degrees C.). For this thermal fuse 14, for example, low melting point metal, combination of resin and electric contact or the like is used. And in the above thermal battery 10, when the heat generating agent is ignited and combusted, since the inside of the thermal battery 10 reaches a high temperature with the result that the thermal fuse 14 is cut off, whether the thermal battery 10 reaches a high temperature or not, that is, whether the thermal battery 10 has been ignited and used can be determined.

In the example in FIG. 34, a thermal fuse state detection means 22 for detect a state of the thermal fuse 14 is connected to terminals for fuse 13 (positive electrode terminal 13A, negative electrode terminal 13B) corresponding to the thermal fuse 14. The thermal fuse state detection means 22 is constituted so as to detect whether the thermal fuse 14 is cutoff or not and to output an abnormal signal to the control circuit 30 when the thermal fuse 14 is cutoff. Specifically, for example, it can be constituted that slight electric current is flown through a line of the thermal fuse 14 and that the slight electric current is detected in an electric current detection circuit. In this constitution, when electric current is detected in the line of the thermal fuse 14, determined that the thermal fuse 14 is in a connected state, the thermal battery 10 can be used, on the other hand, when electric current is not detected, determined that the thermal battery 10 cannot be used, an abnormal signal is output to the control circuit 30. It is to be noted that the example shown here is only an example, and various constitutions can be used as long as the circuit structures can detect the cutoff state of the thermal fuse 14.

The thermal battery 10 as constituted above is constituted that the fusehead 15 (FIG. 23) is ignited and becomes activated by carrying electric current to the terminal for ignition 11. Therefore, when starting the thermal battery 10, electric current is carried to the terminal for ignition 11 by turning ON a switch SW1. In FIG. 34, it is constituted that electric current for ignition can be supplied from either one of the battery 4 and the alternator 33 by a line for ignition 19 connected to a power source line 7 constituted so as to lead from the main power source to the load 40. However, assuming the situation in which neither can be used here is provided a condenser for ignition C1 parallely connected to the main power source. This condenser for ignition C1 is constituted to be parallel connected to the main power source through a resistor for charge R1 so as to be charged by the main power source. Furthermore, a diode for preventing reverse flow D2 is provided in the line for ignition 19. Furthermore, a diode D4 for rapid discharge is connected parallel to the resistor for charge R1, when the switch SW1 turns ON with this condenser for ignition C1 being charged, electric current is rapidly carried to the terminal for ignition 11 through this diode D4 with the result that the thermal battery 10 is started. It is to be noted that it may be constituted that the resistor for charge R1 and the diode D4 are not used.

Furthermore, there is provided an output line 24 leading from an output terminal 12 of the thermal battery 10 to the load 40, and a switch SW2 intervenes between the output terminal 12 and the load 40. Output electric current from the thermal battery 10 is supplied from a positive electrode terminal 12A of the output terminal 12 to the load 40 by turning ON this switch SW2. It is to be noted that although not shown here in the figure, it can be constituted that constant voltage is supplied to the load by a constant voltage circuit intervening between the output terminal 12 of the thermal battery 10 and the load 40.

Next, there is shown a sub power source means.

As shown in FIG. 34, there is provided a condenser C2 electrically connected to a main power source line 7 of the power unit for vehicles 1 as a sub power source means, and this condenser C2 is constituted so as to be charged by power supply from this main power source. Furthermore, the condenser C2, whose one side is grounded, and a line for charge 29 and a line for discharge 28 branching from the terminal C are respectively provided on the other side thereof. The line for charge 29 connected to the main power source line 7 through the diode D3 for preventing reverse flow, carries electric current in the direction leading from the main power source to the condenser C2. At the same time, the discharge line 28 is connected to an output line 24 of the thermal battery 10 (line leading from output terminal 12 to power source line 7) and has continuity with the load 40 by turning ON the switch SW2.

Here, a resistor for charge R2 is connected in series with the line for charge 28 and furthermore, the diode for rapid discharge D5 is connected parallel to this resistor for charge R2. At the time of charge, electric current from the main power source is supplied to the condenser C2 through the resistor for charge R2 whereas is supplied through the diode D5, through the discharge line 28 and through output line 24 in common with the thermal battery 10, to the load 40 at the time of discharge. It is to be noted that the resistor for charge R2 and the diode for rapid discharge D5 are respectively provided in the constitution of FIG. 34, but do not need to be provided.

Furthermore, although it is constituted that discharge is performed from the condenser C2 by turning ON the switch SW2 provided in the output line 24, it can be constituted that the switch SW2 are not provided.

Next, there is shown abnormality detection process while the vehicle is traveling.

Figure 36:
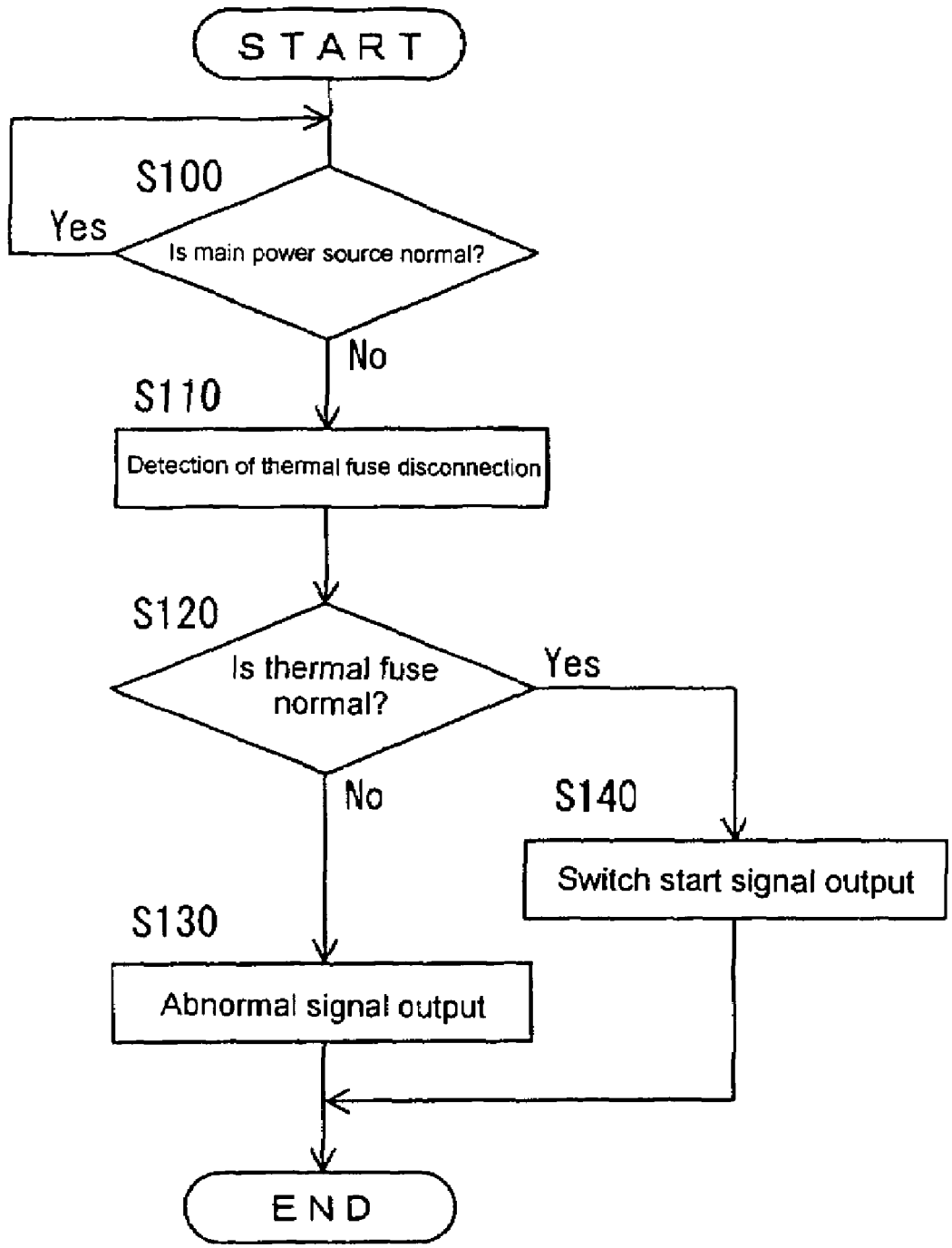
FIG. 36 is a flow chart showing control flow in the eighth embodiment.

The flow chart of FIG. 36 shows a flow of abnormality detection process in the control circuit 30. When the voltage judgment circuit 20 detects that voltage of either of the alternator 33 or the battery 4 decreases to a prescribed value or under while the vehicle is traveling, proceeding to NO in S100, disconnected condition of the thermal fuse 14 in the thermal battery 10 is detected in S110. And then, when the thermal fuse 14 is in abnormal condition, that is, when the thermal fuse state detection means 22 detects cutoff of the thermal fuse 14, proceeding to YES in S120, an abnormal signal is output from the control circuit 30 to the outside in S130.

Here, as shown in FIG. 34, it is constituted that an abnormal signal is output to a warning means 8 such as an indication means for give warning to the driver (warning lamp or the like) and voice means (warning buzzer or the like), and abnormal condition of the thermal battery 10 is informed to the driver by the warning means 8. In contrast, when the thermal fuse 14 is determined to be normal in S120, electric current for ignition is supplied to the thermal battery 10 by outputting a signal for starting the switches SW1, SW2 from the control circuit 30 in S140, and power is supplied from the thermal battery 10 after start-up to the load 40. It is to be noted that the control circuit 30 conducting such a process can have a constitution in which a microcomputer and various ICs are provided for example, and that a process like in the FIG. 36 can be conducted according to a prescribed program in terms of software, or can be conducted by constituting a circuit in terms of hardware. It is to be noted that a switch start signal may be output to start the thermal battery 10 immediately after abnormality of the main power source occurs without conducting the abnormality detection process of the thermal battery 10 like in S110, S120 and S130.

And when the switches SW1, SW2 are started, electric current for ignition is supplied from the condenser C1 or the main power source to start up the thermal battery 10. The thermal battery 10, being activated, generating electromotive force, starting up power supply, starts to supply power to the load 40 through the output line 24. In contrast, when a start signal for starting the switches SW1, SW2 generate from the control circuit 30, electric charge stored in the condenser C2 is immediately discharged to supply power to the load 40 before start-up of the thermal battery 10. And since the start-up of the thermal battery 10 is completed and output electric current is supplied to the load 40 while the condenser C2 is supplying power, power supply to the load 40 is stably maintained without stopping.

Figure 37:
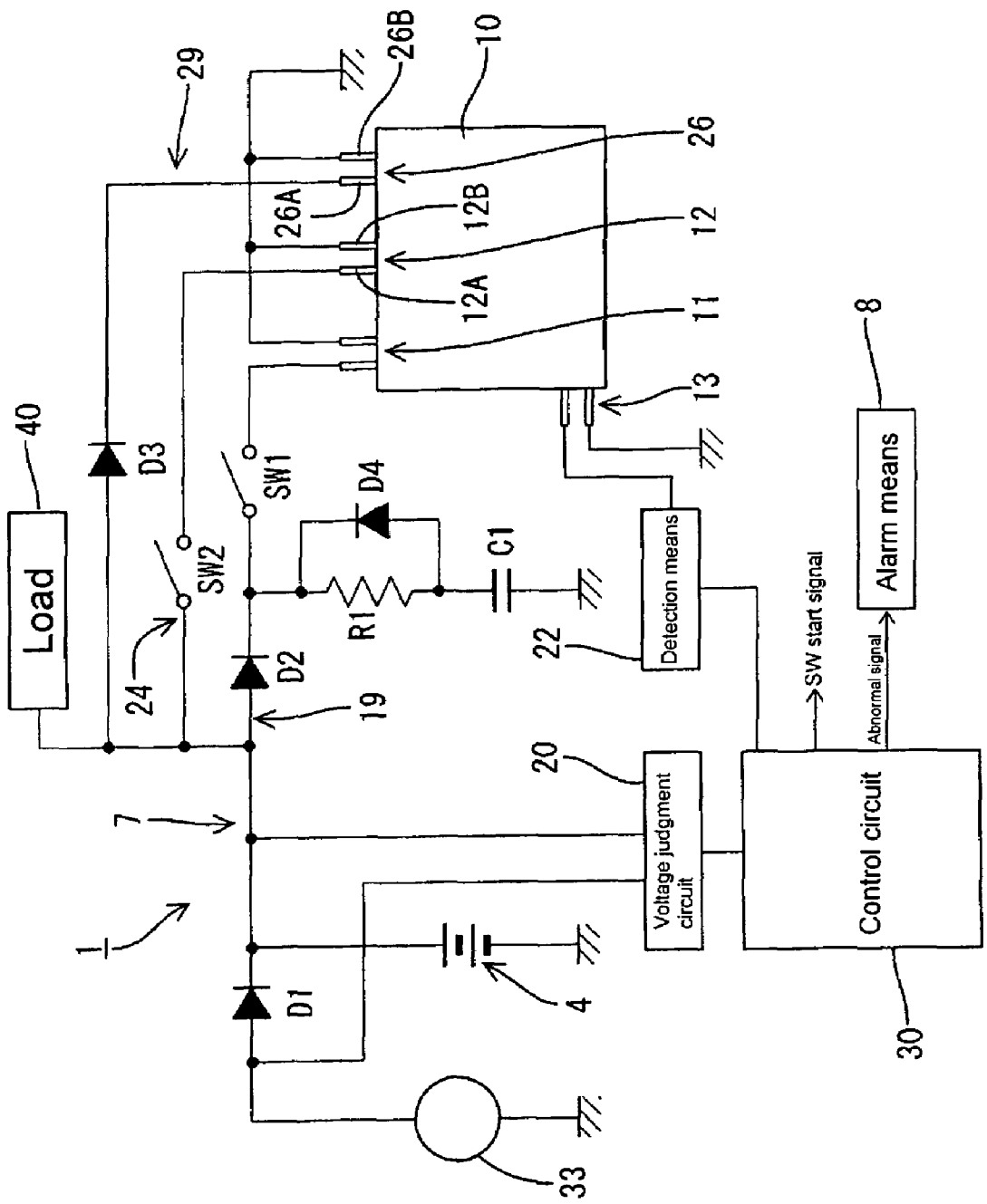
FIG. 37 is a structural diagram showing a second example of the power unit for conveyance according to the eighth embodiment.
Figure 38:
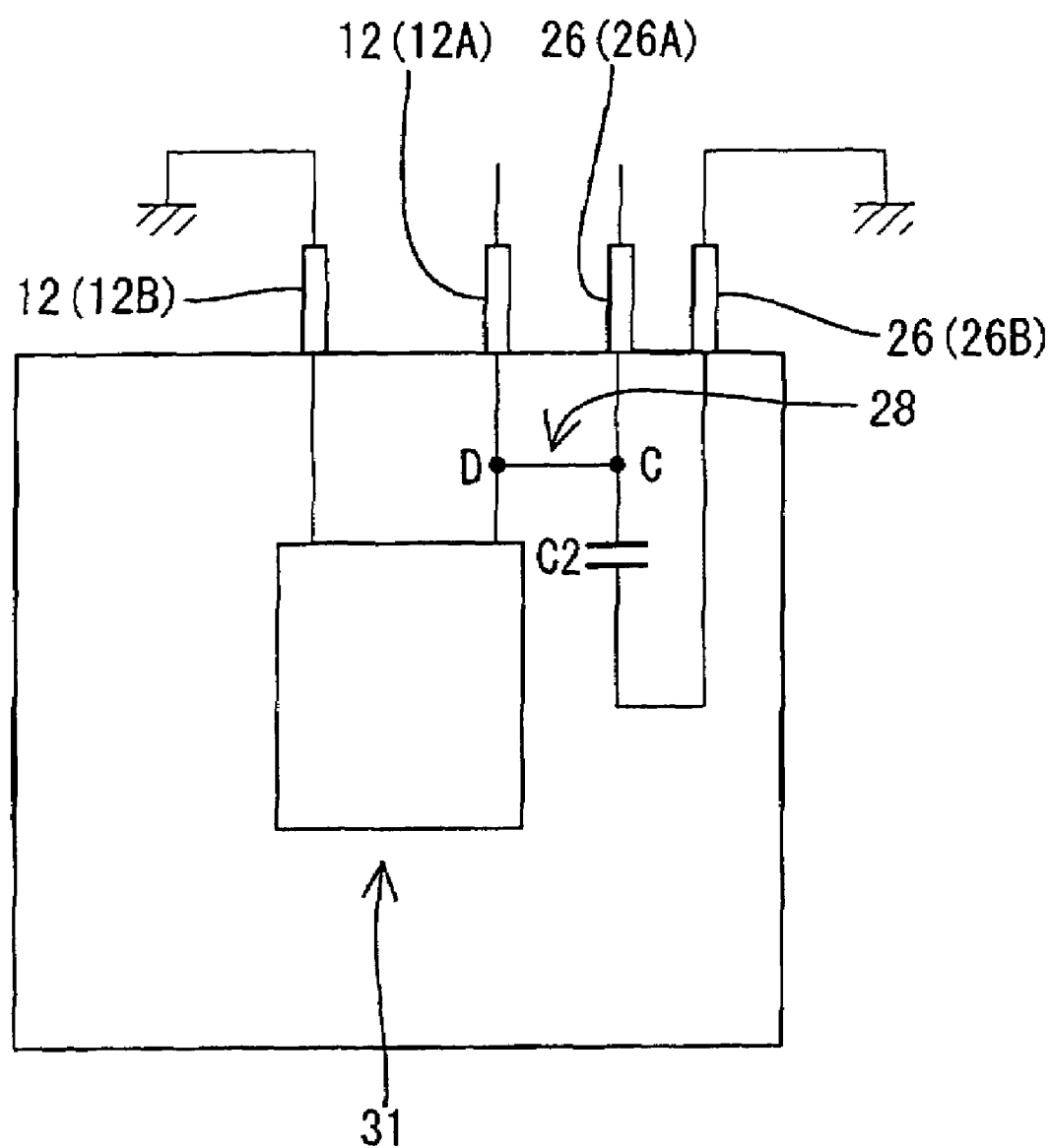
FIG. 38 is a explanatory diagram explaining an inside circuit of a thermal battery which is employed for the eighth embodiment.
Figure 39:
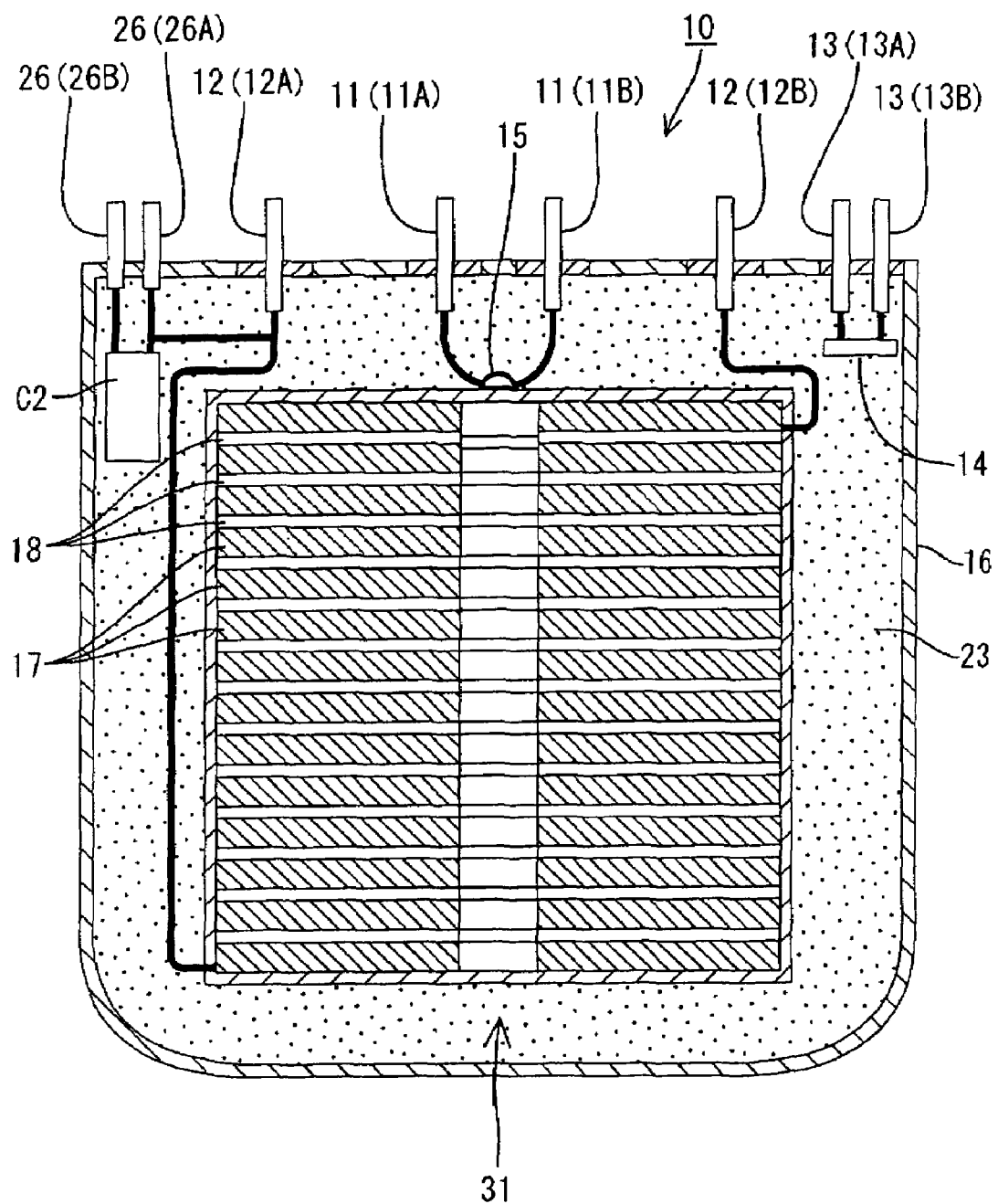
FIG. 39 is a structural diagram explaining an inside structure of the thermal battery which is employed for the eighth embodiment.

FIG. 37 is a circuit diagram showing an essential part of the power unit for vehicles according to a second example of this embodiment. This example is different from the second embodiment in terms of constitutions of a sub power source means (condenser C2), thermal battery 10, output line 24, and charge line 29 and the constitutions of the other components are similarly to the ones in the first embodiment, so a description is given for the different components. In the third embodiment, as shown in the circuit diagram of FIG. 38, a thermal battery 10 inside which an auxiliary power source means (that is, condenser C2) is employed. It is to be noted that the circuit diagram of FIG. 38 is shown by omitting the terminal for ignition 11 and the fuse terminal 13. This thermal battery 10, as shown in FIG. 39, is constituted that a terminal for charge 26 is provided in addition to the terminal for ignition 11 and the output terminal 12. This terminal for charge 26 is constituted that one positive electrode terminal 26A is connected to the power source line 7 through the charge line 29, and that the other negative electrode terminal 26B is grounded, as shown in FIG. 39.

Ordinarily, (that is, when main power source is normal), the condenser C2 provided inside the thermal battery 10 is charged whereas when the main power source is abnormal, discharge from the condenser C2 starts to supply power from the output terminal 12 before start-up of power supply from a main electromotive force generation section 31 of the thermal battery 10. After the start-up, electric power from the main electromotive force generation section 31 is supplied from the output terminal 12. It is to be noted that examples of the concrete inside structure include the one shown in FIG. 39.

In the example shown in FIG. 39, in addition to the constitutions of FIG. 23, in which a condenser C2 and a terminal for charge 26 are further provided in the thermal battery 10, is different from the constitution of FIG. 23 in that the positive electrode terminal 26A of the terminal for charge 26 and the positive electrode terminal 12A of the output terminal 12 are internally connected in the terminals C, D and that the line for discharge 28 is located inside the battery. It is to be noted that the other components have constitutions and functions similarly to the ones in FIG. 23. By the thermal battery 10 thus constituted, the thermal battery is given a function to solve delay in start-up of the main electromotive force generation section 31 by itself. It is to be noted that since an amount of time after a start signal is sent, ignition starts until power supply starts up depends on the property of the main electromotive force generation section 31, the condenser C2 preferably has a capacity depending on the property of the main electromotive force generation section 31 (for example, capacity to supply electric power at a prescribed level or above until supply electric power of the thermal battery 10 starts up). It is to be noted that the third embodiment, as shown in FIG. 37 and FIG. 38, has a constitution in which the resistor for charge R2 and the diode for rapid discharge D5 shown in FIG. 34 are not provided.

Figure 40:
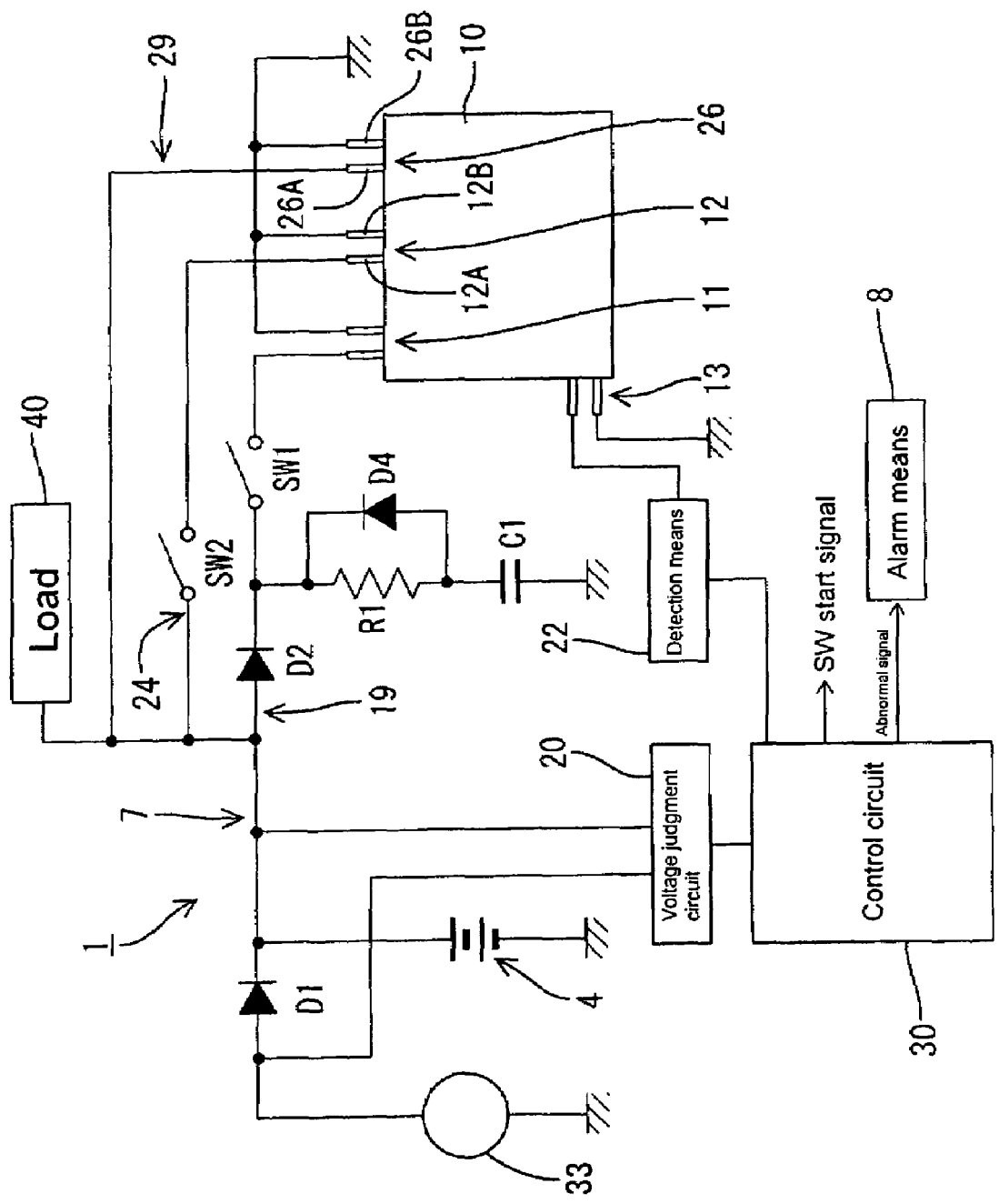
FIG. 40 is a structural diagram showing a third example of the power unit for conveyance according to the eighth embodiment.
Figure 41:
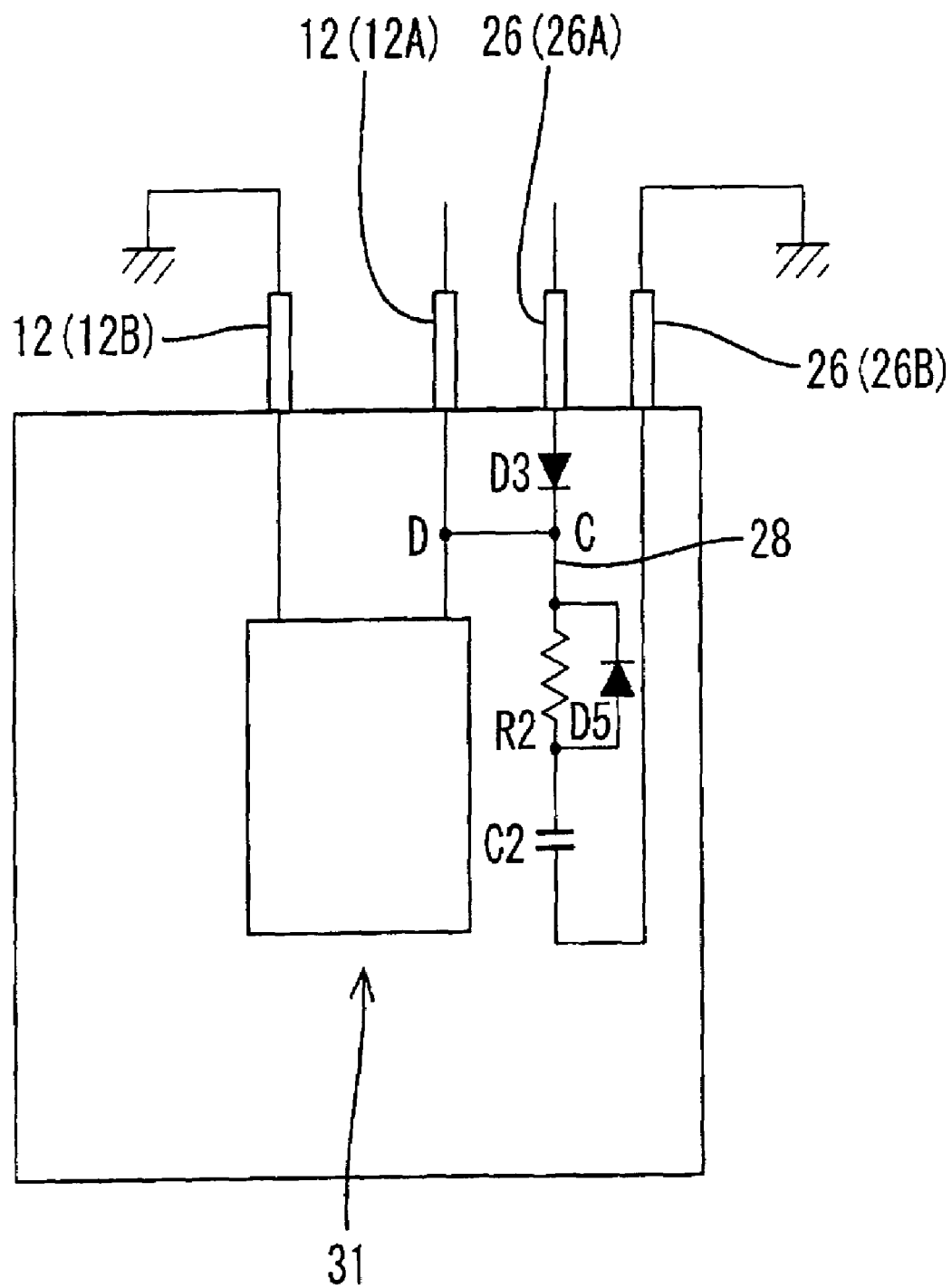
FIG. 41 is an explanatory diagram explaining the inside circuit of the thermal battery which is employed for the eighth embodiment.

FIG. 40 is a circuit diagram showing an essential part of the power unit for vehicles according to a third example of this embodiment. FIG. 41 is an explanatory diagram illustrating an inside circuit of the thermal battery used in a third practical example.

In the third practical example, similarly to the constitution of the second practical example, that is, it is constituted a condenser C2 is provided inside the thermal battery 10 like in the FIG. 41, and is further constituted that a resistor for charge R2 connected to a terminal for charge 26 and a diode for rapid discharge D5 parallelly connected to the resistor for charge R2 are respectively provided inside the thermal battery 10. And as shown in FIG. 40, a positive electrode terminal 26A of the terminal for charge 26 is directly connected to a main power source line 7. For concrete circuit operation, although similar to the first embodiment, the third practical example is different from the first embodiment in that the resistor for charge R2 and the diode for rapid discharge D5 are provided inside the thermal battery 10, which are integrated with the thermal battery 10 as a unit. Furthermore, in this example, a diode for preventing reverse flow D3 in a charge line 29 is provided inside the battery so as to prevent electric current from flowing from the terminal for charge 26 to the power source line 7 side. Such a constitution allows for easy charge once one of the terminals for charge 26 (that is, positive electrode terminal 26A) is connected to the power source line 7, simplification of circuit structure outside the thermal battery 10, and applicability to various vehicles.

Ninth Embodiment

There is shown a preferable constitution to solve the problem 4 referring to the accompanying drawings.

Figure 42:
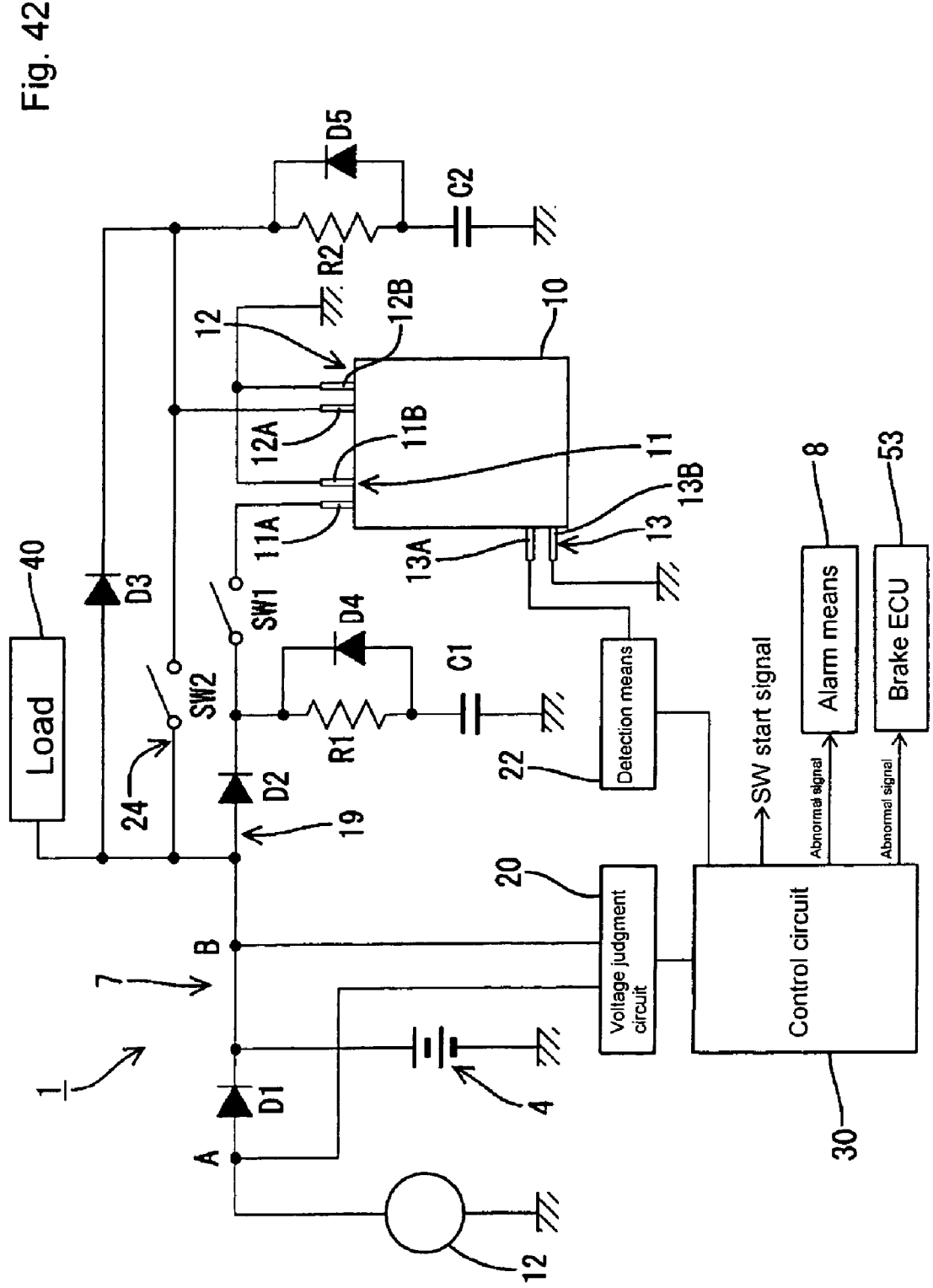
FIG. 42 is a structural diagram showing a first example of a power unit according to the ninth embodiment.

First, referring to the block diagram of FIG. 42, a description is given for a rough outline of this embodiment. A power unit 1 according to this embodiment is composed of a plurality of power sources: a battery 4 and an alternator 12 as a main power source for supplying power to an electronic control system (here, corresponds to a load 40); the main power source composed of the battery 4 and the alternator 12; and a thermal battery 10 as a power source for emergency use (stand-by power source) for supplying power to the electronic control system when power supply abnormality of the main power source is detected. And a battery abnormality detection means and an alternator abnormality detection means are provided as main power source abnormality detection means for detecting abnormality of the main power source whereas it is constituted that a thermal battery drive means for driving the thermal battery is provided so that drive of the thermal battery is controlled when the main power source is abnormal. And a thermal battery abnormality detection means for detecting the thermal battery abnormality is provided, and it is constituted that a warning means 8 gives warning to the driver in case abnormality of the thermal battery is detected by the thermal battery abnormality detection means at least either of before or after the vehicle starts. A stable power source supply is thus achieved by detecting not only abnormality of the main power source but also abnormality of the power source for emergency use. A detail description is hereinafter given for a concrete structure of such a vehicle control device 1 sequentially.

Figure 35:
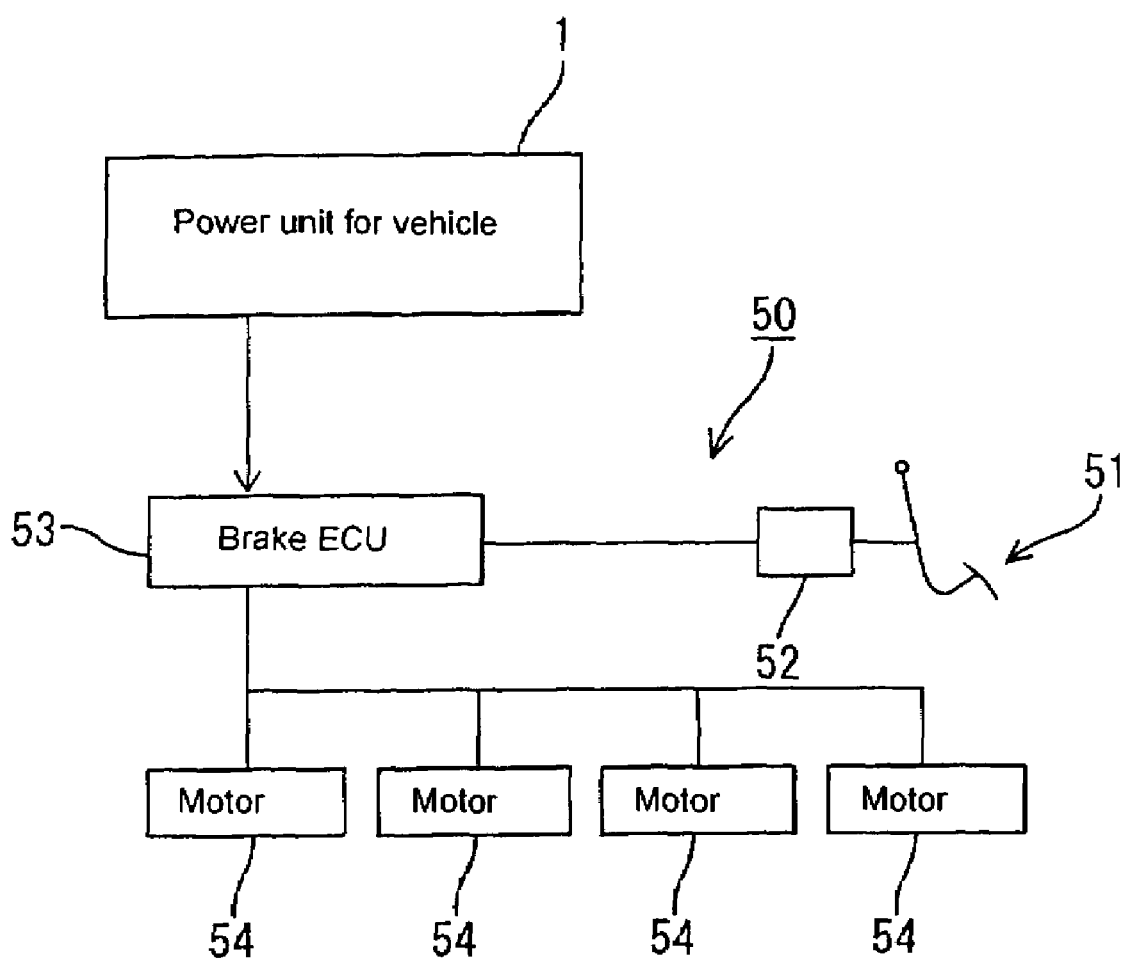
FIG. 35 is a conceptual diagram showing one example of an electric brake system conceptually.

Firstly, an electronic control system to be an application object is the same as in the one described in the above FIG. 35.

Next, there is shown a constitution of the vehicle control device for controlling an electric brake system or the like referring to FIG. 42.

As shown in FIG. 42, the vehicle control device 1 is provided with a main power source having a battery 4 composed of a lead-acid battery for example, and an alternator 12, to be constituted that the main power source normally supplies power to a load 40 such as the electric brake system 50 (FIG. 35) described above. At the same time, a thermal battery 10 is provided as a power source for emergency use for supplying power to these battery 4 and alternator 12 only in an emergency when abnormality occurs, to be constituted that power supply to the load does not stop even in an emergency state.

Figure 43:
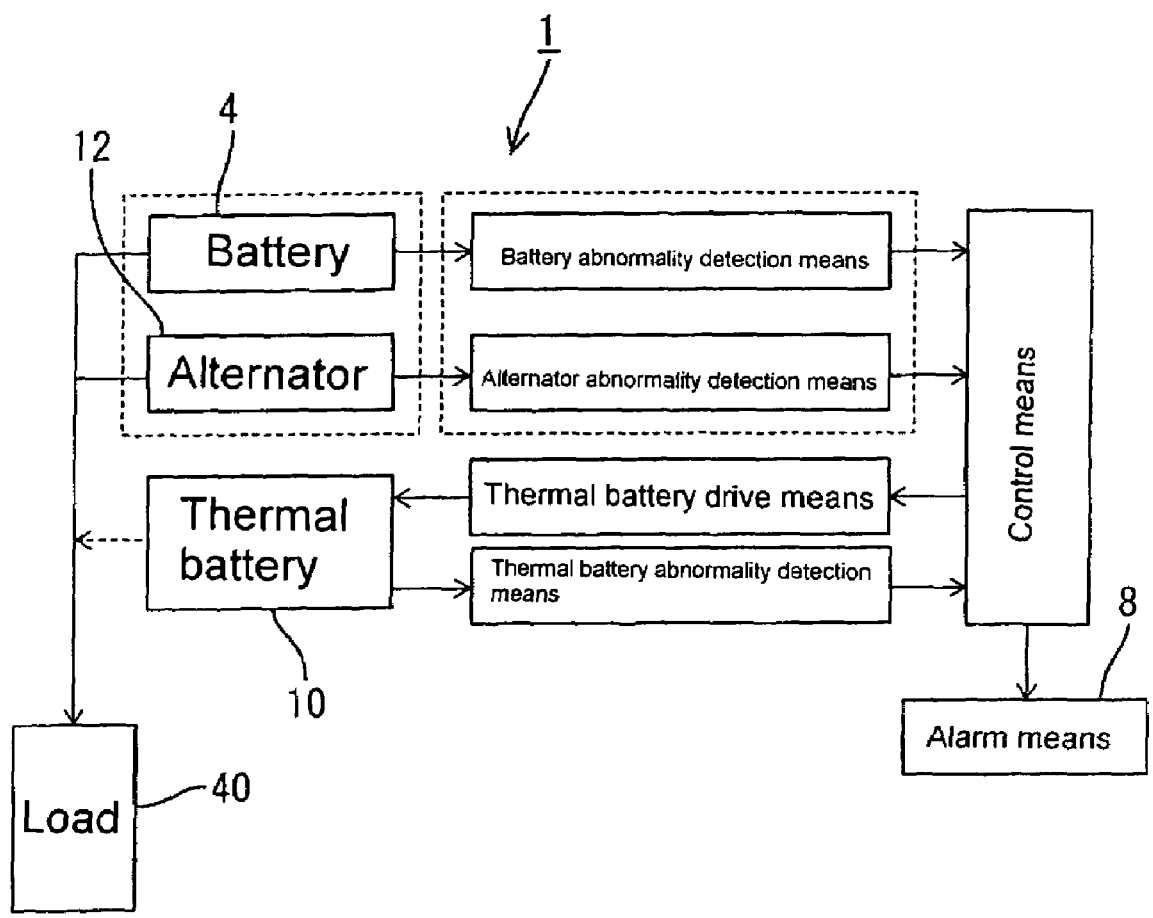
FIG. 43 is a block diagram showing a rough outline of the power unit according to the ninth embodiment.

Furthermore, as the one for corresponding to the alternator abnormality detection means for detecting abnormality of the alternator 12 and the battery abnormality detection means for the battery 4 in FIG. 43, a voltage judgment circuit 20 for detecting voltage levels of the alternator 12 and the battery 4 is provided. In the voltage judgment circuit 20 of FIG. 15, a terminal A for detecting voltage level of the alternator 12 and a terminal B for detecting voltage level of the battery 4 are respectively provided. And it is constituted so that the voltage levels of these terminals A, B can be detected for each terminal to judge that the voltage levels of these terminals are equal to prescribed reference value or above.

It is to be noted that the constitution for abnormality detection shown here is only an example, and it may be constituted that either one of the voltage levels of the alternator 12 and the battery 4 is detected. Furthermore, abnormality detection methods other than the method by voltage detection may be employed. For example, a method such that revolutions of the alternator 12 are detected so as to judge abnormality of the alternator 12 based on the revolutions. In any case, various constitutions are available as long as the constitutions detect abnormality of power supplied from the main power source. It is to be noted that as a concrete structure for the voltage judgment circuit 20, it is enough if voltage level of the alternator 12 or the battery 4 can be detected whether to be equal to a prescribed reference value or above, or not. Various structures are conceivable and for example, it can be constituted that voltage of the alternator 12 or battery 4 is detected in a comparison circuit for comparing with a prescribed reference voltage. Here, when at least either one of voltage levels of the terminal A and the terminal B is equal to a prescribed value or under, the main power source determines abnormality and outputs a signal indicating abnormality of the main power source from the voltage judgment circuit 20 to the control circuit 30, and the control circuit 30 then starts up the thermal battery 10 based on the signal by a control method, which will be described later.

In the example of FIG. 42, a thermal fuse state detection means 22 for detecting the state of a thermal fuse 14 is connected to a terminal for fuse 13 corresponding to the thermal fuse 14. The thermal fuse state detection means 22 is constituted so as to detect whether the thermal fuse 14 is in cutoff state or not and to output an abnormal signal to the control circuit 30 when the thermal fuse 14 is cut off. Specifically, for example, it can be constituted that slight electric current is flown through a line of the thermal fuse 14 and that the slight electric current is detected in an electric current detection circuit. In this constitution, when electric current is detected in the line of the thermal fuse 14, determined that the thermal fuse 14 is in a connected state, the thermal battery 10 can be used, on the other hand, when electric current is not detected, determined that the thermal battery 10 cannot be used, an abnormal signal is output to the control circuit 30. It is to be noted that the example shown here is only an example, and various constitutions can be used as long as the circuit structures can detect the cutoff state of the thermal fuse 14.

The thermal battery 10 as constituted above is constituted that the squib 15 (FIG. 23) is ignited and becomes activated by carrying electric current to the terminal for ignition 11. Therefore, when starting the thermal battery 10, electric current is carried to the terminal for ignition 11 by turning ON a switch SW1. In FIG. 42, it is constituted that electric current for ignition can be supplied from either one of the battery 4 and the alternator 12 by a line for ignition 19 connected to a power source line 7. However, assuming the situation in which neither can be used, here is provided a condenser for ignition C1 parallely connected to the main power sources. This condenser for ignition C1 is constituted to be parallel connected to the main power source through a resistor for charge R1 so as to be charged by the main power source. Furthermore, a diode for preventing reverse flow D2 is provided in the line for ignition 19. Furthermore, a diode D4 for rapid discharge is connected parallel to the resistor for charge R1, when the switch SW1 turns ON with this condenser for ignition C1 being charged, electric current is rapidly carried to the terminal for ignition 11 through this diode D4 with the result that the thermal battery 10 is started. It is to be noted that it may be constituted that the resistor for charge R1 and the diode D4 are not used.

Furthermore, there is provided an output line 24 leading from an output terminal 12 of the thermal battery 10 to the load 40, and a switch SW2 intervenes between the output terminal 12 and the load 40. Output electric current from the thermal battery 10 is supplied to the load 40 by turning ON this switch SW2. It is to be noted that although not shown here in the figure, it can be constituted that constant voltage is supplied to the load by a constant voltage circuit intervening between the thermal battery 10 and the load 40.

Next, there is shown abnormality detection process while the vehicle is traveling.

For example, abnormality detection process is conducted in a flow illustrated using FIG. 36. It is to be noted that although abnormality of the thermal battery 10 is detected with the fact that abnormality of the main power source has been detected as a trigger in this example, abnormality detection process of the thermal battery 10 can be conducted with the fact that another requirement is met (when engine at a speed equal to or higher than a prescribed rotational speed, when vehicle reaches or exceeds a prescribed speed, or the like) as a trigger, and also abnormality detection process can be conducted regularly.

Here, as shown in FIG. 42, it is constituted that an abnormal signal is output to a warning means 8 such as an indication means for give warning to the driver (warning lamp or the like) and voice means (warning buzzer or the like), and abnormal condition of the thermal battery 10 is informed to the driver by the warning means 8.

Furthermore, when the thermal fuse 14 is determined to be normal in S120, electric current for ignition is supplied to the thermal battery 10 by outputting a signal for starting the switches SW1, SW2 from the control circuit 30 in S140, and power is supplied from the thermal battery 10 after start-up to the load 40. It is to be noted that the control circuit 30 conducting such a process can have a constitution in which a microcomputer and various ICs are provided for example, and that a process like in the FIG. 36 can be conducted according to a prescribed program in terms of software, or can be conducted by constituting a circuit in terms of hardware.

In contrast, together with the abnormal signal output to the warning means 8, an abnormal signal may be output to a drive suppress means for suppressing vehicle drive to force the vehicle into stop state or deceleration state. In the example of FIG. 42, it is constituted that an abnormal signal is output to a brake ECU 53 as well as to the warning means 8, and the brake ECU 53 receiving the abnormal signal drives the motor 54 (FIG. 35) independently of the driver's intention and brakes the vehicle gradually to control the that the relevant vehicle so as to be in deceleration state gradually or to stop completely after deceleration.

Figure 44:
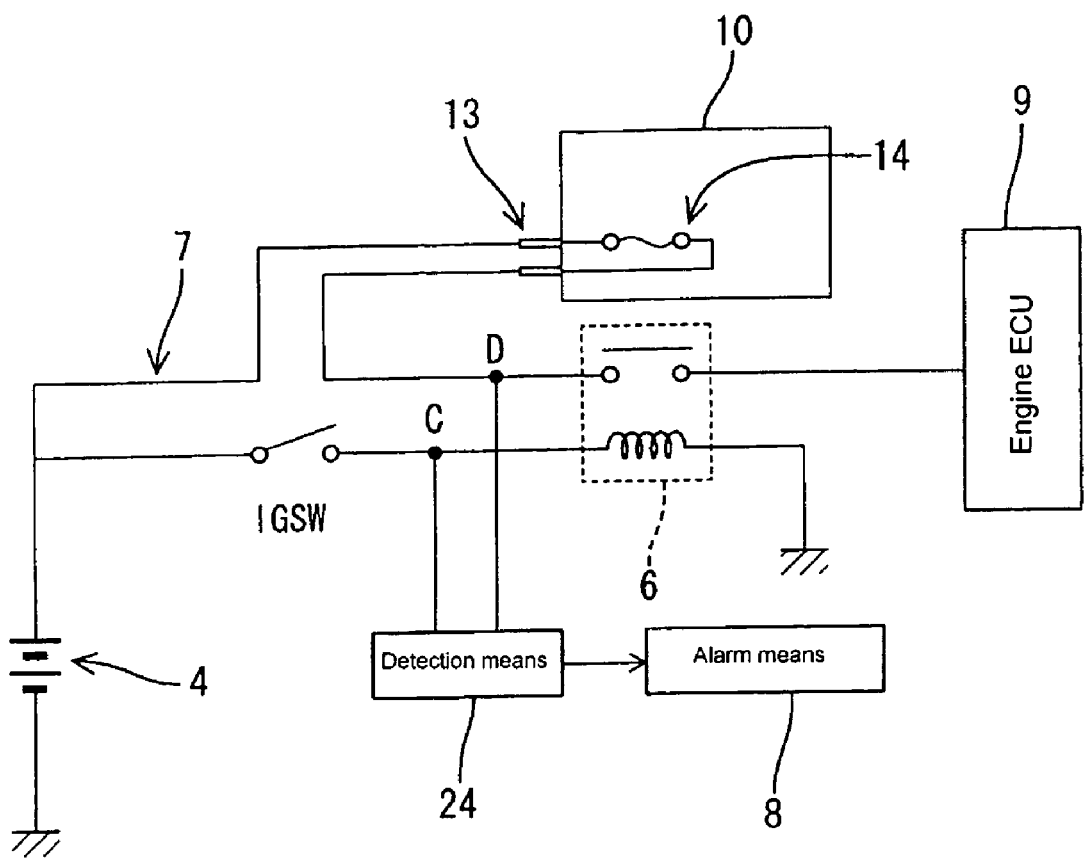
FIG. 44 is a structural diagram showing a second example of the power unit according to the ninth embodiment.

The example in FIG. 44 shows a constitution in which abnormality of the thermal battery 10 is determined before the vehicle starts. It is to be noted that the same figure omits a terminal for ignition of the thermal battery and an output terminal for convenience of explanation. In the constitution of FIG. 44, it is constituted to be provided with an ignition switch (hereinafter, also referred to as IG switch) and a relay 6 for carrying electric current to the main power source line 7 when turning ON the IG switch. And it is constituted that the thermal fuse 14 of the thermal battery 10 is serially connected to the main power source line 7, and that the main power source line 7 is connected to an electronic control device (engine ECU 9) for starting an engine through the relay 6. It is constituted that power is supplied from the main power source to the engine ECU 9 when the IG switch turns ON with the thermal fuse 14 connected. It is to be noted that the example of FIG. 44 shows only a substantial part for starting the engine, but the main power source, the main power source abnormality detection means, the start method of the thermal battery 10, the power supply method to the load 40 or the like can have similar constitutions to the ones in FIG. 42.

In FIG. 44, a start regulation means is composed of the thermal fuse 14, the relay 6 and the main power source line 7. The start regulation means shuts off power supply to the engine ECU 9 so that the engine will not start when a power source for emergency use (that is, thermal battery 10) is abnormal. Furthermore, a thermal fuse state detection means 24 respectively detects voltage level between the IG switch and the relay 6, and voltage level between the thermal fuse 14 and the relay 6. Specifically, it is constituted that an abnormal signal is output to a warning means (the same constitution as in the first embodiment) when the IG switch is ON (that is, the terminal C is at a prescribed voltage level) and voltage level of the terminal D is at a prescribed value or under (for example, zero level). That is, when the terminal D is at a prescribed voltage value or under although the IG switch turns ON, it is regarded that the thermal fuse 14 is cut off and warning is given to the driver. Such a constitution allows whether the thermal battery 10 has been used or not to be judged at the time of start-up, and start to be regulated even if the engine would start with the thermal battery 10 having been used.

It is to be noted that a usage history detection means may be constituted so as to contain a terminal resistor detection means for detecting a terminal resistor of a terminal for ignition instead of the thermal fuse. That is, the terminal for ignition is molten and transformed by high temperature at the time of ignition, whose resistance value varies from the terminal resistor before ignition. Detecting this change in resistance value, when the resistor varies from a reference value at a prescribed level or above, it may be determined that the terminal has been used.

Furthermore, output torque may be reduced by inputting an abnormal signal of the thermal battery into the engine ECU, and by performing fuel cut, cylinder cut-off control, lag control or the like so that drive is suppressed.

INDUSTRIAL APPLICABILITY

The present invention can provide a power unit for conveyance with high reliability and with no need for charge. Furthermore, this power unit can provide conveyances which have an electronic control system with high reliability.

The invention claimed is:

1. A power unit for conveyance comprising:
    a main power source and a standby power source, wherein a thermal battery is provided as the standby power source,
    a backup power source connected to the main power source through a power supply wire;
    a thermal battery ignition circuit for activating the thermal battery by electric power from the backup power source;
    a voltage conversion circuit connected to the power supply wire, for allowing selectively either the voltage of the main power source to increase and to be supplied to the backup power source side, or the voltage of the backup power source side to decrease and to be supplied to the main power source;
    a thermal battery ignition control circuit connected to the power supply wire between the main power source and the voltage conversion circuit to activate the thermal battery during operation, by controlling the thermal battery ignition circuit in response to voltage decrease of the main power source which operates by electric power from the power supply wire;
    a diagnosis circuit to diagnose for activation of the thermal battery, which is connected to the power supply wire between the main power source and the voltage conversion circuit and operates by electric power from the power supply wire;
    a disconnection detection circuit which has a connection point between the main power source and the voltage conversion circuit, to detect disconnection of the power supply wire between the connection point and the main power source;
    a voltage increase/decrease control circuit controlled by the disconnection detection circuit, for allowing the voltage conversion circuit to increase the voltage of the main power source side to supply to the backup power source side in a state such that disconnection of the power supply wire is not detected, and for allowing the voltage conversion circuit to decrease the voltage of the backup power source side to supply to the main power source side in a state such that disconnection of the power supply wire is detected; and
    an operation stop control circuit to stop operation of the diagnosis circuit in response to detection of the power supply wire disconnection by the disconnection detection circuit.

2. The power unit for conveyance as set forth in claim 1, comprising:
    a first switch means to conduct a switch operation by detecting voltage of the main power source;
    an activation device to activate the thermal battery by having continuity with the main power source when the first switch means operates;
    a backup power source parallelly connected to the main power source through a diode; and
    a second switch means located between the backup power source and the activation device, to switch connection status between the backup power source and the activation device.

3. The power unit for conveyance as set forth in claim 1 comprising:
    a first switch means to conduct a switch operation by detecting voltage of the main power source;
    a constant current circuit to which power is supplied from the main power source by a switch operation of the switch, to supply constant current to the thermal battery; and
    an energy storage means to supply backup power to the constant current circuit when power from the main power source is shut off.

4. The power unit for conveyance as set forth in claim 1, wherein a resistance circuit is employed as the diagnosis circuit and a shutoff circuit is employed as the operation stop control circuit;
    the resistance circuit is a circuit connected so that electric power is supplied from the above backup power source, to apply a voltage between both ends of a part for activating the above thermal battery so as to diagnose the part for activating the above thermal battery; and
    the shutoff circuit is a circuit to shut off electric power supply from the above backup power source to the resistance circuit in response to detection of the power supply wire disconnection by the above disconnection detection circuit.

5. The power unit for conveyance as set forth in claim 1, comprising:
    a main power source abnormality detection means for detecting abnormality of the main power source;
    an auxiliary power source means which is a power source means for supplying the thermal battery with electric power for starting the thermal battery, and is different from a battery located in the main power source; and a control means for controlling so that electric power for starting is supplied to the thermal battery from the auxiliary power source means to the thermal battery in case the main power source abnormality detection means detects abnormality of the main power source.

6. A power unit for conveyance, comprising:

a main power source and a standby power source, wherein a thermal battery is provided as the standby power source.

wherein the main power source is provided with a main storage battery whose negative electrode is grounded and a generator whose negative electrode is grounded, comprising: a first capacitor whose positive electrode is connected to a positive electrode of the main storage battery and whose negative electrode is grounded; a second capacitor whose positive electrode is connected to the positive electrode of the main storage battery through a positive electrode side current limiting resistor, and whose negative electrode is grounded through a negative electrode side current limiting resistor; a thermal battery activation circuit one of whose terminals is connected to the positive electrode of the main storage battery through a voltage sensor for detecting voltage decrease of the power source and closing electrically, and the other terminal is connected to the negative electrode of the second capacitor; a diode whose anode is connected to the other terminal of the thermal battery activation circuit, and whose cathode is connected to the positive electrode of the second capacitor; a main switch for grounding the positive electrode of the second capacitor when closing; and a control unit for closing the main switch by detecting voltage decrease of the main power source.

7. A power unit for conveyance, comprising:

a main power source and a standby power source, wherein a thermal battery is provided as the standby power source, wherein the main power source is provided with a main storage battery whose negative electrode is grounded and a generator whose negative electrode is grounded, comprising: a DC-DC converter whose negative electrode is grounded, for increasing voltage of the main storage battery; a first capacitor whose positive electrode is connected to a positive electrode of the DC-DC converter, and whose negative electrode is grounded; a second capacitor whose positive electrode is connected to the positive electrode of the DC-DC converter through a positive electrode side current limiting resistor, and whose negative electrode is grounded through a negative electrode side current limiting resistor; a thermal battery activation circuit one of whose terminals is connected to the positive electrode of the DC-DC converter through a voltage sensor for detecting voltage decrease of the main power source and closing electrically, and the other terminal is connected to the negative electrode of the second capacitor; a sub switch for grounding the other terminal of the thermal battery activation circuit through a diode for negative voltage protection, when closing; a main switch which is the main switch for grounding the positive electrode of the second capacitor when the main switch closes; and a control unit for closing the sub switch when detecting voltage decrease of the main power source, and for closing the second switch in a prescribed amount of time after closing the main switch.

8. The power unit for conveyance as set forth in claim 1, wherein a circuit for limiting ignition electric current supplied to a thermal battery activation circuit for activating the thermal battery is provided; and wherein the circuit for limiting ignition electric current comprises:
    a semiconductor integrated circuit in which a thermal battery activation circuit ignition driving circuit is formed;
    a reference power supply formed in the semiconductor integrated circuit;
    a pull-down resistor connected to the outside of the semiconductor integrated circuit, to which electric current is supplied from the reference power supply; and
    an electric current limitation circuit formed inside the semiconductor integrated circuit, the electric current limitation circuit limiting a value of ignition electric current supplied to the thermal battery activation circuit within a predetermined range based on a value of reference electric current supplied from the reference power supply to the pull-down resistor.

9. The power unit for conveyance as set forth in claim 1, wherein a circuit for limiting ignition electric current supplied to a thermal battery activation circuit for activating the thermal battery is provided, and the power unit for conveyance comprises in one semiconductor integrated circuit:
    a thermal battery activation circuit ignition drive circuit;
    an electric current detection resistor through which thermal battery activation circuit ignition electric current flows;
    a constant current source; a pull-down resistor through which electric current from the constant current source flows; and
    an electric current limitation circuit for limiting ignition electric current value detected based on potential difference between both ends of the electric current detection resistor within a predetermined range based on potential difference between both ends of the pull-down resistor.

10. The power unit for conveyance as set forth in claim 1, wherein a circuit for limiting ignition electric current supplied to a thermal battery activation circuit for activating the thermal battery is provided, and a semiconductor integrated circuit in which a thermal battery activation circuit ignition drive circuit is formed and a time limitation means connected to outside of the semiconductor integrated circuit, for limiting current carrying time of ignition electric current to a predetermined time.

11. The power unit for conveyance as set forth in claim 1, comprising:
    a main power source abnormality detection means for detecting abnormality of the main power source; and
    a sub power source means for supplying power to outside after abnormality is detected by the relevant main power source abnormality detection means.

12. The power unit for conveyance as set forth in claim 1, comprising:
    a main power source abnormality detection means for detecting abnormality of the main power source;
    a standby power source which is provided with a thermal battery for supplying power to outside when the main power source abnormality detection means detects power supply abnormality; and a standby power source abnormality detection means for detecting power supply abnormality in the relevant s standby power source; and a warning means for giving warning when abnormality in the standby power source is detected by the standby power source abnormality detection means at least either before or after the relevant conveyance starts.

13. A conveyance comprising an electronic control system and the power unit for conveyances as set forth in claims 1,2,3,4,5,6,7,8,9,10,11, or 12, which is constituted so that electric power for operating the electronic control system is supplied from the power unit for conveyance to the electronic control system.

* * * * *